United States Patent
Stirling et al.

(10) Patent No.: US 6,865,188 B1
(45) Date of Patent: Mar. 8, 2005

(54) LOCAL COMMUNICATION SYSTEM

(75) Inventors: Andrew J. Stirling, Surrey (GB); Simon E. Pendergast, Devon (GB); Harivaden A. Parmar, Wokingham (GB)

(73) Assignee: Communication & Control Electronics Limited, Guilldford (GB)

( * ) Notice: Subject to any disclaimer, the term of this patent is extended or adjusted under 35 U.S.C. 154(b) by 0 days.

(21) Appl. No.: 09/373,980

(22) Filed: Aug. 16, 1999

Related U.S. Application Data

(63) Continuation of application No. PCT/GB98/00349, filed on Feb. 17, 1998.

(30) Foreign Application Priority Data

| Feb. 17, 1997 | (GB) | 9703216 |
| Mar. 10, 1997 | (GB) | 9704901 |
| May 27, 1997 | (GB) | 9710908 |
| Jul. 30, 1997 | (GB) | 9716083 |
| Sep. 12, 1997 | (GB) | 9719415 |
| Oct. 7, 1997 | (GB) | 9721170 |

(51) Int. Cl.[7] .......................... H04L 12/26; H04J 3/12
(52) U.S. Cl. ................... 370/460; 370/510; 370/522
(58) Field of Search ................ 370/460, 470, 370/510, 522, 389, 468, 442, 403, 404, 405, 465, 229, 474

(56) References Cited

U.S. PATENT DOCUMENTS

| 3,879,582 A | * | 4/1975 | White et al. ............. 370/460 |
| 4,422,180 A | | 12/1983 | Wendt |
| 4,654,890 A | | 3/1987 | Hasegawa et al. |
| 4,739,183 A | | 4/1988 | Tokura et al. |
| 4,866,704 A | | 9/1989 | Bergman |
| 5,068,880 A | | 11/1991 | Kline et al. |
| 5,247,518 A | | 9/1993 | Takiyasu et al. |

(List continued on next page.)

FOREIGN PATENT DOCUMENTS

| EP | 0519111 B1 | 6/1991 |
| EP | 0462349 A1 | 12/1991 |

(List continued on next page.)

OTHER PUBLICATIONS

Patent Abstracts of Japan, vol. 013, No. 574 (E–863), Dec. 19, 1989 & JP 01 240045 A (NEC CORP), Sep. 25, 1989.

(List continued on next page.)

Primary Examiner—Chau Nguyen
Assistant Examiner—Soon D. Hyun
(74) Attorney, Agent, or Firm—Nixon & Vanderhye P.C.

(57) ABSTRACT

Examples of local communication systems are disclosed, based on a ring of point-to-point links, providing for transport of fixed rate synchronous, fixed rate asynchronous data and variable rate data in a flexible format. Different segments of the ring network can carry data at different bit rates, while remaining synchronized to a common frame rate and having a common control channel structure, for compatibility with earlier systems. Parallel channels are provided, either permanently or when required, for signalling errors of source data, data validity/padding, flow control. Parallel variable width channels are defined with free content (stream or packet). Null data symbols are defined for padding on a byte-by-byte basis. The allocation of capacity among variable width channels is revised block by block, and a transition period is defined to allow for ring latency. Calculations for allocation of capacity are performed during one block for the next block, locally at each source station, according to predetermined rules. Information as to bandwidth requirements is exchanged prior to the calculation via a special connection signalling channel and message format.

25 Claims, 28 Drawing Sheets

U.S. PATENT DOCUMENTS

| | | | | |
|---|---|---|---|---|
| 5,257,259 A | | 10/1993 | Tsurumi | |
| 5,278,689 A | * | 1/1994 | Gitlin et al. | 398/54 |
| 5,327,427 A | * | 7/1994 | Sandesara | 370/222 |
| 5,404,134 A | | 4/1995 | Jinzaki et al. | |
| 5,483,536 A | | 1/1996 | Gunji et al. | |
| 5,661,720 A | * | 8/1997 | Taniguchi | 370/223 |
| 5,859,836 A | * | 1/1999 | Eslambolchi | 370/222 |
| 5,946,315 A | * | 8/1999 | Ramfelt et al. | 370/403 |
| 6,185,217 B1 | * | 2/2001 | Ando et al. | 370/403 |

FOREIGN PATENT DOCUMENTS

| | | |
|---|---|---|
| GB | 2268375 A | 1/1994 |
| GB | 2301749 A | 12/1996 |
| GB | 2302243 A | 1/1997 |
| WO | WO 92/04787 | 3/1992 |

OTHER PUBLICATIONS

Nakatsuka et al, "Melnet:Hierarchical Hybrid Local Area Network", First Annual International Phoenix Conference on Computers and Communications, Conference Proceedings, Mar. 26–28, 1986, Scottsdale, Arizona, pp. 239–245, XP002066562.

Greaves et al, "Design and Implementation of an ATM Backbone Ring", Intellectual Leverage, San Francisco, Feb. 24–28, 1992, No. CONF. 37, Feb. 24, 1992 Institute of Electrical and Electronics Engineers, pp. 255–260.

Kamal et al, "An Algorithm For the Efficient Utilization of Bandwidth in the Slotted Ring", IEEE Transactions on Computers, vol. 41, No. 12, Dec. 1, 1992, pp. 1620–1627, XP000343169.

Kamal, "A Schema for the Management of Isochronous and Asynchronous Bandwidth in Ring Networks", Proceedings of the Conference on Computer Communications (INFOCOM), Toronto, Jun. 12–16, 1994, vol. 3, Jun. 12, 1994, Institute of Electrical and Electronics Engineers, pp. 1398–1407, XP000496605.

Application Cited in Search Report of EP Patent 0519111, "Method for Determining the Position of a Network Subscriber in a Network", (TSP 95 P 03).

Application cited in Search Report of EP Patent 0519111, "Method for Common Transmission of Digital Source and Control Data Between Data Sources and Data Sinks Connected by Data Lines", (TSP 95 P 04).

Application Cited in Search Report of EP Patent 0519111, "Method for Initializing a Network Having a Plurality of Network Subscribers Capable of Acting as Masters", (TSP 95 P 05).

Application Cited in Search Report of EP Patent 0519111, "Method for Transmitting Digital Data" (TSP 95 P 06).

Application Cited in Search Report of EP Patent 0519111, "Method for Transmitting Digital Data" (TSP 95 P 07).

Application Cited in Search Report of EP Patent 0519111, "Method for Common Transmission of Digital Source and Control Data Between Data Sources and Data Sinks Connected Through Data Lines" (TSP 95 P 08).

Application Cited in Search Report of EP Patent 0519111, "Method for Initializing a Network" (TSP 95 P 09).

Application Cited in Search Report of EP Patent 0519111, "Method for Common Transmission of Digital Source and Control Data Between Data Sources and Data Sinks Connected Through Data Lines" (TSP 95 P 10).

* cited by examiner

SOURCE TO DESTINATION

DESTINATION TO SOURCE (a) LEFT     (b) RIGHT (a) LEFT                (b) RIGHT

MSB　　　　　　　　　　　　　　　LSB

| 2 BYTES | 48w − 2 BYTES |
|---|---|
| VCB_H | VC DATA |

| 3 BYTES | 42 BYTES | |
|---|---|---|
| PKT HDR | PKT DATA | CRC |

VCB n

| | | | | | |
|---|---|---|---|---|---|
| Fr. 1 | VCB_H | VCB_H | PA1 | PA2 | PA3 | PA4 |
| Fr. 2 | PA5 | PA6 | PA7 | PA8 | PA9 | PA10 |
| ... | | | | | | |
| Fr. 8 | PA41 | PA42 | PA43 | PA44 | PA45 | PA46 |
| Fr. 9 | R | R | PB1 | PB2 | PB3 | PB4 |
| Fr. 10 | PB5 | PB6 | PB7 | PB8 | PB9 | PB10 |
| ... | | | | | | |
| Fr. 16 | PB41 | PB42 | PB43 | PB44 | PB45 | PB46 |

LOCAL COMMUNICATION SYSTEM

This is a continuation of PCT application No. PCT/GB98/00349, filed 17 Feb. 1998, the entire content of which is hereby incorporated by reference in this application.

BACKGROUND OF THE INVENTION

(1) Field of the Invention

The invention relates to a local communication system wherein plural stations are connected in a ring topology. The invention provides a novel local communication system, and stations and interface components for use in such a system.

(2) Related Art

A local communication system which combines source data (CD audio, MPEG video, telephone audio etc) with control messages in a low cost fibre network has been proposed in the form of D2B Optical. For details, see for example the "Conan Technology Brochure" and the "Conan IC Data Sheet" available from Communication & Control Electronics Limited, 2 Occam Court, Occam Road, The Surrey Research Park, Guildford, Surrey, GU2 SYQ (also http://www.candc.co.uk). See also German patent applications of Becker GmbH with filing numbers 19503206.3 (95PO$_3$), 19503207.1 (95PO4), 19503209.8 (95PO5), 19503210.1 (95PO6), 9503212.8 (95P07), 19503213.6 (95P08), 19503214.4 (95P09) and 19503215.2 (95P10). "Conan" is a registered trade mark of Communication & Control Electronics Limited. "D2B" is a registered trade mark of Philips Electronics NV.

BRIEF SUMMARY OF THE INVENTION

The present invention in a first aspect aims to enable expansion of the capacity of such a network, for use in vehicles and the like, while maintaining compatibility with existing D2B Optical Products and designs. The invention is nevertheless applicable in systems other than D2B Optical, where different components may operate at different speeds.

Other, independent aspects of the invention are concerned to provide for the transport of asynchronous data, whether at fixed or variable rates. Known proposals for carrying variable rate data between different stations adopt a purely packet-based protocol, which brings certain overheads and also reduces smoothness of each connection, increasing buffering requirements at the source and destination. In U.S. Pat. No. 5,257,259 (Tsurumi/Yamaha), for example, packet data for various asynchronous connections is carried effectively within a fixed rate channel established on a circuit-switched network.

Other aspects of the invention aim variously to improve the performance, flexibility or reliability of communication networks generally, which may be of ring or other topology, may be synchronous or asynchronous and which may find application in a wide range of fields.

According to a first aspect of the invention, there is disclosed a local communication system comprising a ring network, the data rate in a first segment of the ring being higher than that in a second segment of the ring.

Synchronisation may be maintained for example by the provision of a regular frame structure which has the same frame period in both segments of the network, but a larger quantity of data in each frame of the first segment.

In a network where each segment of the ring conveys one or more channels of user information at a relatively high data rate, and one or more channels of control information, the data rate for control information may be constant between the first and second segments, while the data rate for user information is different.

Depending on the distribution of source and destination stations around the ring, the user information flowing in the second segment may be a subset of that flowing in the first segment of the network.

It will be appreciated that stations in the second segment of the network may for example implement the existing D2B Optical protocols, and hence exploit existing product designs. The stations in the first segment of the ring can employ a novel transceiver adapted to the higher data rates. The transceiver disclosed can provide the necessary buffering and switching of user information to interface between the two segments of the network operating at different rates.

In the proposed embodiment, the frame rate is constant in each segment around the network, and within each frame the same number of bits are reserved to form the control message channel in every segment. The control frame format is thus continuous around the ring. On the other hand, the number of user information ("source data") bits included in each frame is higher in the first segment of the network, and the bit rate in the optical fibre or other channel is much higher than in the second segment. By this means, the provision of higher data capacity does not require a development of new protocols and communication management software for control messages, but only minor adaptation to allow control of more versatile user information channels.

In a second aspect, the invention aims to improve error protection in a local communication system carrying source data from station to station by means of point-to-point links. In particular, errors due to noise on the physical layer may arise in data which is not itself protected by error protection codes. In the known D2B network, for example, such errors are not reported to all stations around the ring, yet they may affect audio samples or other data being carried.

In the embodiment disclosed, the invention in the second aspect is implemented by providing an error signalling flag within each frame (or subframe), which is set by a station to indicate that an error has been detected in the data of that frame, and is repeated by each station when repeating that data to a next station in the ring.

In the embodiment, a source data field of each frame or subframe can be assigned to various channels having respective source and destination stations around the ring.

The error flag field may be shared between these channels, to reduce overhead. The station detecting an error sets the error flag, which travels around the ring with the source data, being subject to the same delays at each station. The station which sets the error flag resets it when the set flag has returned all the way around the ring, unless a new error is detected. This provides a simple mechanism for indicating the risk of error in source data received at each station. While it does not provide a definitive indication of error in a particular channel and while further the flag can be falsely set where two or more errors occur around the ring, the low risk of these further errors and overhead in terms of both channel capacity and circuitry makes the mechanism worthwhile.

A third aspect of the invention provides for the handling of asynchronous data within a network, while preserving the generally synchronous nature of channels in the network. The provision of synchronous channels (for example by allocating a particular field in each frame to a particular channel) brings great benefits in reduced buffering requirements and low overhead for certain applications, but does not suit all applications.

According to this third aspect of the invention, a flow signalling channel is provided for flow signalling in relation to one or more channels established within the network frame structure. The flow signalling channel may be synchronised with the data at a frame (or subframe, where provided) level.

The flow signalling channel may carry for example (from the source station) validity flags, start-of-packet or other structural flags, and/or (from the destination station) flow control signals such as stop/continue (buffer full).

The flow signalling channel may be established by a bit or bits reserved in every frame. Alternatively, the connection signalling channel may be built according to requirements within the fields generally available for source data. In the latter case, a greater bandwidth for signalling can be achieved, without imposing an overhead on the network when asynchronous connections are not required or are not required in great number. Set up of the connection signalling channel may be controlled through a lower data rate control message channel, which may also co-ordinate setting up of individual source data connections.

In a ring network, the same flow signalling channel may carry first flow signalling information (for example a validity signal) from the source to the destination, and second flow signalling information (for example a stop/continue signal) from the destination back to the source station.

The flow signalling channel may be implemented in the transceiver circuit, or by add-on circuitry based on an existing transceiver (for example the Conan transceiver).

Mechanisms may be provided in the various stations to allow for a latency of the flow signalling channel and/or the data channel being controlled.

According to a fourth aspect of the invention, there is provided a method of communication wherein source and destination stations interchange data via a ring network, such data being subject to a delay for buffering at one or more intervening stations, the delay depending on the network configuration, the destination station including means for determining said delay and for sending a flow control signal to the source station in advance of a buffer full condition, in accordance with the determined delay. The flow control signal may also be subject to delay, between the destination and the source station.

According to a fifth aspect of the invention, there is provided a method of communication wherein source and destination stations interchange data via a ring network, such data being subject to a delay in buffers at one or more intervening stations, the delay depending on the network configuration, the destination station including means for sending a flow control signal to the source station in the event a buffer full condition, wherein the source station is arranged upon reception of the flow control signal to repeat data already sent, whereby data already sent but not accepted by the destination is held circulating in the buffers of stations around the network until accepted by the destination station. The flow control signal may also be subject to delay, between the destination and the source station.

A sixth aspect of the invention provides a method for allocating capacity among a plurality of desired connections over a shared network medium, wherein stations of the network communicate to one another their requirements for network capacity, and each station responsible for establishing a respective connection performs a calculation to allocate to that connection a certain capacity, the calculation being performed by all such stations using a common set of rules so as to arrive at a consistent allocation of capacity between the connections.

The responsible station may be the source station for each connection. Responsibility is thereby distributed throughout the network, and allocation can be performed locally, and therefore quickly.

In one embodiment, the invention in its sixth aspect provides, in a local communication system wherein a plurality of stations interchange data via a shared network medium, a method of allocating capacity among a plurality of connections, each connection carrying data from a first station designated as source for that connection to at least one second station designated as destination connection, comprising:

(a) generating for each connection a connection signalling message indicating a required capacity for the connection;

(b) receiving the connection signalling messages for the plurality of connections;

(c) determining a suitable allocation of capacity for each connection by a calculation based on the indicated required capacities and an available total capacity;

(d) establishing each desired connection with the determined allocation, whereby steps (b), (c), and (d) are performed independently at each first station following predetermined rules.

The connection signalling messages may be generated at least partially by the first station designated as source for the connection, and/or they may be generated at least partially by the second station designated as destination for the connection. The source station, for example, may indicate a maximum available data rate. On the other hand the destination station knows what is the minimum and maximum data rate it can cope with at a given time.

In one embodiment, a connection signalling message is generated by the source station, modified by the destination station, and read by the other source stations to obtain the necessary information for the calculation. Where the network is a ring network comprising a series of point-to-point links, the modified message is received by the source station and repeated around the ring to ensure that all responsible stations have the necessary information.

The information exchanged and the set of rules may be comprehensive enough to have a capacity optimally taking into account portions of the ring where certain connections overlap or do not overlap. Alternatively, the rules may be simplified to ignore to some extent the potential capacity, and the exchange of information may be limited by time considerations. For example, where first and second connections overlap at one part of the ring, and the second connection overlaps with a third connection at another part of the ring, the calculation performed by the source station for the first connection may or may not take into account restrictions on the allocation to the second connection, caused by its overlap with the third connection.

The allocation may be varied from time to time, either periodically or as and when new connections are established or old connections deleted.

The connection signalling messages can be exchanged via a dedicated channel, or a general control message channel, depending on the amount of information to be exchanged (which is related to the number of connections) and the time available for establishing or revising the allocation.

According to a seventh aspect of the present invention, plural variable rate channels are established in a common frame structure, by allocating the same fields of each frame to a given channel throughout a block of frames, adapting the allocation of fields to channels for each successive block of frames.

The allocation may be determined by use of the sixth aspect of the invention, by command of a central controller, or otherwise. Each block of frames may be referred to as a rate control period or source data block. The block structure for this purpose may be independent of any other block structure.

A packet structure can be imposed within each variable-rate channel if desired for a given application. Nevertheless, the invention in this aspect ensures that some data for each channel arrives with each frame, substantially alleviating buffering requirements at source and destination.

According to an eighth aspect of the invention, there is provided a local communication system comprising a ring network conveying a source data in both variable rate and fixed rate channels, by means of a regular frame structure, each frame providing a fixed number of source data fields, wherein each field can be reserved dynamically to form part of a fixed rate channel which uses the same fields in each frame for the duration of a connection, and at other times can be allocated to form part of a variable rate channel whose width varies during the life time of the relevant connection, and wherein, when a plurality of variable rate channels of non-zero width are established, each frame carries at least some data for every channel.

According to a ninth aspect of the invention, there are disclosed embodiments of a method of communication wherein a plurality of stations interchange data via a ring network in accordance with a plurality of logical connections established within a shared data channel, each connection carrying data from a first station designated as source for that connection to at least one second station designated as destination for that connection, such data being subject to a delay at one or more intervening stations relative to a frame sequence of the ring network, the method comprising:

(a) defining a succession of rate control periods;

(b) determining, in advance of a first rate control period, a first channel bandwidth for each of the plurality of connections, the first channel bandwidth imposing a maximum data rate on the corresponding connection;

(c) during said first rate control period establishing a respective channel for each connection in accordance with the determined first channel bandwidth;

(d) during said first rate control period transmitting data for each connection via the respective channel at a rate up to said maximum data rate;

(e) determining in advance of a next rate control period a new channel bandwidth for each of the plurality of connections, the new channel bandwidth imposing a new maximum data rate for the corresponding connection for said next rate control period; and (f) repeating steps (b) to (e) for said succession of rate control periods, wherein a rate transition period corresponding to said delay is included at the end of each rate control period and, in the event that the new channel width determined in step (e) is reduced relative to the first channel width, data is transmitted according to the new maximum rate during said rate transition period.

In an tenth aspect, the invention provides a local communication of system wherein a plurality of stations interchange data via a shared network medium carrying a regular frame structure, each frame providing a fixed number of data fields, and wherein a block of plural frames is established for the allocation of source data fields between a plurality of channels, the allocation being variable between blocks, wherein each successive station wishing to reserve an allocation of capacity places a header in a free field of the first frame in a given block, the header indicating directly or indirectly a next free field in accordance with the number of fields per frame reserved by the source device for its channel, each successive source station around the ring inserting its header to reserve an allocation of fields for the duration of the block at the free field position indicated by said header, such that fields are allocated to channels contiguously within each frame.

According to an eleventh aspect of the invention, there is provided a local communication system wherein a plurality of stations interchange data via a shared network medium, wherein a regular frame structure, each frame providing a fixed number of data fields, and wherein a block of plural frames is established for the allocation of source data fields between a plurality of connections, wherein each station acting as a source station for a connection reserves an allocated number of fields in each frame, and wherein each source station is responsible for removing the allocation of fields to a connection whose furthest destination station precedes the source in ring position.

The source station may for this purpose maintain a table of the positions of the final destination for each connection. A table of connection ID, source and destination addresses may be built from control messages received when the connection is first established. The connection ID alone need then accompany the data in real time.

According to a twelfth aspect of the invention, in a local communication system wherein plural stations communicate by the exchange of message frames addressed to one another, such messages competing for capacity in a common channel, there is provided a method of signalling occupancy of a message reception buffer of at least one particular station, whereby other stations wishing to send a message to that station will not attempt to do so during occupancy of that station's reception buffer.

While signalling of buffer occupancy for all possible destination stations might constitute an unacceptable overhead in network capacity, it has been found that, in many applications, that a large proportion of messages are in practice addressed to one particular station (a control centre, a gateway to another network, etc). The signalling of buffer occupancy for this particular station will avoid a large number of failed message transmissions by other stations, thereby freeing a far greater network capacity than the overhead required for the buffer occupancy signalling. Messages to stations other than the special station can then be more quickly delivered.

The buffer occupancy signal may be provided in an arbitration field of each message frame, or in a separate signalling channel. Buffer occupancy can in general be signalled by one or more special stations by modifying a predetermined field within messages generated by that station or other stations, rather than a field outside those messages. Where the message frames are generated empty by a system master station, the station whose buffer occupancy is signalled may be the master station.

BRIEF DESCRIPTION OF THE DRAWINGS

Embodiments of the invention will now be described, by way of example only, with reference to the accompanying drawings, in which.

DETAILED DESCRIPTION OF THE EXEMPLARY EMBODIMENTS

Background

The various aspects of the invention will be illustrated by reference to examples of "Double Speed" and "High Speed" network systems. The D2B Optical system (referred to herein as "single speed"), will first be briefly described, as background.

Figure 1:
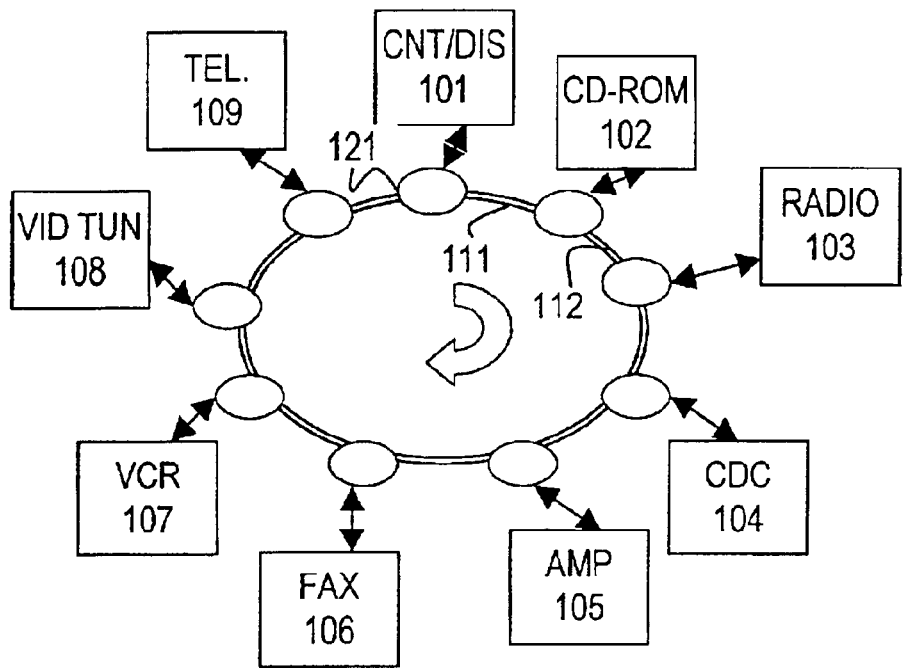
FIG. 1 shows in block schematic form a known local communication system embodying the D2B Optical (Single speed) system.

The known (single speed) system illustrated in FIG. 1 comprises nine audio- or video-related apparatuses 101–109 connected as stations (or nodes) of a Local Area Network (LAN). Of course more or fewer than nine stations may be accommodated. In this example system, the apparatuses are: a control and display unit 101, a Compact Disc memory (CD-ROM) reader 102, a radio turner 103, a CD changer unit 104, an audio power amplifier 105, a facsimile send/receiver unit (FAX) 106, a video recording system (VCR/CAMCORDER) 107, a video tuner 108, and a telephone 109.

The display function of the control and display unit 101 may for example provide for display of information read from memory devices by CD-ROM and/or display of video signals from tuner 108 or VCR 107.

The LAN interconnection in the known system comprises nine unidirectional point-to-point fibre optic links 111, 112 etc. linking interface modules 121 etc., each of which is substantially structurally identical, such that the nodes are all connected in a ring. Each fibre optic link carries a combination of digital audio/video signals, CD-ROM data and control messages in accordance with a signal frame structure to be described in detail below. A designated station (referred to hereinafter as the system master), such as the control/display unit 101, continuously generates the frame structure at a frame sample rate of 20–50 kHz (typically 44.1 kHz as for CD sampling). One station on the network is designated to act as system master on power-up although the role of system master may subsequently be re-allocated to another station, for example in fault conditions.

Figure 2:
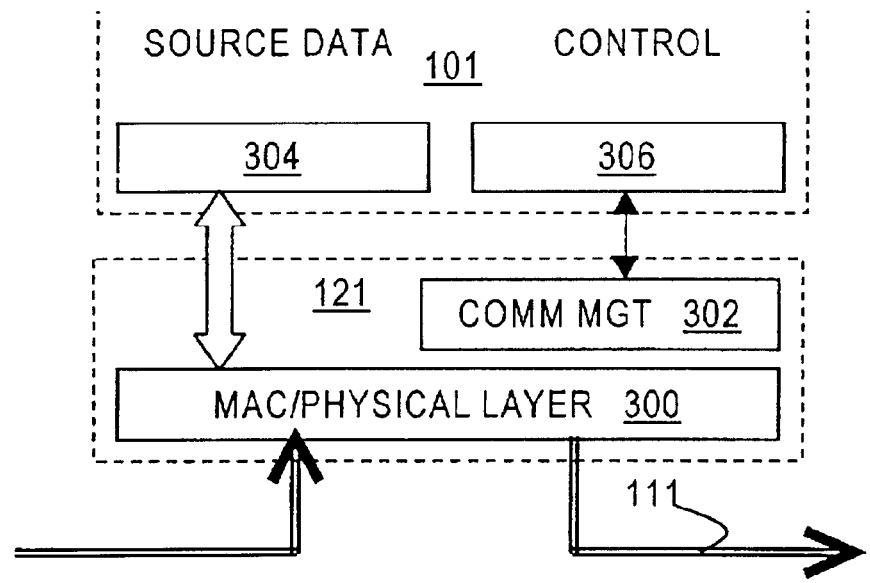
FIG. 2 illustrates the control and source data architecture used in the system of FIG. 1.

The implementation of a station's interface to the fibre optic ring is schematically illustrated in FIG. 2. From the ring 119–111, a media access control (MAC)/physical layer 300 (to be described in greater detail hereinafter) together with a communications management layer 302 for control messages are provided in interface module 121. The communications management layer 302 manages address initialisation and verification and ensures the reliable transport of messages by retransmission according to defined timing rules. Data handling for source data 304 and application protocols for control messages 306 are provided at station level 101, with the application protocols typically defining a device/subdevice grouping and control hierarchy for the station, the format of information exchanged between products, the behaviour of devices/subdevices, and application level timing. It will be readily understood that the interface module 121 may be physically within a station, for example in the form of the Conan integrated circuit or similar network transceiver and associated control software.

Figure 3:
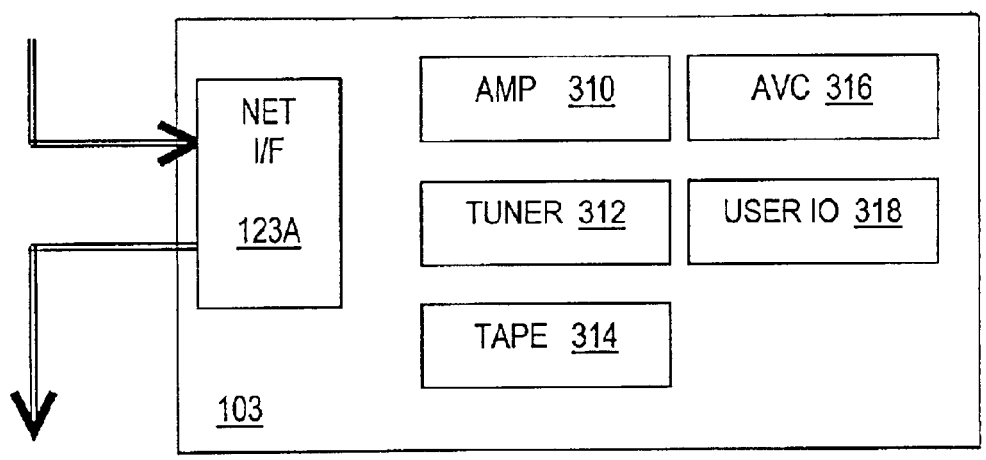
FIG. 3 represents a station with integral interface.

As shown in FIG. 3, where the interface module 123A is provided as one function within a radio cassette player 103 having also amplifier 310, tuner 312, tape playback deck 314, audio/video controller (AVC) 316 and user I/O 318 functions. These functions and their interconnections are not shown and have no direct bearing on the present invention. Their implementation will be readily apparent to those of ordinary skill in the art.

Figure 4:
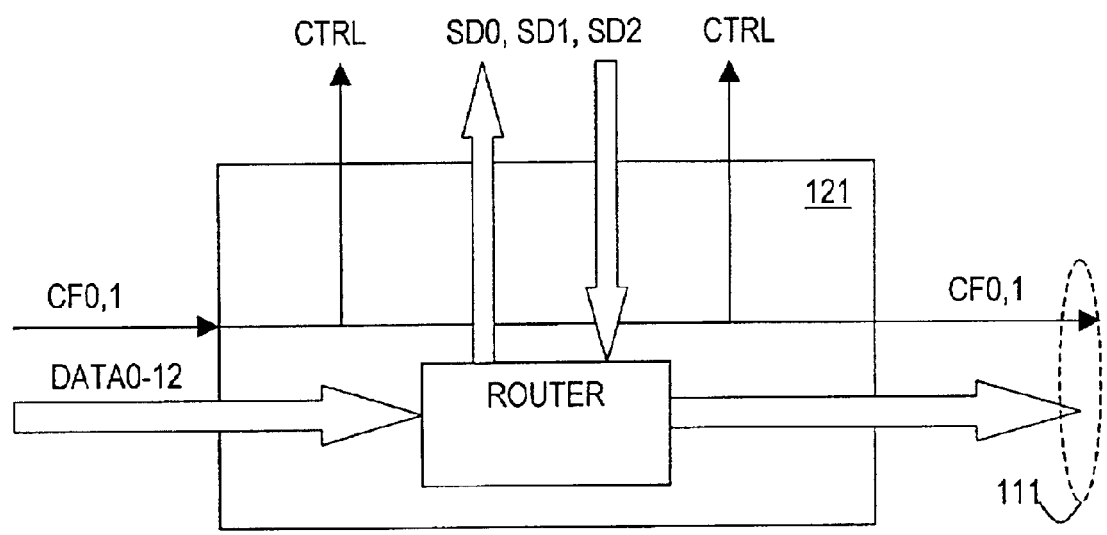
FIG. 4 schematically illustrates one of the interface modules of FIG. 1.

FIG. 4 is a schematic representation of an interface module (in this case node 121) linking a station to the known fibre optic ring. All stations connected to the LAN can generate and/or receive source data (up to three channels SD0–SD2) and control data (CTRL). The control data is of low volume, arrives in burst and is user/event driven (for example user instructions or status changes), whereas the source data is a continuous high volume stream (for example audio, compressed video, CD-ROM data).

In the known D2B Optical system (hereinafter referred to as 'single speed'), the source data and control messages are transported on the network from node-to-node in frames generated by the System Master. Frames are circulated at the same rate as the audio sample frequency, typically $f_S$=44.1 kHz. Frames are grouped into blocks of 48 frames.

Figure 5:
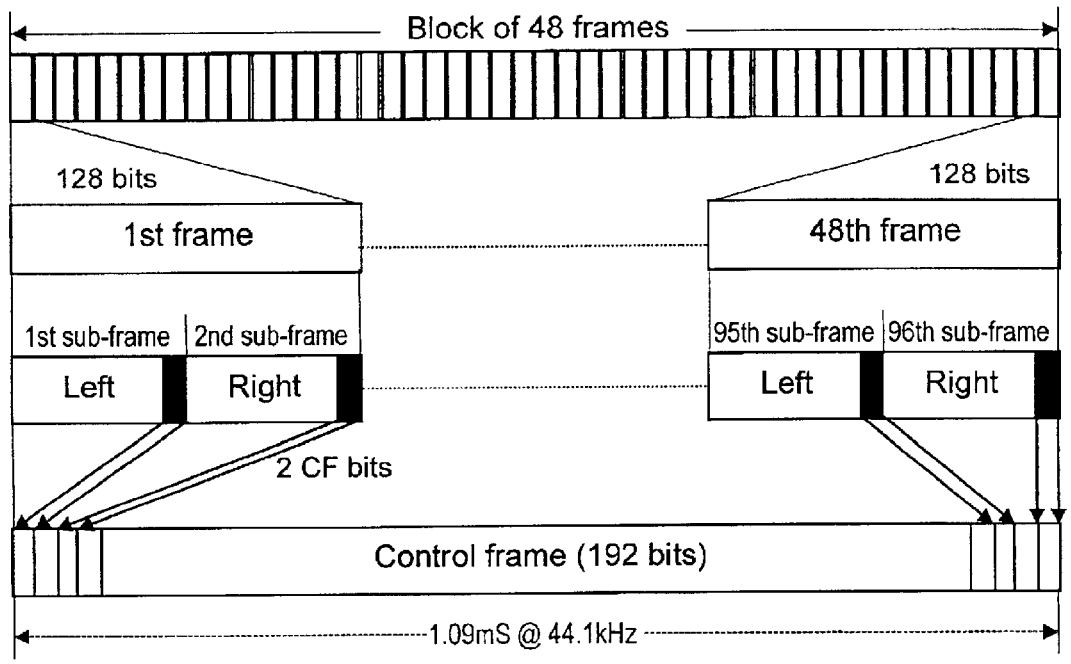
FIG. 5 shows the frame structure of digital signals transmitted according to the known single speed format between the apparatuses in the system of FIG. 1.

FIG. 5 shows how each single speed frame is divided into two subframes ('left' and 'right'). At $f_S$=44.1 kHz, there will be 88,200 subframes per second. The left subframe is always the first of the pair transmitted on the network. At the physical level, bits are transported with bi-phase encoding. The relationship between the block, frame, subframe and control frame is shown in FIG. 5.

Figure 6:
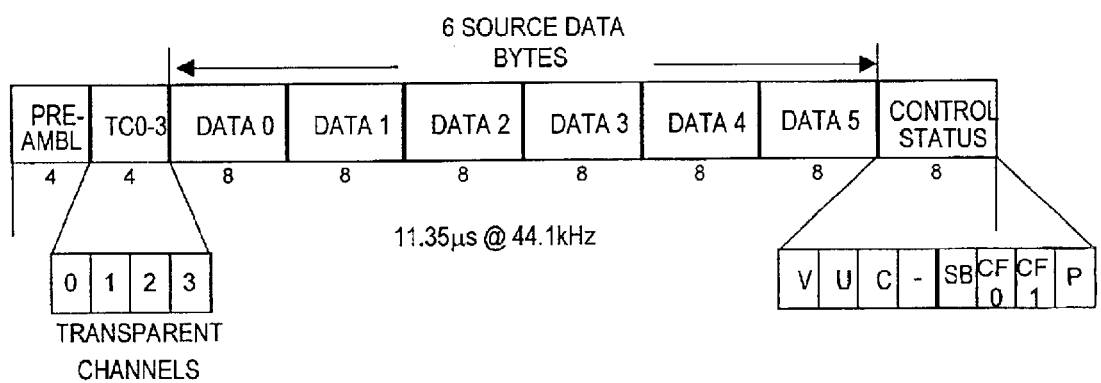
FIG. 6 shows the sub-frame structure of digital signals transmitted according to the known single speed format between the apparatuses in the system of FIG. 1.

FIG. 6 shows how each subframe contains 64 bits, handled within the transceiver as 8 byte fields. The fields comprise the preamble, the transparent channels, 6 bytes of source data, and 8 control/status bits which make up the control frames and the SPDIF status bits. The meaning of the various fields will be described in more detail laser in relation to the Double Speed protocol. Further detail is also available within the Conan Data Sheet referred to above.

Double Speed Network

Figure 7:
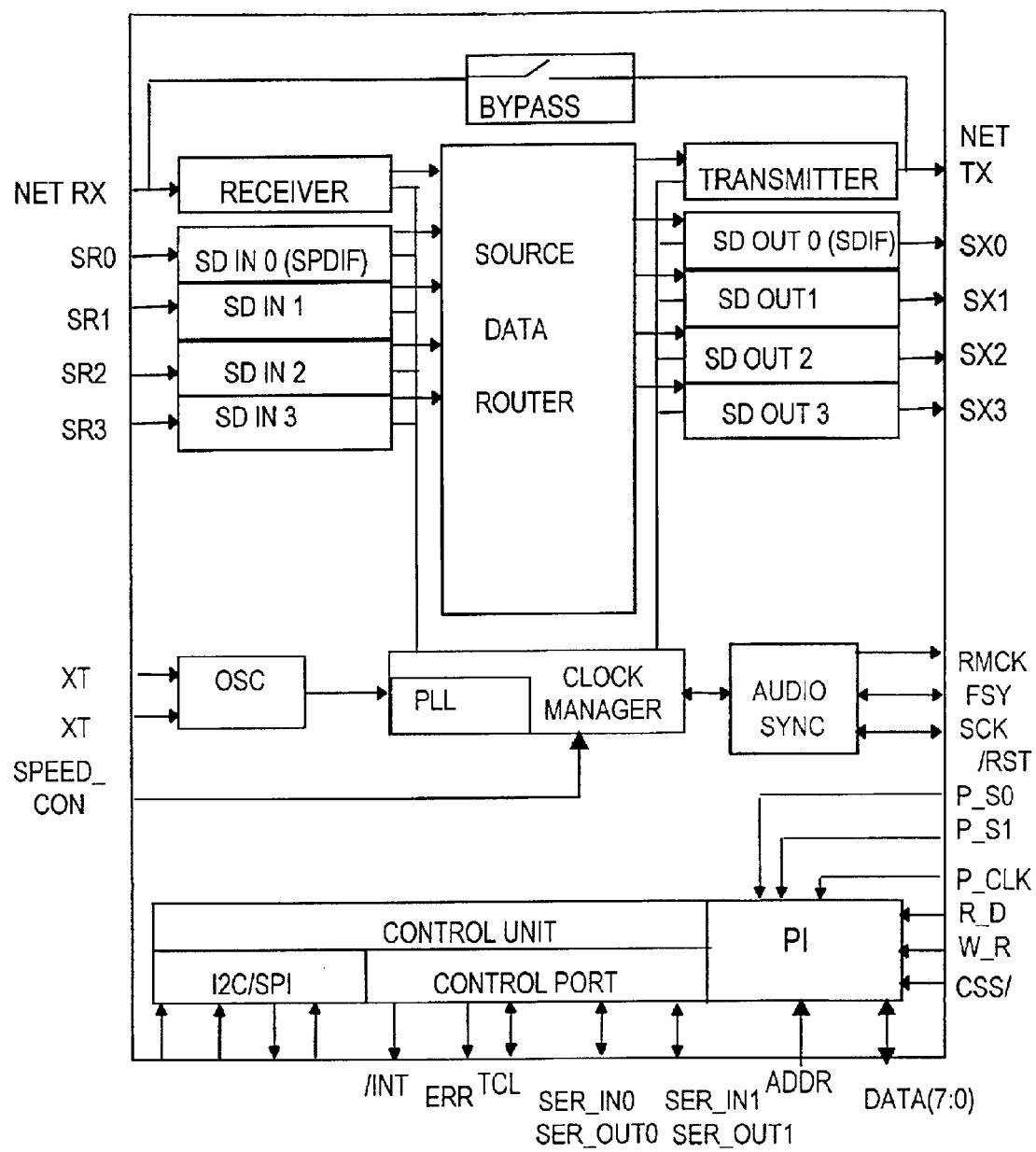
FIG. 7 is a functional block diagram of a double speed network transceiver according to the present invention.

FIG. 7 shows in block form more detail a proposed transceiver integrated circuit, implementing the double speed protocols. It should be appreciated, however, that the block diagram illustrates the functional units of the transceiver, and these can be implemented in a number of ways. For example, the transceiver functions can in principle be implemented entirely or substantially by programming of a sufficiently powerful micro-processor, rather than by hardware. In the present implementation, the functions are implemented by special hardware controlled by a RISC processor running under control of a program stored on chip.

Electrical signals received from the optical fibre are detected, decoded and buffered by a network receiver block. Similarly a network transmitter block is provided to drive the optical transmitter for the next segment in the ring. All communications between one station and its neighbouring stations in the ring therefore effectively pass in serial form through the pins NET RX and NET RX. Four ports SR0–SR3, are provided for source data in serial format to be provided to the transceiver for transmission via the network. Similarly, source data outputs SX0–SX3 are provided for source data recovered from the network to be supplied to the various functional units of the apparatus in question. Between the network receiver and transmitter and the various source data ports, a source data router allows control over the routing of source data throughout the network and internally of the present station.

The entire network is synchronised with itself and with the sample rate of source data (when active), by means of the master station clock and the phase locked loop (PLL) working in the transceiver of each station. In particular, the PLL at each station around the ring recovers the serial data clock from the network signal at pin RX and generates timing signals for control of the apparatus, and for onward transmission at pin TX. For functioning as a master station, a crystal oscillator is provided. The clock manager comprises counters and registers suitable for adapting the functions of the entire circuit to different data rates, and for generating clock signals appropriate to other components within the device. An audio synchronising unit provides clock signals to external audio signal processing circuitry, such as a CD player mechanism. In the case where, for example, a digital audio broadcast is to be received, the audio synchronising unit may receive clock signals to act as the master clock for the entire network.

A speed control pin provides input to the clock manager, for use in providing compatibility with D2B Optical networks in a manner to be described hereinafter.

Finally, within the transceiver, a control unit provides various interfaces for microprocessor control of the network transceiver. Standard serial interfaces 12C/SPI are provided for serial control. A novel parallel interface provides for parallel control functions and/or source data output. Within the control unit, various functions and options within the transceiver are controlled and reported to the controlling microprocessor (not shown) via a number of dedicated registers, in a conventional manner. A control port provides access to the transparent channels of the Plus network.

The function of each pin is specified in Table 1 below. Some pins are omitted from the drawings, for clarity.

TABLE 1

| Pin Name | I/O | Function |
| --- | --- | --- |
| /RST | In | Reset (active low) |
| RMCK | Out | Received Master Clock |

TABLE 1-continued

| Pin Name | I/O | Function |
|---|---|---|
| PLL_LOCK | Out | PLL Lock Indicator |
| STB | Out | Start of Block |
| SPEED_CON | In | Conan/Super Conan Speed Select |
| VDDP | In | Power Rail - Digital IO Pads(+5 V) |
| VSSP | In | Ground - Digital IO Pads |
| XTO | Out | Crystal Out |
| XTI | In | Crystal In |
| P_S0 | In | Parallel/Serial Interface Select 0 |
| P_S1 | In | Parallel/Serial Interface Select 1 |
| VREF | In | PLL Voltage reference (and reset timing) |
| FILT | — | PLL Loop filter |
| VSSA | In | Ground - Analog |
| VDDA | In | Power Rail (+5 V - Analog) |
| RX | In | D2B Network Receive |
| ERROR | Out | Error Indicator |
| TX | Out | D2B Network Transmit |
| VSS2 | In | Ground - Digital Core |
| VDD2 | In | Power Rail - Digital Core (+5 V) |
| MP_WAIT | Out | Wait Output from Parallel Interface |
| D0–D7 | In/Out | Bi-directional Data Bus between processor and PI |
| A0–A3 | In | Input Address Bus to Parallel Interface. |
| P_CLK | In | Microprocessor Clock for PI |
| /MP_RD | In | Input read strobe to PI (active low) |
| /MP_WR | In | Input write strobe to PI (active low) |
| /MP_CCS | In | Input chip select to PI (active low) |
| PKT_IN | In | Packet Input Flag |
| PKT_OUT | Out | Packet Output Flag |
| CS_AD1 | In | SPI Chip select or I2C address select |
| SDIN_AD0 | In | SPI data in or I2C address select |
| SCL | In | I2C and SPI Clock |
| SDOUT_SDA | In/Out | SPI data out or I2C data |
| /INT | Out | Interrupt Output (open drain) |
| SR0 | In | Source Data Input Port 0 |
| SR1 | In | Source Data Input Port 1 |
| SR2 | In | Source Data Input Port 2 or High Speed Data Input |
| SX0 | Out | Source Data Output Port 0 |
| SX1 | Out | Source Data Output Port 1 |
| VDD1 | In | Power Rail - Digital Core (+5 V) |
| VSS1 | In | Ground - Digital Core |
| SX2 | Out | Source Data Output Port 2 or High Speed Data Output |
| SER_IN1 | In | Transparent Port Input 1 |
| SER_OUT1 | Out | Transparent Port Output 1 |
| SER_IN0 | In | Transparent Port Input 0 |
| SER_OUT0 | Out | Transparent Port Output 0 |
| FSY | In/Out | Frame Sync |
| SCK | In/Out | Shift Clock |
| TCCLK | Out | Transparent Channel Clock Out |

The new transceiver is designed to allow inter-operability with existing (single speed) D2B Optical products constructed for example around the Conan D2B Optical interface device (C&C Electronics Part Number OCC8001), while allowing higher data rates if wanted. A comparative list of the key performance benefits of the new "Double Speed" transceiver compared to D2B Optical is as follows:

Source data rate is increased from 4.2336 to 9.867 Mbps (or 10.57 Mbps if using. High Data Rate Mode for Source Data). This is of course somewhat more than "double".

The number of Serial Source Data Channels accessible from each interface transceiver is increased from three to four.

The D2B Optical clocking and synchronisation mechanisms (master-slave sync using PLL) are maintained with no additional connections.

The new transceiver provides the ability to select between Serial interface such as 12C/SPI or standard Microprocessor 8-bit Parallel Interface for control data as well as a total of 4 source Ports (SR0 to SR3) for serial or Parallel Interface. The data rate of the 12C control port is increased to 400 kHz and that of the SPI control port to 2 MHz.

The frame structure of D2B Optical is maintained while doubling the source data capacity.

Figure 12:
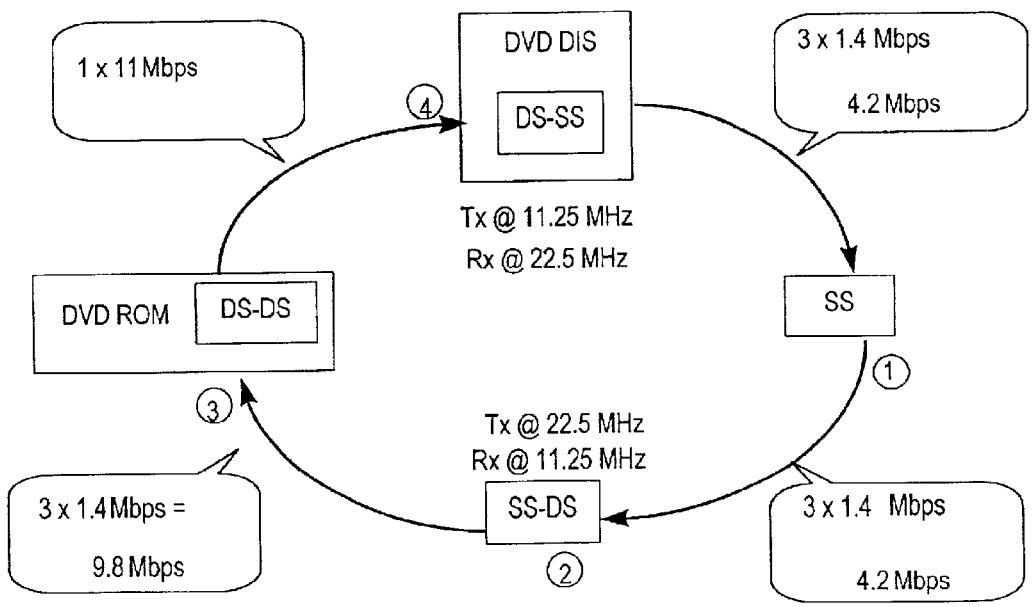
FIG. 12 shows schematically a ring network incorporating different formats in different segments using the transceiver of FIG. 7.

The new transceiver with these features enables networks which mix nodes based on either single speed (D2B Optical) or the new double speed transceiver to be constructed, as shown in FIG. 12, and described later with reference to FIGS. 13 and 14.

Frame Structure

Figure 8:
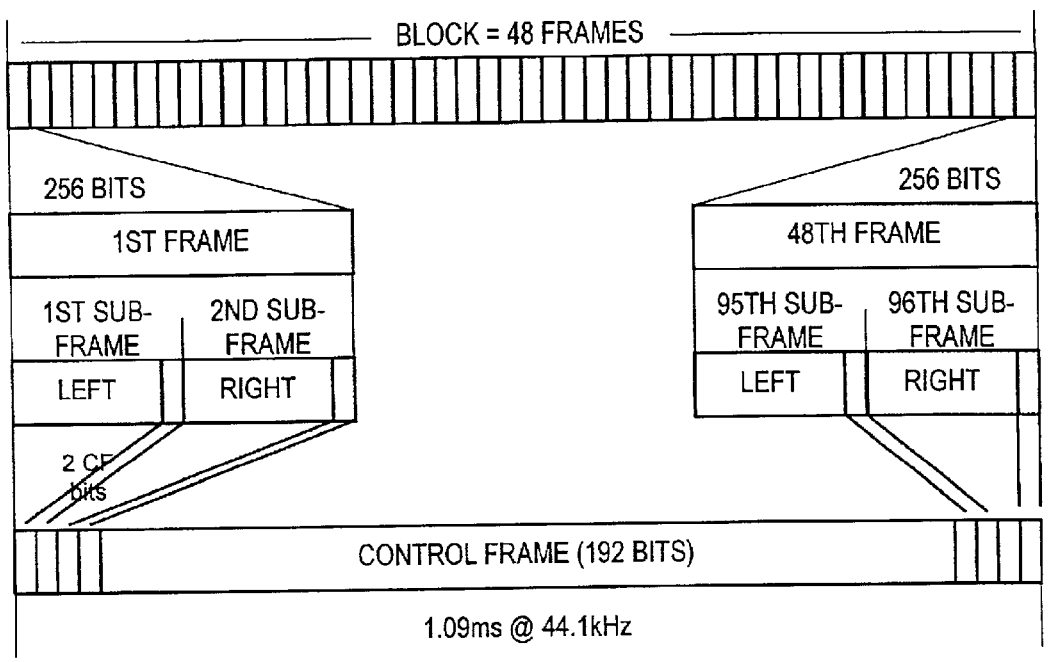
FIG. 8 shows the frame structure of digital signals transmitted according to the novel double speed format using the transceiver of FIG. 7.

FIG. 8 shows the relationship between the block, frame, subframe and control frame in the double speed network protocol. As in the D2B Optical system, the source data and control messages are transported on the network from node-to-node in frames generated by one station designated as the System Master. Frames are again circulated at the same rate as the system sampling frequency, typically f, =44.1 kHz. Frames are grouped into blocks of 48 frames. The frame is again divided into two subframes ('left' and 'right'). At f, =44.1 kHz, there will still be 88,200 subframes per second. The left subframe is always the first of the pair transmitted on the network. At the physical level, bits are again transported with bi-phase encoding.

The primary difference is that each subframe contains twice as many bits (128), with an encoded frequency of 22.5 MHz instead of 11.25 MHz (approx).

Figure 9:
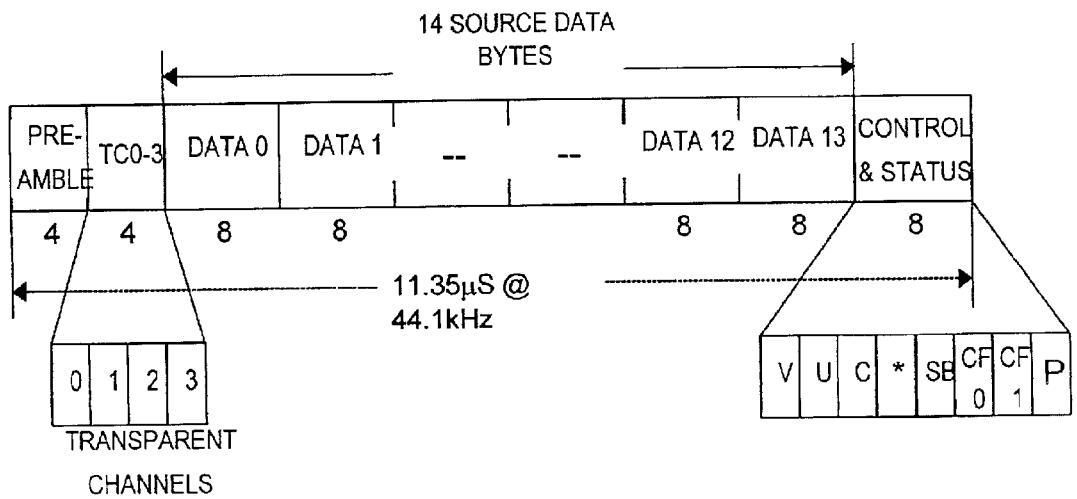
FIG. 9 shows a first sub-frame format in the system of FIG. 8.

FIG. 9 shows the new subframe structure for a network (or network segment) operating in the Normal Rate mode. Each subframe contains 128 bits, handled within the transceiver as 16 byte fields. The fields comprise the preamble, the transparent channels, 14 bytes of source data, and 8 control/status bits which make up the control frames and the SPDIF status bits. The meaning of these fields will be described below.

Figure 10:
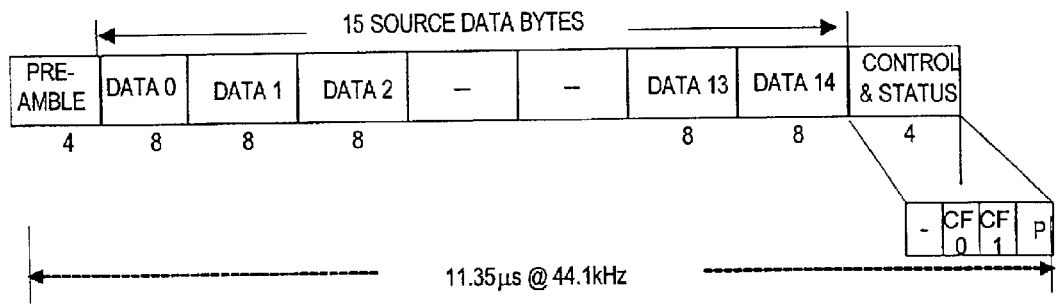
FIG. 10 shows a second sub-frame format in the system of FIG. 8.

FIG. 10 shows the Double Speed subframe structure for a network (or network segment) operating in a special High Rate mode for maximum source data capacity. Each subframe still contains 128 bits, handled within the transceiver as 16 byte fields. The fields comprise the preamble 4 Bits, 15 bytes of source data, 2 Control Frame (CF) Bits and Parity Bit. The extra byte of source data is gained by removing the four transparent channel bits and the SPDIF status bits.

The fields of the subframe structure are:

Preamble: The preamble synchronises the network receiver. There are three types of preamble, identical to those defined in the IEC-958 (SPDIF) specification. They contain bi-phase coding violations which the receiver can recognise. The three unique preambles identify left, right and block subframes. The left preamble identifies the beginning of a frame and the block preamble identifies the beginning of a block. The block preamble replaces every 48th left preamble. This provides a block structure to which the control frame data is synchronised.

Transparent Channels: The four TC bits enable the transport of four serial channels for proprietary control or status information on the network, with no additional hardware or software overhead. The use of these channels can be left open to system designers, who must define their own protocols for applications.

Typical applications include the transport of raw control or status information, such as RS232-type data, VICS data, GSM data, PIN Card data, etc.

Source Data Bytes: The source data bytes carry the high-volume real-time digital source data. The bytes may be allocated flexibly, so that the devices in a system may use the source data bytes in the most efficient way for that system. The mechanism used for allocating the bytes is described below in the section headed Source Data Routing. Additional mechanisms can be provided for asynchronous data transport and flow control in these bytes.

Status Bits: If an SPDIF (IEC-958) channel is being transported (using the ports SR0 and SX0 of the transceiver circuit), the V, U and C bits of the Double Speed subframe contain the validity, user and channel status bits of the SPDIF channel. The left/right convention of these bits is determined by the left/right preambles. The Start Block bit SB identifies the block boundary of a synchronous SPDIF channel and is set after every block of 192 frames (synchronised with the SPDIF signal that is being transported). This synchronisation is performed automatically by the transceiver chip. The Parity bit P generates even parity for the entire subframe.

Figure 11:
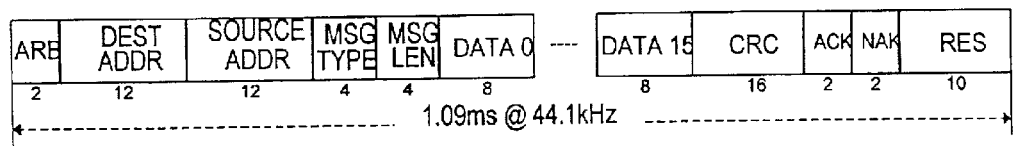
FIG. 11 shows a control frame format common to the systems of FIGS. 1 and 8.

Control Bits: The control bits CF0 and CF1 carry the control messages (for controlling devices and sending status information). There are 2 CF bits per subframe, and a control frame is 192 bits long, therefore 96 subframes (48 left+48 right) are required to build-up a complete control frame. The control frame is shown in FIG. 11 and is the same for Single Speed Optical and Double Speed segments.

As shown in FIG. 1, the control frame is assembled from and aligned with a block of 96 subframes, i.e. the first two bits of a new control frame are taken from the subframe with a block preamble, and subsequent pairs of bits are taken from subsequent subframes to build up a control frame. The control frame is identical to that of D2B Optical, allowing control messages to pass seamlessly between Single Speed and Double Speed segments of the network.

The fields of the control frame are:

Arbitration bits: These indicate if the control frame is free or occupied. The transceiver handles these bits automatically.

Destination Address: This is the 12-bit device address of the destination of the message, in the range '000'H to 'FFF' H. The sending device writes this into its message transmit buffer for transmission. Certain addresses and address ranges have special meanings.

Source Address: This is the 12-bit device address of the sender of the message, in the range '000'H to 'FFF' H. The receiving device can read this from its message receive buffer after reception. Certain addresses and address ranges have special meanings.

Message Type and Length: Two 4-bit fields normally used to indicate the type/length of the message. These bits are transported transparently by Conan.

Data 0 to 15: The message data. All 16 bytes are always transported. The

Message Length normally indicates how many of the 16 bytes are actually valid for the message. The sending device writes this into its message transmit buffer for transmission. The receiving device can read this from its message receive buffer after reception.

CRC: A 16-bit Cyclic Redundancy Check value used to verify that the control frame has been transported without error. The CRC is generated by Conan automatically on message transmission and checked by Conan automatically on message reception.

ACK/NAK: Acknowledge and Not Acknowledge (2-bits each) indicate successful message transmission. The use of separate ACK and NAK flags allow reliable point-to-point and broadcast message transport, as described in our application GB-A-2302243. The flags are automatically filled by the destination device(s) (if present) and read by the sending device.

Reserved: 10 bits are reserved for future definition.

Transceiver Parallel Interface

The key features of the parallel interface (PI) in the novel transceiver are as follows: An 8 bit data bus provides connection to external microprocessors. A 2 by 32 byte internal buffer is provided for read and write to the Double Speed network. Sustained source data rates up to 10.584 Mbps (1.323 Mbytes per second) (at Fs=44.1 kHz) as possible using the 15 byte per frame transfer mode of Double Speed network. The parallel interface can be used for control data, source data or both under control of external configuration pins (P_S0, P_S1). Packet based data is automatically accommodated in the source data channel, as will be described later. Packet start signals P_SO (output) and P_SI (input) are provided in support of packet data handling for applications that require it.

Two 32×8 bit on-chip RAMs (not shown explicitly in the functional diagram of FIG. 7) are used in order to assure a constant interrupt rate, equal to the network "sampling" frequency (50 kHz maximum). The top 16 words in the RAM (A[7]=1) contain source data for the "Right" subframe, whereas the 16 bottom words are allocated to "Left" subframes. Each of these memory partitions are further divided in 4-byte cells, allocated to every source port (SP0, SP1, SP2), if running in Normal Rate mode. In High Data Rate mode the whole buffer is allocated to the Source Port 3. The 16th byte (address 01111/11111) is only used in conjunction with packet-based data. In that case, a hexadecimal 0×00 indicates a vacant packet slot (subframe). A 0×01 (or indeed any number whose LSB is 1) will identify a used packet slot.

At any one time, one of the two RAMs is assigned to serve the internal RISC processor of the transceiver, while the other is dedicated to the external microprocessor (not shown). Both the external device and the internal processor have direct access to these memories, by means of a full crossbar 2×2 switch. The RAMs are swapped whenever an interrupt is asserted. This operation is transparent to both the external device and the internal processor.

The external microprocessor communicates to the PI through an interrupt request line, an 8-bit bi-directional data bus DATA(7:0), a 4-bit address bus ADDR(3:0) and three registers: STATUS, ADDRESS and DATA. See Table 1 for a summary of those pins associated with the parallel interface PI. An ADDRESS register is used to store the address of the internal register that is accessed. All data is exchanged via the DATA register.

The general operation of the parallel interface is not relevant to the present invention, and will not be described further.

Source Data Handling

To maximise the application versatility of the chip, three serial source data ports are provided. This means that a product which needs to process source data for more than one internal source or destination can do so with only one transceiver chip. These source data ports can transfer 8, 16, 24 or 32 bit source data, left or right adjusted, in to and out of the device.

The source data ports provide access to the source data in the network bit-stream. Data can be input and output serially through seven serial inputs (SR0 to 3) and seven serial outputs (SX0 to 3) or using the Parallel Interface. When in serial mode all seven ports use a common frame synchronisation FSY and a serial bit clock SCK. FSY and SCK may be set as either inputs or outputs, depending on the external hardware. If they are configured as inputs, then the data source(s) must be clocked by RMCK to be synchronised in frequency to the network bit-stream (although not necessarily in phase). A special mode is provided which allows source data Port as SPDIF (SR0/SX0). With the control bits in a Source Data Port Control register, a variety of source data formats can be selected.

Like the Conan interface circuit the present transceiver maintains a Routing Information Table (RIT) which determines the connection between the various source data ports and bytes within the source data fields of the D2B Optical or Double Speed frames.

Figure 13:
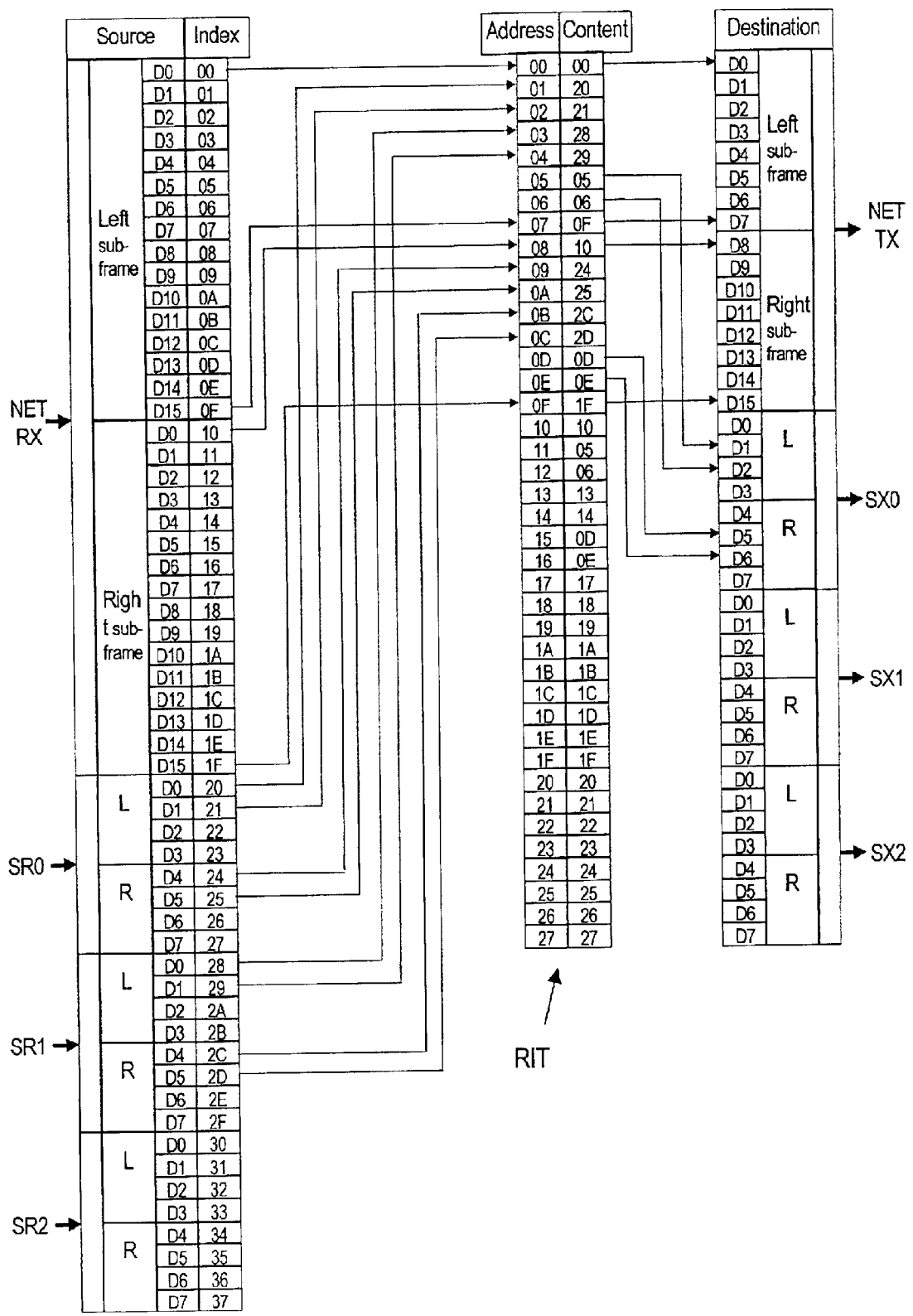
FIGS. 13 and 14 illustrate source data routing in the transceiver of FIG. 7.

FIG. 13 shows an example of routing through the Routing Information Table in the case where the transceiver is transmitting in D2B Optical format (11.2896 Mbps) and receiving in Double Speed format (22.5792 Mbps). Some, but not all active connections are shown by arrows, for clarity.

Figure 14:
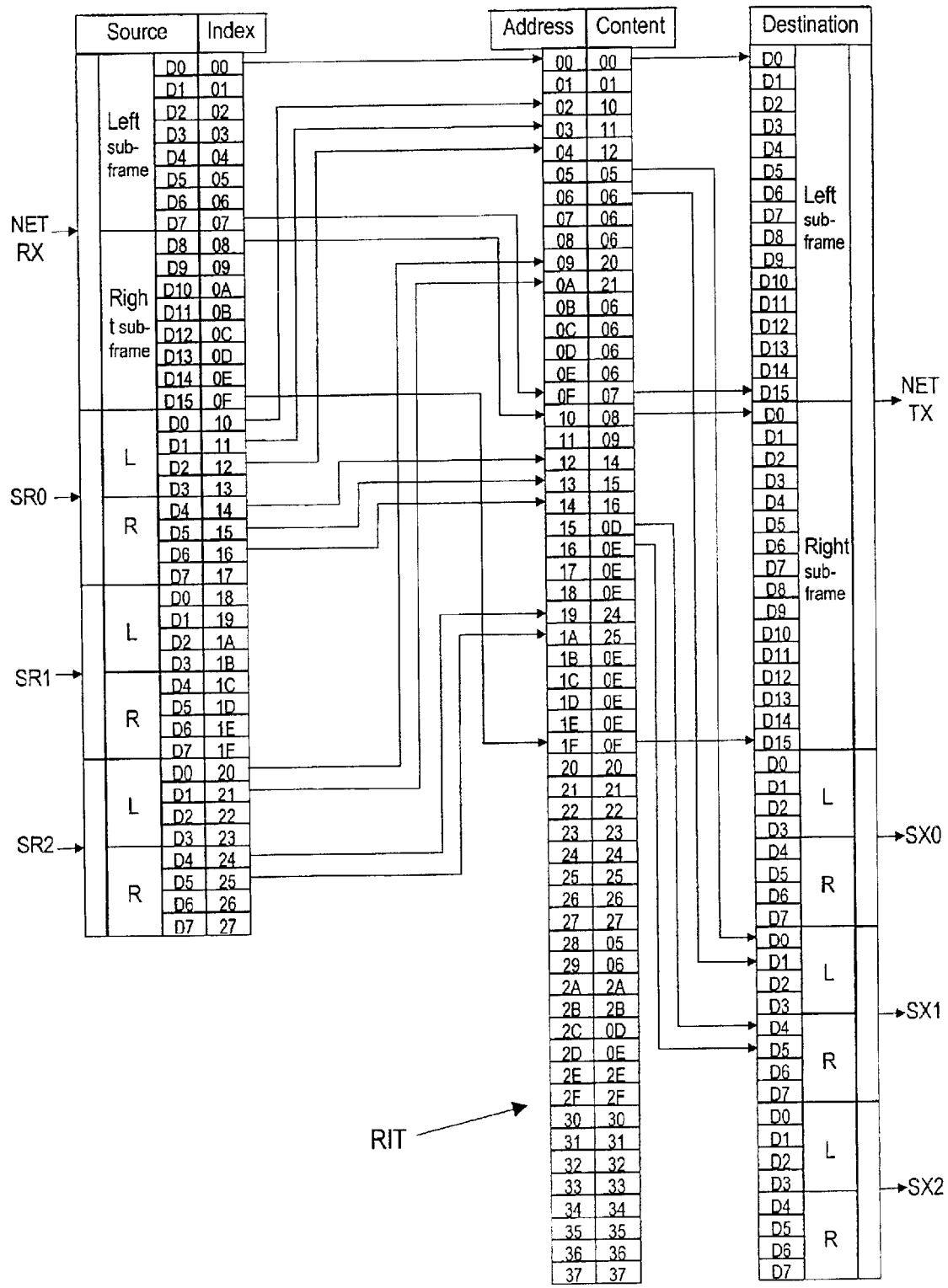

FIG. 14 shows an example of routing in a reverse situation, when a transceiver is receiving from a single speed (D2B Optical) segment and transmitting to a double speed segment. Again, not all connections are shown by arrows, for clarity.

It will be seen that the RIT has an entry corresponding to each byte field on the "output" side, which includes equally bytes of the frames being transmitted to the network and bytes output within the network station from the ports SX0–SX2 of the transceiver. The value stored for each entry in the RIT acts as an index to identify the source of the data for the output, which may be a byte field of the incoming network segment, or a byte field from one of the source data ports SR0–SR2.

In the example of FIG. 13, two 16-bit stereo signals are input to the transceiver at ports SR0 and SR1, and output to the D2B Optical network segment in bytes D1–D4 (left) and D9–D12 (right) of the network subframes. Four other byte wide channels are passed straight through from the incoming network segment to bytes D0, D7, D8 and D15 of the following segment. Two 16-bit stereo channels are retrieved from the incoming network signal and output from the transceiver port SX0.

Source data is always transmitted and received MSB first in each byte.

Asynchronous Data Transport

Asynchronous data is data whose rate of delivery is not matched on a frame level with the transport provided by D2B Optical. This situation applies in the following cases:

where the source cannot provide continuous output where the source output is not matched with the nearest available D2B Optical transport rate (calculated from: bytes-per-frame*frame-rate)

because of a variable rate of consumption in the receiver of the data.

Table 2 shows the various methods for transporting data in the Double Speed network and the data rates which are possible with these. The system is assumed to be operating at a frame rate of 44.1 kHz; "bps" means bits per second.

TABLE 2

| Type of Transport | Type of Data | Bit-Rate Range | Extra Hardware |
| --- | --- | --- | --- |
| Control Message Channel | Non-Real Time | 0 to ~8 kpbs | No |
| Transparent Message | Real/Non Real | 0 to ~40 kpbs | Yes |

TABLE 2-continued

| Type of Transport | Type of Data | Bit-Rate Range | Extra Hardware |
| --- | --- | --- | --- |
| Channel (per channel) | Time | | |
| Source Data (per frame byte) | Real/Non Real Time | 0 to 352.8 kpbs | Yes |

The control message is capable of supporting transport of non-real time data, using defined Data Transport Protocols. The data to be transmitted is segmented into control message frames which are transmitted then reassembled in the receiver.

At a frame rate of 44.1 kHz, the data capacity of the control message channel is (44100*4*16*8*192=) 11700 bits/seconds. However, due to a minimum interval of 10 milliseconds between message transmissions, the useable rate would be ~11 re-transmissions) the receiver of the data should be able to clear the Transceiver's receiver buffer within $T_{serve}$=25 milliseconds). A further limitation of data rate arises from framing overheads (25%), leading to a transfer rate of up to ~8 kbps.

Note also that the control message channel is not suitable for transporting real-time data since it is an asynchronous channel where the time to deliver a frame of data varies with:

the arbitration time (time take to find a free control message frame), which depends on the current bus loading, this would be of the order of a few milliseconds.

the time taken for the receiver to receive the message, which depends on how quickly the receiver reads its Rx and the number of other devices which are currently transmitting messages to that same device. Whilst the receiver remains busy a single frame could be delayed up to approx. 350 milliseconds (beyond which no further attempt would be made to retransmit the frame.

A generic mechanism for asynchronous data handling will now be described, which can be applied to the known single speed or double speed networks applications, where serial source data ports are used.

An asynchronous data stream can be matched to the synchronous flow on the network by the insertion of null data (padding), provided that:

the rate of the asynchronous data is lower than the rate provided by D2B Optical (any peaks above this rate must be absorbed by buffering in the source device); and the receiver can detect and separate the required data from the padding.

Two mechanisms are described for the insertion of padding:

1. Within the byte-stream of a source data connection, at sub-frame-level, where a flag (generated by the source) indicates whether the bytes for the specified connection in that sub-frame contain useful data or padding.

2. Within a packetised data stream, where packets can either be null (completely empty) or be partially filled. In this case the destination can use information in the packet header to separate the data from the padding.

Byte Stream Flow Control

Figure 15:
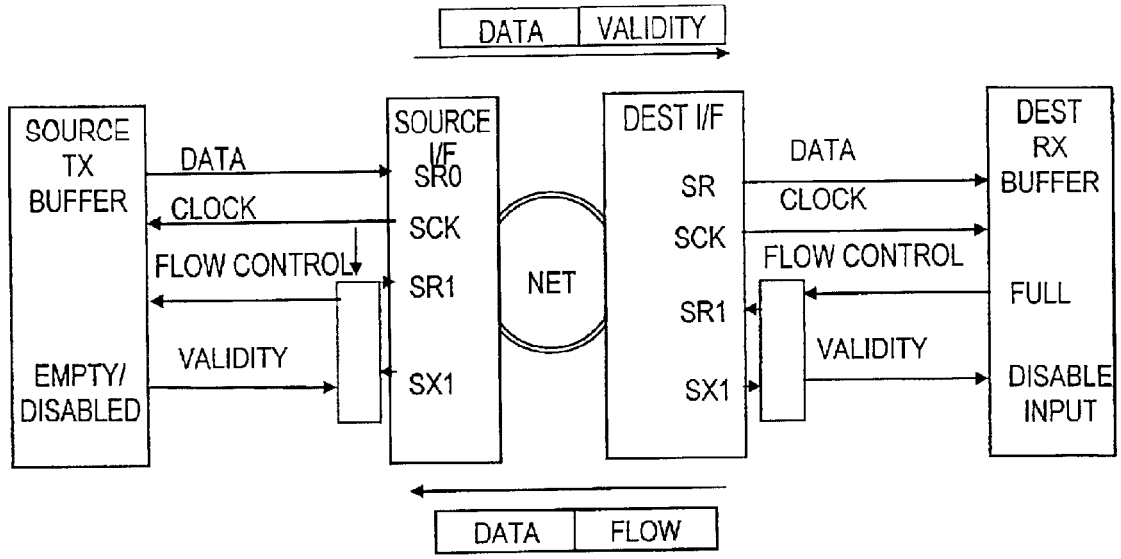
FIG. 15 illustrates a validity and flow control signalling using the transceiver of FIG. 7.

This mechanism, illustrated in FIG. 15, is relatively simple and can even be implemented with simple hardware attached to the Conan transceiver at the source and at the destination.

Each connection is allocated a number of source data channels within a subframe, in a conventional manner. At the same time as the connection is set up, however, a validity/flow control bit is reserved within the source data byte in one of the subframes. The bit is allocated for use only in conjunction with this connection and is used to signal Validity (from sender to receiver) or Receiver Buffer Full (from receiver to sender). Note that the same bit can be used for both functions (in different parts of the ring) because each ring segment is physically independent of the other segments.

Figure 16:
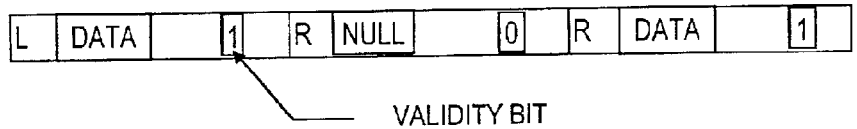
FIGS. 16 and 17 illustrate the provision of the validity/flow control bit in frames sent from the source to the destination station, and from the destination to the source station, respectively.

Referring to FIG. 16, when the bit is set by the source to '1' this indicates that the bytes allocated to the connection is this subframe are carrying valid data. '0' indicates that the bytes are not carrying valid data and may be ignored by the receiver (destination). Note that these bytes could be used for a non-real time signal which can make use of this otherwise unused capacity. This other signal would need to be identified during connection set-up.

Figure 17:
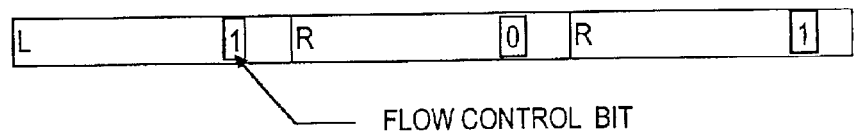

Referring to FIG. 17, when the bit is set to a '1' by the destination, it indicates that the destination's receiver buffer is now full. When the bit is set to a '0' it indicates that the destination's receiver buffer now has space for at least the number of bytes which are delivered within 1 subframe (fixed when the connection is set-up).

Allowance should be made for the number of frames which are already in the course of transmission around the ring. This means that the full indication may need to be replaced by e.g. a half full warning so that capacity remains for the bytes which are in transmission. The number of bytes in transmission depends on the number of used per frame (for this connection) and on the number of devices with open source data bypasses between the source and the destination devices. To this must be added the delay in the source receiving the flow control flag, which depends on the number of devices with open source data between the destination and the source.

The total latency (in bytes): L=(number of sources*2) *number of bytes per frame, where the System Master is always counted as a source.

This latency can be determined when the system starts up by placing a recogniseable marker in the source data field of the D2B Optical frame and observing the number of frame delay before it is received back by the sending device. This total frame delay can then be reported to all other devices via a control message.

Figure 18:
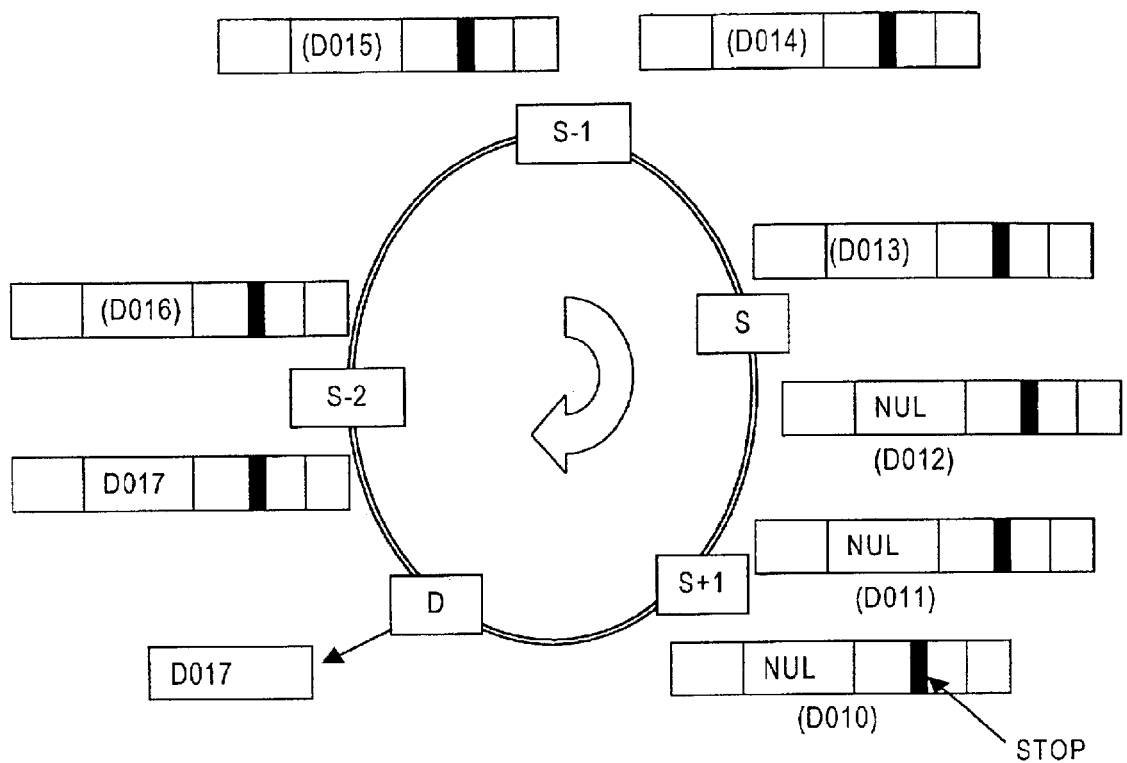
FIGS. 18 and 19 illustrate an alternative mechanisms of flow control signalling in a ring network.

This is illustrated in the example of FIG. 18. Destination station D receives a series of data bytes D00, etc from a source S. Other sources in the ring S+1, S-2 and S-1 introduce latency through their receive and transmit buffers, represented in the figure. Station D is a slave station only, with regard to source data, and introduces no latency. The total latency can be seen to be 8 frames for source data.

In the state shown in FIG. 18, destination D has anticipated that its received buffer will be full by the time data D017 arrives. Accordingly, eight frames earlier (when receiving data D010) destination D has asserted its stop signal in the flow control bit field, and has maintained a stop signal in such good fields. This has been detected and, instead of data fields D018 etc, source S has inserted null data (for example zeroes) in the relevant frames.

Figure 19:
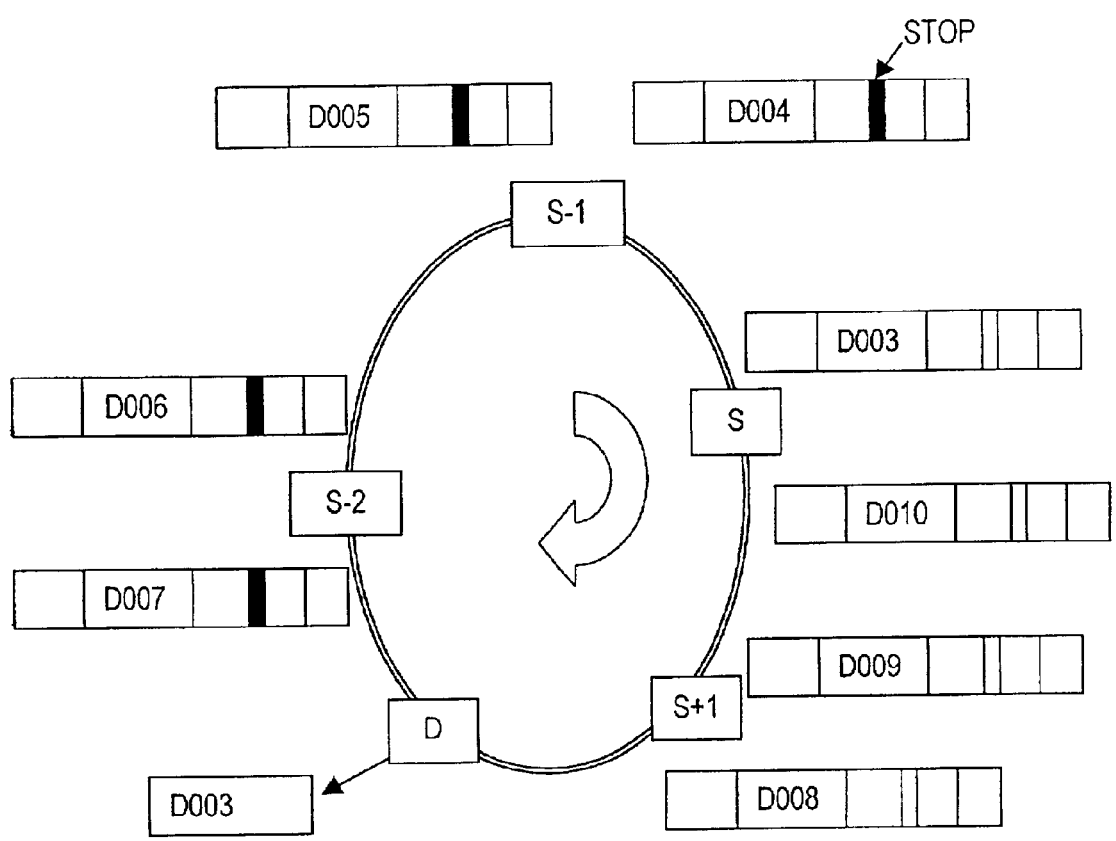

In the alternative mechanism shown in FIG. 19, destination D has no need to anticipate its buffer full state in the light of a known latency for the ring. Instead, the receive and transmit buffers of all the source stations are used as a holding buffer for the data which D cannot accept. Note that this requires the connection to be established through all segments. (In FIG. 18, the relevant source data fields can be used for other connections between station S-2 and station S.)

In the state represented in FIG. 19, data packets D000 to D0110 have been sent by the source station S. Destination D has recognised a buffer full condition after receiving data D003. Only at that point has the stop flag been asserted in frame carrying D004 and subsequent frames. Source S, upon detecting the stop signal will simply repeat data D004 etc into subsequent frames upon detecting its stop flag, destination D can recognise the data D004 and detect latency. When its buffer is again free, the data D004 etc will be accepted and the stop flag cleared.

Packet Framing

Figure 20:
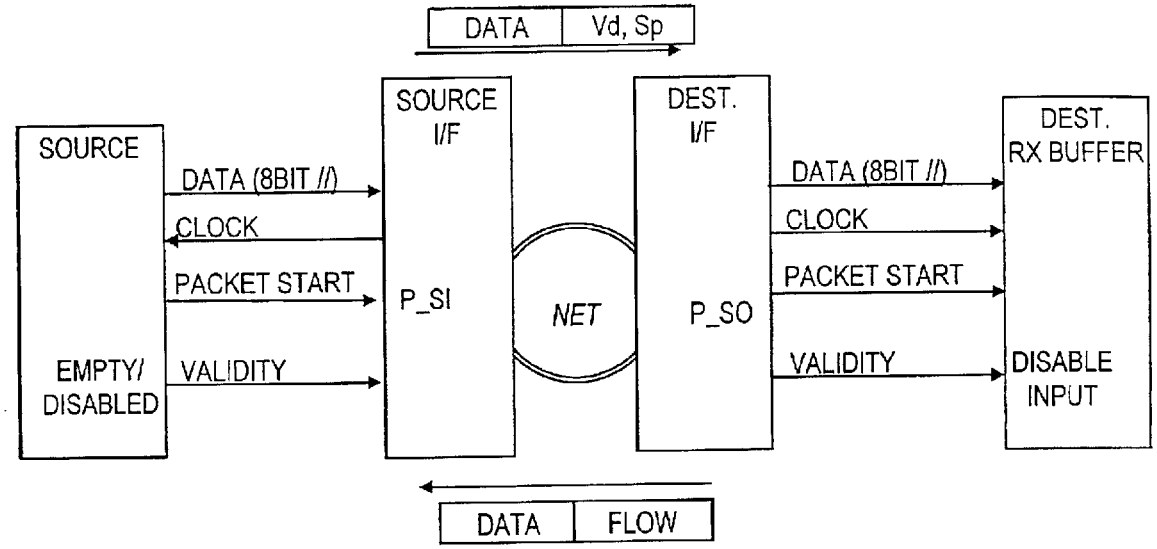
FIGS. 20 to 23 illustrate the handling of packet data in fixed-rate channels of the network.
Figure 21:
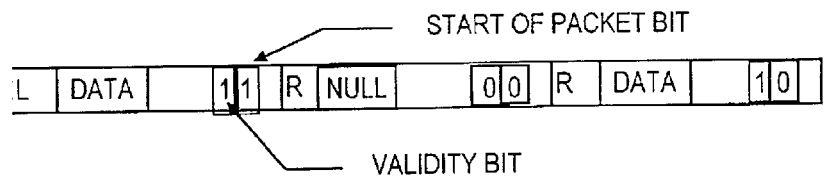

Referring to FIGS. 20 and 21, in addition to the simple validity/flow control mechanism described above, it is possible to use an extra bit in a subframe to indicate whether that subframe contains the start of a packet. If set to '1' then the subframe contains the start of a packet, in which case the packet will start with the first byte (of the allocated bytes) within that subframe. This bit is set by the sender of the data and read by the receiver.

The Double Speed network transceiver of FIG. 7 supports packet transfer over the network. The data source within the source station supplies data to the sending Transceiver via the parallel port and indicates the start of each packet via a pin P_SI. The destination within the destination station can retrieve the packets from the receiving Transceiver via its parallel port with the start of packet being indicated via the P_SO pin.

Figure 22:
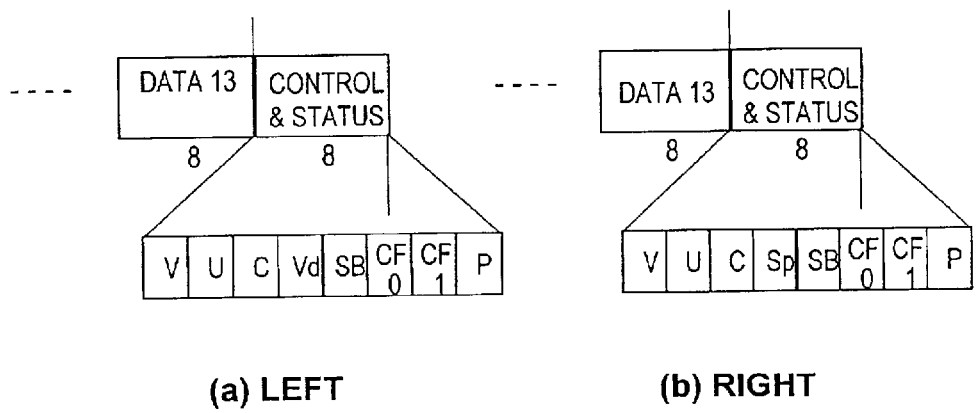

As shown in FIG. 22, the Validity and Start of Packet bits are allocated 1 bit in alternate subframes, following the VUC (S/PDIF) bits, as shown below.

The validity flag (Vd) is set to '1' when the source data for the asynchronous connection (contained in that frame) is valid. When the validity flag is set to '0', the data is not valid.

The Start of Packet (Sp) is set to '1' when the start of a new packet for the asynchronous connection (contained in that frame) has occurred in the left subframe. When the validity flag is set to '0', the data is a continuation of an existing packet.

Figure 23:
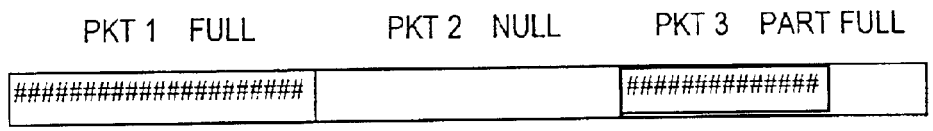

As illustrated in FIG. 23, at the packet level the rate of data delivery can be regulated by inserting null or partly filled packets. These data flow reduction mechanisms can be used either where the source has insufficient data to supply (empty Tx buffer) or where the receiver has notified the source that its buffer is (nearly) full and thus no more data can be accepted. When the receiver buffer is (nearly) full, the receiver can signal this either via dedicated flow control bit such as that describe (Byte Stream Flow Control) above or via the Connection Signalling message.

Asynchronous Data Transport in High Data Rate Mode

Referring again to FIG. 10, in order to allow the maximum data rate in the High Data Rate Mode, space is not allocated for validity signalling within the source data bytes field. There is further only one signalling bit available in the last nibble of each sub-frame, outside the data field area (* in FIG. 10).

Figure 24:
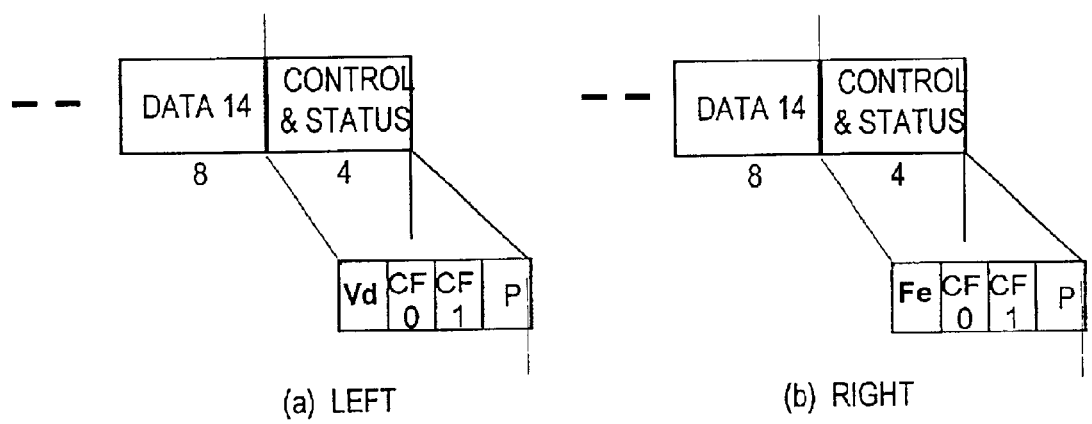
FIG. 24 illustrates validity and frame error signalling in a high data rate mode of the double speed network.

FIG. 24 shows how this bit field is allocated in the High Data Rate mode of the Double Speed network. In the left sub-frame (FIG. 24(a)), a Frame Occupied flag Vd is present, by which the source station for the source data connection signals whether the frame as a whole contains valid data, so as to allow padding of asynchronous data in units of one frame (30 bytes). In the right sub-frame (FIG. 24(b)), a Frame Error flag Fe is present, which is set and reset by stations in the same manner as the Sub-frame error flag Se, but signals a risk of error in all the source data of the frame, rather than only one sub-frame.

Error Protection

The following sections explain the effects of bi-phase conding errors on each field in the subframe as shown in the FIG. 9, and measures taken to protect against errors where necessary.

Preamble: Errors in this field affect the ability of a receiver to recognise the start of the Frame/CF Block. The effect of errors are reduced by ignoring a single erroneous preamble, by the transceiver by counting bit periods from the previously received preamble.

It is also possible for bit errors in another part of the frame to form a false preamble but this is avoided by the transceiver only looking for a preamble only during the expected time-window, once lock has been established.

Control Message Field: Each Control Message is protected with a 16-bit CRC. Thus an error in a control message can be detected by the receiving device. When receiving device detects a control message error, it sets the NAK bit to notify the sender of the message and then disposes of the message.

S/PDIF bits (VUC and SB): An error in the V (validity) bit could cause a problem for: the destination of the S/PDIF source data connection, which might wrongly interpret the received source data. For example, if the validity bit changes to not valid this could cause a digital to analogue converter to be muted in an audio amplifier.

The effect of an error in the User bit (U) is a function of the application.

The Channel Status (C) is organised into blocks of 192 bits, each of which is protected with an 8 bit CRC.

An error in the SB bit will cause a dislocation of the Channel Status and User Bits, possibly resulting in the loss of all these data up to the next valid start of block.

Each subframe is protected with a parity bit P which all the device receiving the frame to check whether an error has occurred during the transmission from the preceding node. The node detecting the parity error should not rely on any source data or transparent channel data within the affected subframe since the error could have affected these. However, the parity bit is generated anew at each node of the ring, and so the information about such errors is not propagated around the ring.

Error Protection of Source Data

There are two types of source data connection in the double speed networks:

Synchronous Connections: these are connections which use the full capacity of the bytes allocated to the connection within each frame.

Asynchronous Connections: these are connections which use a part of capacity of the bytes allocated to the connection within each frame. A connection such as this may be used to support 'DMA' data transfer between two devices on the network., or simply to adapt to an audio source of sample rate lower than the frame rate.

The effect of errors on the source data transported within source data connections is application dependent. For example bit-errors in a PCM audio connection can result in audible clicks.

The probability of a bit error occurring in a particular segment of a ring depends on the fibre optic transceiver (FOT) units, (or noise susceptibility of an electric cable).

Suppose the following figures apply:

| | |
|---|---|
| Probability of bit error in any segment | $<10^{-9}$ |
| Bits per frame | 256 |
| Bits per subframe | 128 |
| Bytes per frame | 32 |
| Frames per second | 44100 |

If a connection spans n segments and occupies x bytes of each frame, the probability (worst case) of a bit error occurring in any of these segments of a ring is approximately:

$(x/32)*n*10^{-9}$.

Consider an example of a connection which has been allocated 8 bytes per frame (for example data for a double-speed CD ROM) and spans 5 nodes (passes over 4 segments). The probability (worst case) of a bit error which affects this connection is approximately:

$(8/32)*4*10^{-9}$

At a bit-rate (for this connection) of $(44100*8*8=)$ 2.82 Mbits/sec, a single bit error affecting this connection is likely to occur once every $(1/(10^{-9}*2.82*10^6)=)$ 354 seconds.

To protect against such errors, the double speed network disclosed provides a degree of protection. While ideally the means of protection would apply separately to each source data connection, this is relatively costly to implement. A simple approach has been devised here to give a warning to each affected device that there might be an error in the source data within a particular frame or subframe. For this purpose a Subframe Error Flag has been defined which gives a warning of an error in a subframe.

Figure 25:
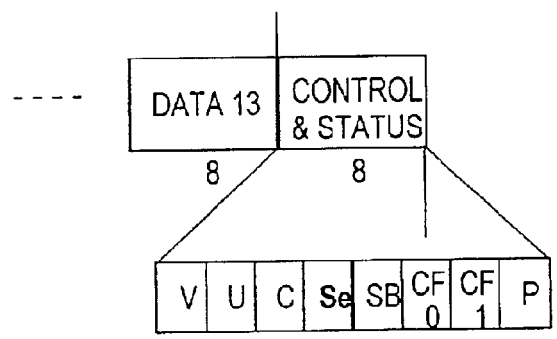
FIG. 25 illustrates source data error signalling in normal rate mode of the double speed network.

FIG. 25 shows the normal rate subframe (FIG. 9) modified to include a Subframe Error Flag (FIG. 9) modified to include a Subframe Error Flag Se (both left and right subframes). In the field marked "*" in FIG. 9 the Subframe Error flag Se is set to '0' by default when each subframe is generated until it receives a subframe with Se set to '1'. Master and Slaves will simply pass on the received value of the Se bit. When any device in the system detects a biphase error during the reception of a subframe, it must set the error flag to '1'. This error flag is subject to the same delay as source data and thus stays with the subframe until it reaches the device which set the Se flag to '1'. When the subframe reaches this device again, the device will reset Se to '0', unless it detects another error while receiving the subframe. Thus the device which sets Se to '1'must reset Se to '0' in the first received subsequent subframe where it finds Se set to '1'. Except for these circumstances a device is not allowed to modify the value of Se. All devices may use the value of Se as an indication whether there is a risk of an error in any source data that they are receiving.

Note that there is no protection against an error in the Se flag. The consequence of an error in this bit is that either:

the destination may encounter erroneous source data without warning (very low risk) or a destination may be given a false warning about a possible error in the source data within the accompanying subframe (more likely).

If a connection spans n segments the probability of a bit error affecting Se occurring in any of these segments of a ring is approximately:

$<(1/128)*n*10^{-9}$.

Consider an example of a connection which spans 5 nodes i.e. passes over 4 segments. The probability (worst case) of a bit error which affects Se in the segments spanned by the connection is:

$$(1/128)*8*10^{-9} = (1/16)*10^{-9}$$

Se bits occur at the rate of (44100*2=) 88.2 kbits/sec, a single bit error affecting an Se in the spanned segments is likely to occur once every $(1/((1/16)*10^{-9}*8.82*10^4)=)$ 181405 seconds (approximately 50 hours).

As described above with reference to FIGS. 15 to 22, validity signalling bits can be sent in parallel with source data to achieve asynchronous data transport. The novel transceiver implements error protection of the validity bits as follows.

In normal rate mode the number of separate asynchronous source data connections in any segment of the double speed ring is limited to four, given a single byte validity signalling connection. Since these source data connections carry asynchronous data streams they may contain padding from time to time. As described already, the presence of padding (instead of valid data) is indicated via a Validity flag which is allocated to each of the asynchronous connections when they are set-up.

If there are no asynchronous connections present in the ring, then the byte containing the validity flags will not be occupied in the double speed network frame.

If at least one asynchronous connection is present then the final byte of the right subframe (DATA 13 in FIG. 9) will be reserved for the validity flags, in each segment which forms part of the connection.

Figure 26:
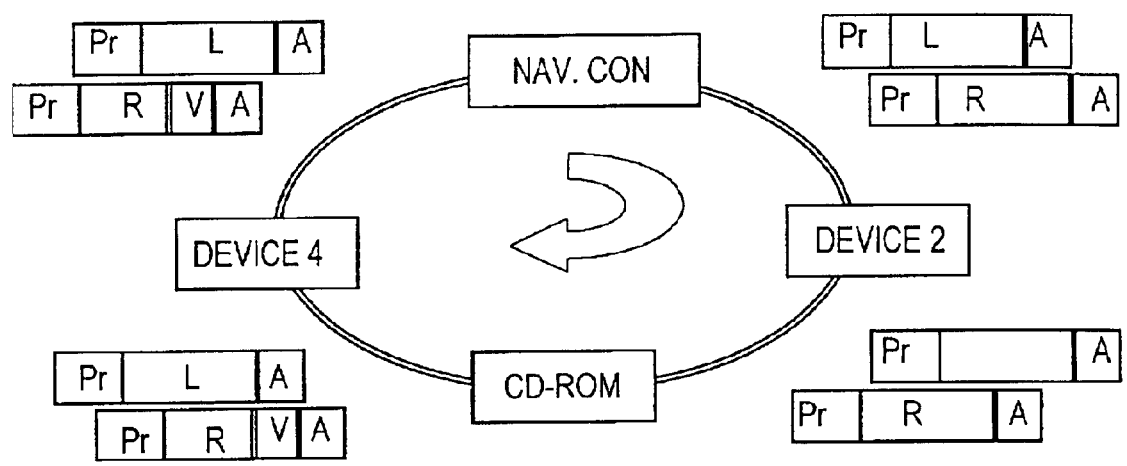
FIG. 26 illustrates the location of validity signalling in the normal rate frames of the double speed network.

In FIG. 26, L and R are used to denote Left & Right subframes, while V is used to denote the validity byte to be distinguished from the SPDIF V bit in the Control & Status field (FIG. 9).

Four validity flags are provided in this byte to allow up to four asynchronous connections to be present in any segment of the ring. The validity flags are automatically extracted by the destination transceiver and used to enable or inhibit output via the output port SX0–SX3 approximate to the respective connection. In this way, asynchronous communication is provided by the transceiver with only minimal buffering being required by the external device (and amplifier, for example) which is using the data.

Note that in this example it is the responsibility of the application to provide a mechanism for flow control i.e. if the destination needs to be able to regulate the data delivery.

As an example of the possible effect of this error, suppose that a navigation database is being read from a CD ROM over the network as shown in FIG. 26. Suppose that a bit error causes the allocated bytes in one frame to be marked as padding (when they are in fact data). Suppose that the database consists of a large array of records, then the effect of the error is to lose a field or part of a field from a record. Since the destination is unaware of this error, it will incorrectly align the received data, mistaking e.g. a telephone number for a map reference.

Figure 27:
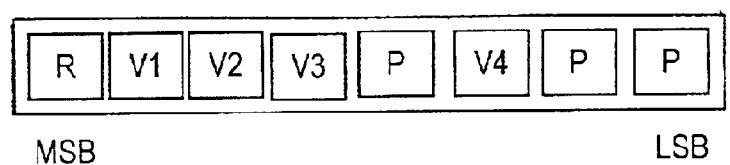
FIG. 27 illustrates the format of the validity signalling byte in the frame structure of FIG. 26.

To avoid this problem, the Validity Flags will be grouped into a set of four within one byte as shown in FIG. 27. Use of (7,4) Hamming code will allow both the detection and correction of a bit error affecting any one of the four validity flags. In the validity signalling byte shown in the Figure, R is a reserved bit, V1 to V4 are validity flags for respective connections, and P are bits added for error protection.

A non correctable error will only occur when two or more of the validity flag are in error. This is an extremely unlikely occurrence.

It will be appreciated that the "double speed" system described has various novel and useful features, while the various aspects of the invention are in no way limited to the particular examples described herein.

High Speed Network—Introduction

While the "Double Speed" Network described above provides a substantial increase in source data capacity compared with the Single Speed D2B Optical network, the examples described below provide a High Speed or "HS" network protocol, which further increases capacity. Such a network will provide for multiple high bit-rate, multimedia applications, such as MPEG audio, MPEG2 video, digital audio broadcasting (DAB), digital versatile disc (DVC) and other data, in addition to conventional CD, audio and the like.

User require for the HS network are broadly for the provision of synchronous, connection-oriented data transfer and also asynchronous, or variable rate data transfer. The network runs at a frame rate in the range 16 to 50 kHz. Specific frame rates which are currently foreseen are CD compatible at 44.1 kHz, DAB/DVD audio at 48 kHz and telephony audio at 16 kHz.

It may further be noted that the DVD system provides storage devices with a maximum of 17 GByte (compared with 680 MBytes for CD). Interactive video from DVD requires the exchange of control information. Typical image resolution corresponding to MPEG2 is 720 by 480 pixels at 30fps, all at 9.8 mbps maximum. Audio may be by Dolby AC3 5.1 with a 48 kHz sample rate, 448 kbps maximum rate, or by MBEG2 7.1, (48 kHz sample rate, 912 kbps) The average data rate for DVD is 4.69 Mbps, depending on content. A peak information rate of 10.08 Mbps is possible, but a peak system layer rate of 11.08 Mbps. It may be noted that the DVD system provides storage devices with a maximum of 17 GByte (compared with 680 MBytes for CD). Interactive video from DVD requires the exchange of control information. Typical image resolution corresponding to MPEG2 is 720 by 480 pixels at 30aps, all at 9.8 mbps maximum. Audio may be by Dolby AC3 5.1 with a 48 kHz sample rate, 448 kbps maximum rate, or by MBEG2 7.1, (48 kHz sample rate, 912 kbps!) The average data rate for DVD is 4.69 Mbps, depending on content. A peak information rate of 10.08 Mbps is possible, but a peak system layer rate of 11.08 Mbps. The DVD standard also specifies mapping of audio data streams to IEC 958 (SPDIF) connections.

One feature of the new data types is variable bit rate. In the prior art, it is proposed simple to adopt a packet structure, with token ring or other multiplexing protocols to allow a fair sharing of capacity between the various connections. This provides a fair and flexible allocation of capacity, but increases the need for buffering in source and destination stations, to ensure a steady flow of, for example, audio data at the output. The imposition of a packet structure on all types of data also brings unnecessary overhead. It has been proposed, for example, in U.S. Pat. No. 5,257,259 to combine both asynchronous packet—switched data and circuit-switched data in a "hybrid" network. The packet information in that case, however, appears to be relatively low volume (musical note commands such as MIDI data may be inferred). According to one proposal therein, packet data is merely carried in certain connections established within a circuit-switched network. Accordingly, the prior proposal does not appear to address the problem of sending large volume but variable rate data economically, and particularly relies on a full-blown packet-switching protocol for such data.

Various examples of a novel High Speed (HS) network will now be described. In particular, mechanisms will be described for providing variable-rate channels for both packet and general stream data with minimal overhead in terms of both network utilisation and buffering requirements.

Five examples will be presented with detail of allocation and capacity of flow control being described in particular with reference to Example IV Some terms will be defined to assist in the following discussion:

Variable rate connections: These are source data connection whose use of the source data capacity can be adjusted to meet the requirements of the application without wasting source data capacity. They enable an efficient sharing of capacity between a number of applications whose need for bandwidth varies from time to time. This type of connection is suitable for variable bit rate signals such MPEG-encoded video streams from devices such as DVD players. Variable rate connections are asynchronous in general.

Fixed Rate Connections: These are source data connection whose use of the source data capacity is fixed when the connection is set up and is guaranteed through the lifetime of the connection. This type of connection is suitable for fixed bit rate signals such as PCM audio. There are two types of fixed connection: synchronous and asynchronous.

Asynchronous Connection (Variable or Fixed Rate): The raw synchronous rate provided by channels within the HS network source data field can adapted (padded) to data streams which require lower delivery rates. The application may provide data for an asynchronous connection either at a constant rate or in bursts, subject to buffer capacities within the source and destination devices. The HS network also provides a mechanism for regulating the delivery of data over an asynchronous connection according to the demands of the destination rather than the source. For example a destination for CD-ROM data may consume data at a variable rate and can demand data whenever it needs.

Synchronous Connections (Fixed Rate): These are connections which take full advantage of the raw synchronous rate provided by channels within the HS network source data field. There is no packet overhead associated with this type of connection and thus it is a very efficient use of system capacity subject to the constraint that the source must provide data at a rate which matches the system frame rate and the destination must be able to consume the data at exactly this rate. This type of connection could be use to transport PCM audio from a DAB receiver to an audio amplifier, for example.

High Speed Network—Example I

Figure 28:
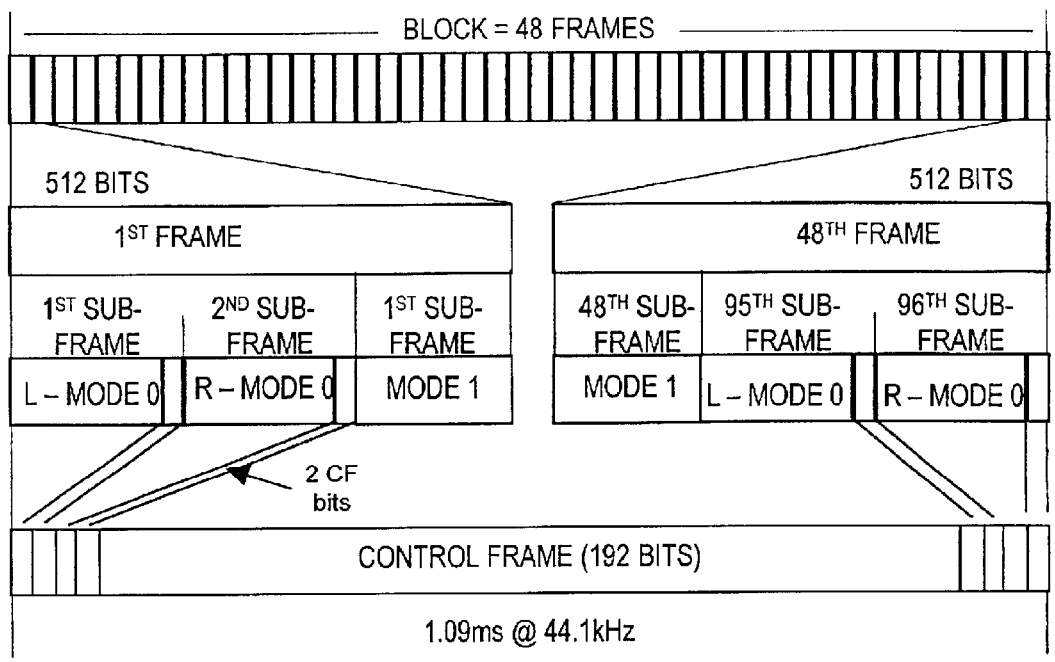
FIGS. 28 and 29 shows the frame structure in a first example of a High Speed network.

The frame structure for Example I is shown in FIG. 28. A High Speed (HS) network offers high speed variable bit rate channels ("mode 1" data) simultaneously with fixed rate charnels ("mode 0") compatible with known D2B Optical network and the Double Speed network described above. The total minimum source data rate in the first example is four times higher than the Single Speed D2B Optical network. For the asynchronous transfer mode 1, in Example I, the prioritisation of message and/or devices depends on the application. Backwards compatibility with Single Speed networks is preferred.

Referring to FIG. 28, the Example I has at its largest scale a block of 48 frames, at a frame rate for example of 44.1 kHz. Each frame comprises 512 bits. The frame comprises left and right mode 0 subframes and 32 data bytes of mode 1 subframe, in addition to synchronising and control information.

Figure 29:
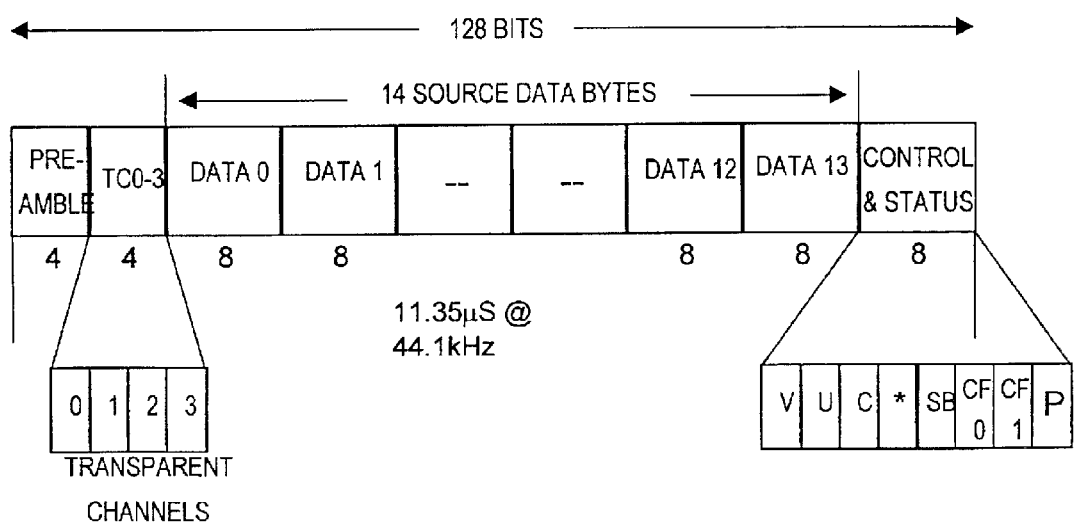

FIG. 29 shows in more detail the mode 0 subframe structure. Of which left and right versions are contained within each HS frame. It will be seen that the mode 0 subframe structure is identical to that of the double speed network described above, comprising a preamble, four transparent channel bits, fourteen source data bytes and a control/status byte. As shown in FIG. 28, two control bits CF0 and CF1 from each subframe form a control message frame every block of 48 HS frames.

The mode 0 subframe comprises simply 32 source data bytes, totalling 256 bits.

To accommodate the additional data at the same frame rate, the bit rate of the network segments is 22.5 Mbps, compared with 5.6 Mbps for the Single Speed network.

The mode 0 subframes can accommodate up to seven stereo CD audio channels compatible with the Double Speed frame structure. As in the known networks, each circuit-switched connection remains fixed in capacity throughout the duration of the connection, although it may be reallocated to different source data bytes as new connections are built.

The mode 1 subframes provide a continuous channel for packet switched data up to 12.288 Mbs at 48 kHz sample rate. At that sample rate, the gross data rate on the network segments is 24.576 Mbps, before line coding. ATM type protocols may be applied for allocating capacity between different sources in the mode 1 channel.

Alternatively, the control message channel could be used, subject to traffic and arbitration delays. Alternatively, a fast control channel can be created to allocate the capacity. This fast channel may for example use a dedicated packet 1 to allocate mode 1 capacity, at 384 kbps). Referring to DVD video delivery by MPEG2, the compression ratio for DVD is 12.7 to 1. A maximum of 41 kB per frame is required, corresponding to 218"PES" pay loads each of 188 bytes (IPES payload every 160 microsecond). In DVD video, inter-frame encoding drives the compression, so that the maximum rate of change of data rate is once per frame (approximately 30 ms).

Figure 30:
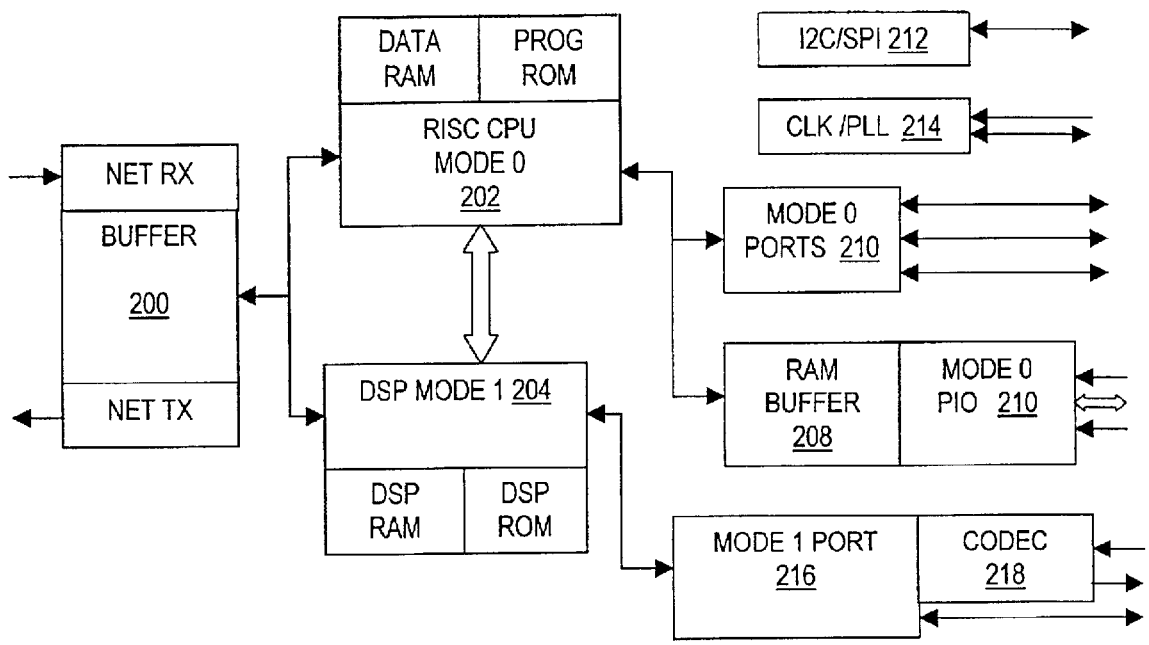
FIG. 30 is a block diagram of a network transceiver implementing the High Speed network frame structure of FIGS. 28 and 29.

FIG. 30 shows the architecture for a High Speed (HS) network transceiver. At the left hand side the network reception and transmission inputs are shown (NET RX, NET TX) coupled by a shared buffer memory 200 capable of storing two complete sub-frames (512 bits each). Dual processors are provided in this Example. The first processor is a RSIC processor 202, which implements the D2B Optical control messaging, and data routing for the fixed rate channels (mode 0). The second processor 204 is a High Speed digital signal processor (DSP) which handles the asynchronous/variable rate data. In addition to routing the data, the DSP can implement functions such as sample rate conversion, audio DSP (such as Dolby AC3 encoding). Each processor 202, 204 has access to the shared buffer memory 200, and has its own data RAM and program ROM. Associated with the mode 0 processor 202, are mode 0 source ports 206, a swinging RAM buffer 208 and a parallel port 210, corresponding to components of the Double Speed transceiver described above with reference to FIG. 7. An 12C, SPI control port 212 and clock generator including PLL 214 are similarly provided. For the mode 1 data, a separate source data port 216 incorporating the standard DVD serial interface is provided. An audio CODEC 218 provides analogue audio inputs and outputs.

High Speed Network—Example II

Figure 31:
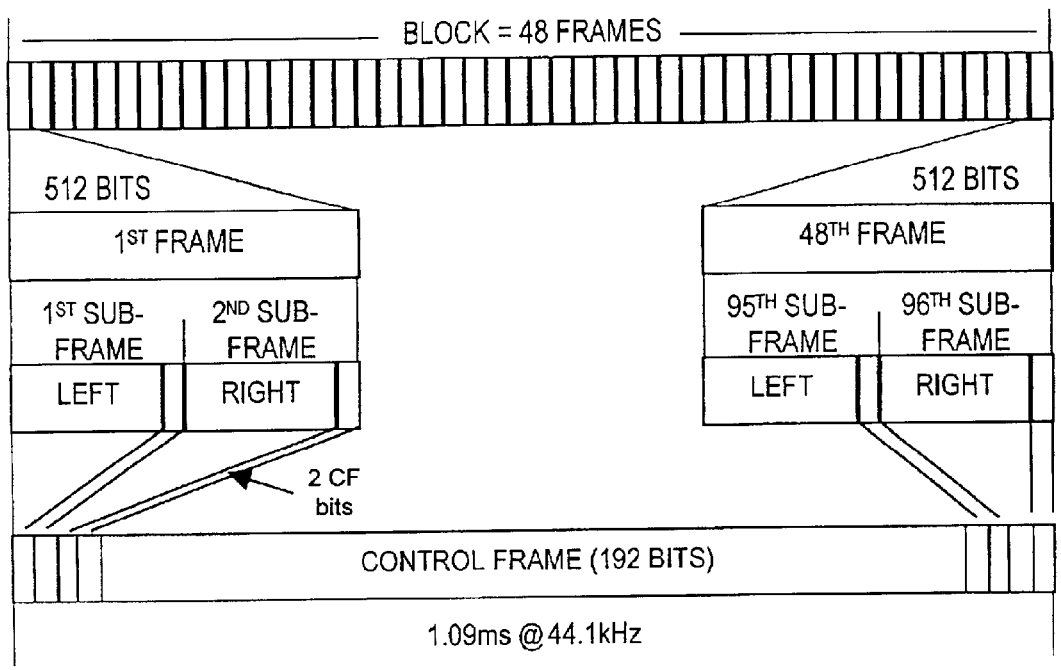
FIGS. 31 and 32 show the frame structure in a second example of the High Speed network.
Figure 32:
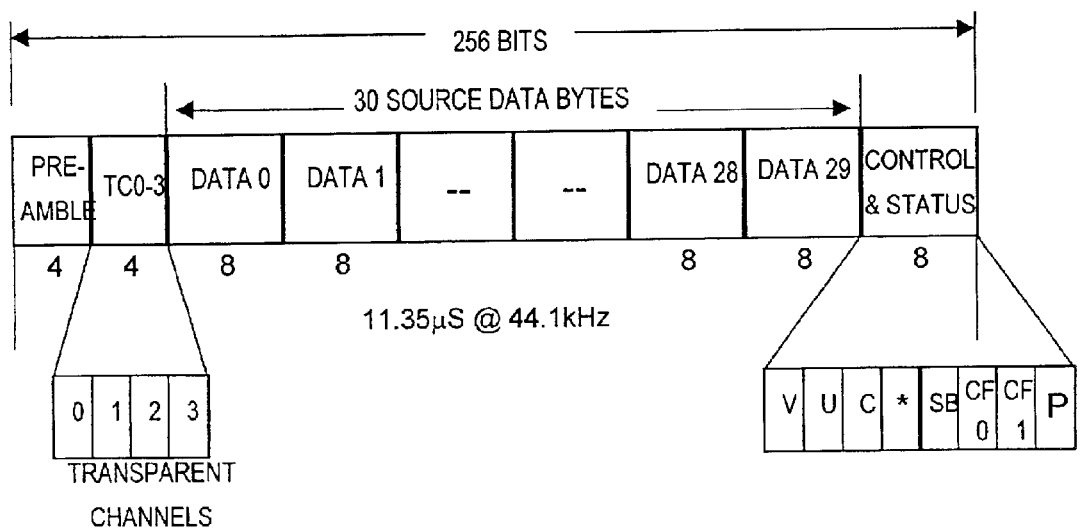

FIGS. 31 and 32 illustrate the block and frame structure of a second High Speed (HS) Network example. This provides both variable and fixed rate channels, but with flexible allocation of bytes within a common source data channel. Notable changes and new features relative to Example I above are explained as follows and new features:

The delay at each network node in processing each frame of Example I is greater than 1 subframe when using a network containing both Single Speed and High Speed network nodes. While this is not a problem in principle, it does not provide. Compatibility with the known D2B Optical network, which can only handle a maximum of one sub-frame delay around the ring. One possible solution to this is adopted in Example II, so that the maximum delay is 12 High Speed bits (=3 D2B Optical bits). Therefore, the constraint of one frame delay can be met up to a theoretical limit of 20 nodes. After accounting for typical processing delays through each node, in practice the nodes can be placed in a mixed mode network.

In the Example I the allocation of circuit-switched synchronous traffic (Mode 0) and asynchronous packet based traffic (Mode 1) was fixed at 256 bits each. In Example II the traffic can be allocated in a flexible manner from 100% Mode 0 to 100% Mode 1 in increments of 1 source byte from 0 source bytes to 60 source bytes in a frame. Total source data capacity is now 23.04 MBPS at Fs=48 kHz (DVD sample rate). Capacity for variable rate traffic is allocated in source bytes from the end of frame—Synchronous traffic from the beginning of the frame.

The frame structure of Example II allows transmission of 1 complete ATM cell (53 bytes equivalent to a bit rate of 20.352 bps) in 1 frame as Mode 1 traffic with 7 bytes left for Mode 0 traffic (2.688 bps or, for example, 2 stereo digital CD channels). Thus the HS network can be used to transparently connect nodes with ATM data interfaces, if desired.

Compatibility is maintained as before by using a common control channel structure as currently used in Single Speed D2B Optical systems (at a rate of 176.4 kbps at Fs 44.1 kHz) and optionally the double speed network too.

When using a network in which all nodes are High Speed Nodes additional control channel capacity can be added by using the 4 bits in the Right Pre-amble to increase the control channel capacity to 352.8 kbps at Fs=44.1 kHz.

Line coding efficiency is improved using 4B/5B line coding to reduce the overhead to just 20%. Thus the rate at which optical transceivers are required to be driven reduces to 29.4912 MHz (at Fs=48 kHz) as compared to 49.152 MHz for bi-phase encoding.

Statistical multiplexing can be used to multiplex up to 4 DVD channels onto the High Speed bus. This relates to calculating node buffer sizes in a distributed video transmission network.

Control channel format is common to D2B Optical and the Double Speed network.

Additional control channel capacity may be used when all nodes are High Speed nodes, by use of right pre-amble to increase control capacity to 384 kbps at Fs=48 kHz High Speed Network—Example III A further example will now be presented, which differs from Example II in various ways.

The number of source data bytes per sub-frame is increased to 46, giving a continuously allocatable 92 source data bytes per frame. The frame rate is fixed at 48 kHz, giving a higher overall data rate than in Example II.

Example III also provides more detail of the control of variable with channel allocation, and a pocket structure for data within the variable rate channels.

Although the variable width channels and the fixed rate channels are again allocated within a single source data field from different ends, in this Example the variable with traffic is allocated in the source bytes from the beginning of the frame, not the end. At the start of each block of 48 frames, variable width block (VCB) headers are provided which indicate a channel ID and channel width which are fixed for the remainder of that block. The header for successive channels is found by counting through the source data bytes of the first frame in accordance with the width of each channel. The fixed rate data channels are allocated from the end of the source data field.

Packets carrying 42 bytes of source data in this example can also be grouped into packs of up to 256 packets. This can assist data handling in applications where larger segments of data, such as disk segments of 2 kbytes are expected. A DVD source, for example, normally provides data in so-called PES cells of 188 bytes, which could, if desired, be grouped as pack of five of the proposed asynchronous data packets.

Figure 33:
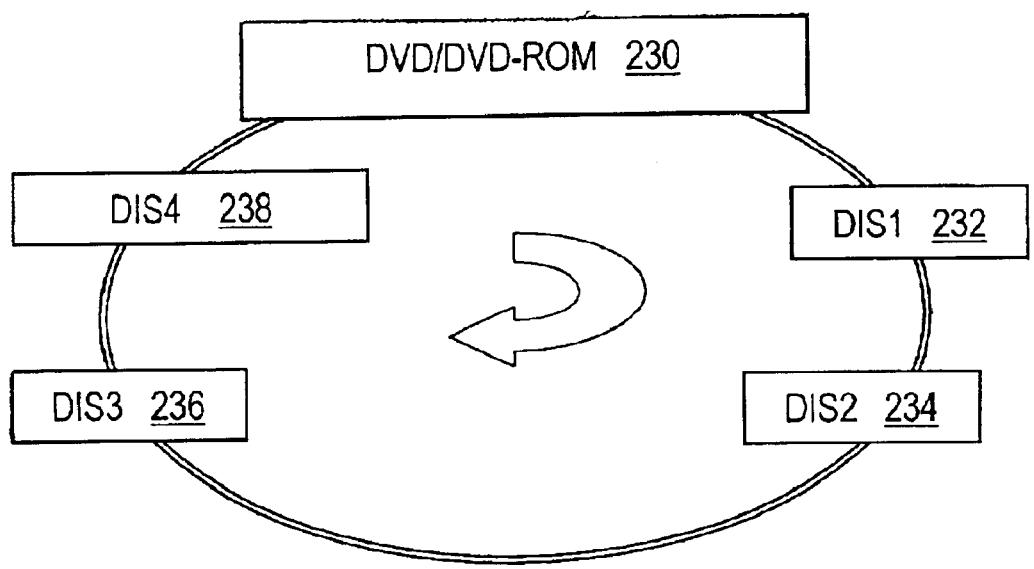
FIG. 33 illustrates an application of the High Speed network for the distribution of multiple video data signals.

A detailed description of Example III now follows. As seen in FIG. 33, the High Speed system of this example consists of a set of devices 230–238 which are connected in a ring topology via a series of point to point links. Each of these links is unidirectional and physically independent. The devices are a disc drive for DVD and DVD-ROM discs 230, four screen displays 232–238.

Depending on its function, each Device in the system can:

supply, receive or pass through source date (e.g. digital audio, video, etc.)

send and receive control messages.

To support the sending and receiving messages, each device has two unique addresses an application-related (device address)address and a ring-position related address. It is also possible to broadcast a control message to all devices or to a pre-selected group of devices.

The protocols for control message communication are defined as required in application protocol specifications so as to ensure compatibility between components.

At a frame rate of 48 kHz the High speed D2B System offers a gross data rate of 36.864 Mbps and a net source data rate of 34.56 Mbps (organised as 92 source bytes per High Speed D2B Frame).

Figure 34:
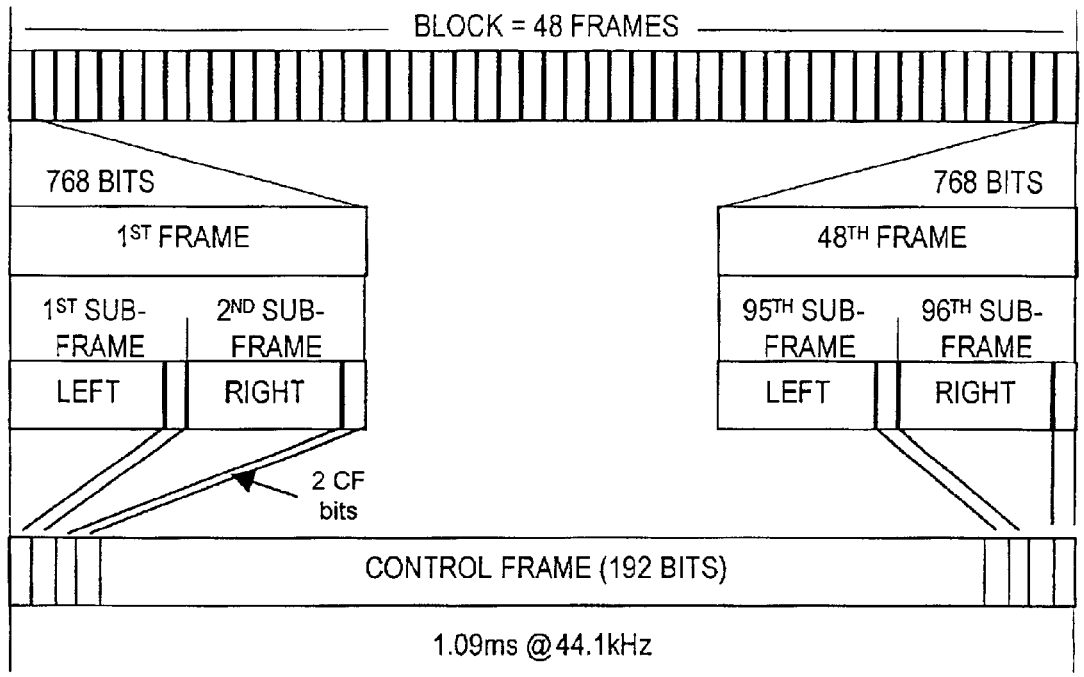
FIGS. 34 and 35 show the frame structure in a third example of the High Speed network.
Figure 35:
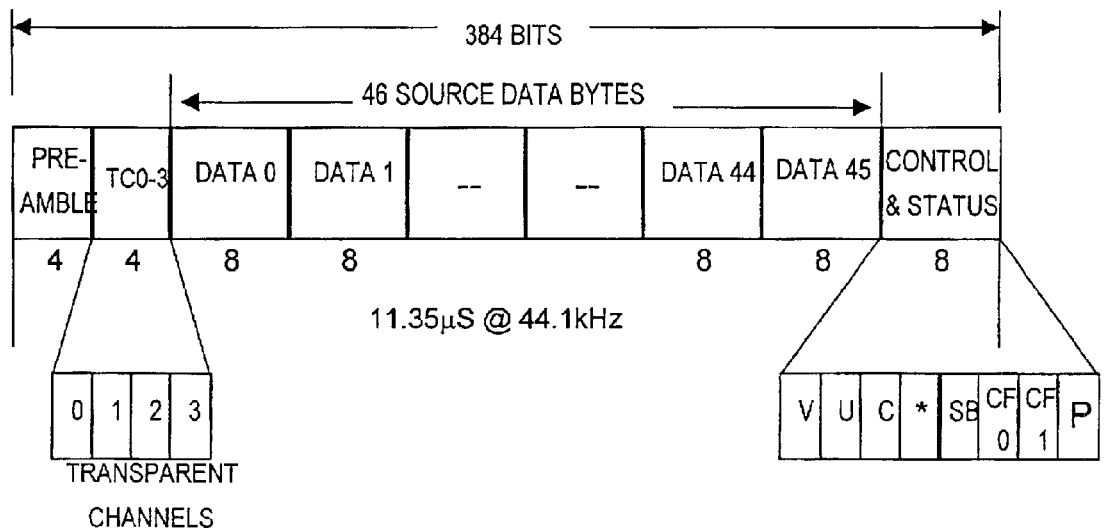

The frame and sub-frame structures for High Speed Example II are shown in FIGS. 34 and 35 respectively. The High Speed (HS) frame consists of two identical sub-frames, to provide some compatibility with the earlier D2B Optical system as in Example II, but it will be seen that this is not essential. The frame rate is proposed to be fixed at 48 kHz. Synchronous channels requiring a lower rate (e.g. CD audio, MPEG 1) can be padded and buffered accordingly as asynchronous connections within the fixed rate data channels.

The subframe each comprise 384 bits. They correspond in form to the Double Speed subframe (FIG. 10), but have 46 source data bytes each. In other embodiments, the number of bits in the frame and hence the number of bytes in the source data field may of course be different.

The control frame structure is again identical to that shown in FIG. 11.

The HS frame is protected by two parity bits P, one in each subframe, which are set to generate even parity and protect against bi-phase coding errors in the individual links.

Source Data Transport

Whenever source data (e.g. digital audio or video) needs to be transported over the HS network, a source data connection must be established. This is called connection set-up. During the set-up, the required number of source data channels (bytes) are allocated from free channels within the HS frames. For example, to carry a stereo audio signal from a CD player requires an allocation of 4 bytes. Source Data Connection protocols based on control messages are used for setting-up and removing connections. Source data routing is similar to that of the Double Speed transceiver IC, but with a larger number of bytes per frame, and hence a far greater number of switching permutations. In practice, a connection list, rather than an explicit routing table, may therefore be implemented in the source data router. Connection building can be performed for example by protocols based on the disclosure of EP-A-0360338 (PHN 12678) and EP-A-0432316 (PHN 13189), adapted according to the ring topology. Protocols for this purpose are established using the control message frames to carry pre-arranged connection request instructions.

For fixed rate connections, this capacity remains allocated until the connection is removed. Synchronous connections have no superimposed framing or packet structure, although applications are free to provide structure as desired.

For variable rate connections, the connection set-up establishes the starting allocation. However this allocation can be varied during the lifetime of the connection as described in the section on variable Connection Blocks.

When all the capacity has been allocated attempts to build further connections will fail. When this happens, the controlling station (AVC) must decide which existing connection(s) (fixer or variable) need to be removed to release enough capacity for the new connection. The complexity of the allocation is hidden from the controlling AVC since each device is responsible for managing the allocation in its own output link (ring segment).

Allocation of Source Data Capacity

Figure 36:
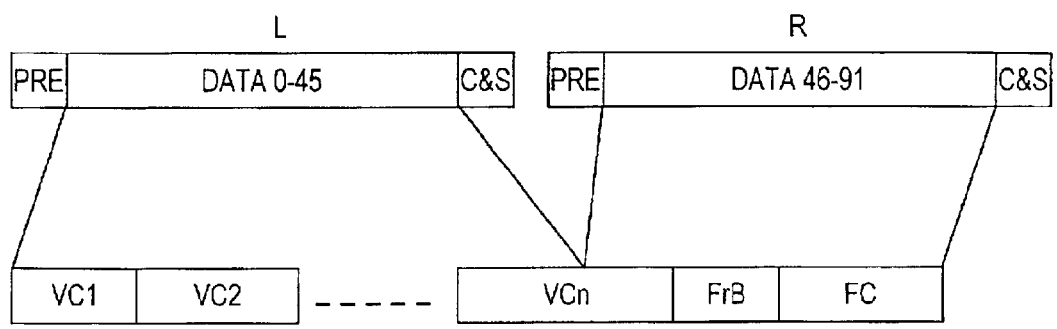
FIGS. 36 to 38 show the division of the frame structure of the third example in to variable rate and fixed rate connections.

As shown in FIG. 36, the source data field comprises the combined source data fields of the two subframes (with 46+46 bytes capacity) flexibly partitioned into variable size sections as shown in the diagram. The division into subframes is no longer linked to the left/right nature of the source data, so the Data bytes are numbered simply 0 to 91.

The first part is allocated to variable-rate asynchronous transport, while the synchronous (or fixed-rate asynchronous) source data capacity is allocated starting from the end of the frame.

In the Figure, VC1 to VCn are variable rate data Connections of V bytes total width (variable). FrB represents free capacity for variable or fixed rate connections of 92-(V+S) bytes. FC represents the fixed rate data connections of total S bytes (variable). The FCB may comprise several fixed rate channels.

Variable rate Connection Blocks (VCB)

Variable rate connection blocks (VCB) are the means by which multiple variable-rate source data connection can be carried on the HS network. They are the containers for asynchronous connections within the HS frame, carrying the packet switched data. More than one VCB may be present in the frame allowing multiple simultaneous variable rate connections.

Figure 37:
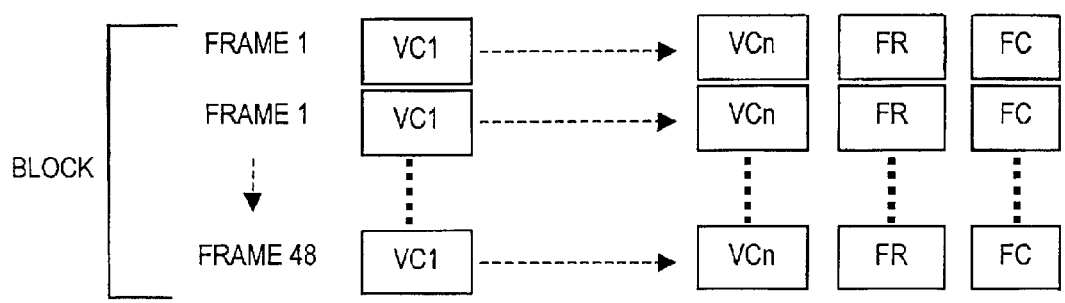

As shown in FIG. 37, the VCB is segmented over a block of 48 HS frames (aligned to the block of 48 frames used for transporting control message frames, see FIG. 34). A VCB header for each VCB appears only in the first frame of the block of HS frames, as explained further below. The size of the VCB is: VCB width*48 bytes. Thus by varying the width of the VCB from block to block, the capacity occupied by an asynchronous connection can be varied, subject to the limit of the total capacity of the frame. Throughout the block, the same source data bytes in each frame are allocated to a given VCB.

Example Application

Figure 38:
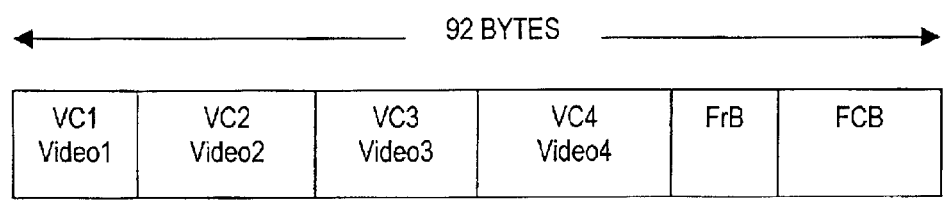

FIG. 38 shows a possible source data field allocation for the system shown in FIG. 33, consisting of a DVD server sourcing different video data signals. The bit rate allocation may be varied for each connection as described in the section below on Variable Connection Block Structure. Note that since the destinations for the video signals are distributed around the system, not all asynchronous connections need to be present in all links in the system. For example, the asynchronous connection carry the video signal (video 1) to display 232 needs only to be present in the link from the DVD server to display 232. Each of the asynchronous connections could have a starting width of 24 bytes (per frame) and then could be varied individually as required for the variable rate video signal. Note that, in contract to a conventional packet based system, each connection carries a steady flow of data frame by frame. The contents of the Variable Data Connection Blocks rely on protection within packets.

Variable Connection Block Structure

Figures 39, 40, 41:
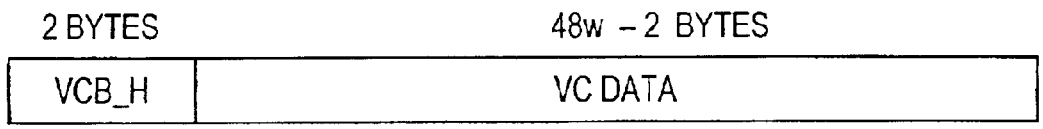
FIG. 39 shows the structure of a variable connection block in the network of the third example.
FIG. 40 shows the format of packet data in the network of the third example.
FIG. 41 shows the distribution of packet data within a variable connection block of width 6 bytes.

Each Variable Connection Block (VCB) is structured as shown in FIG. 39.

The VCB-Header (VCB HDR in FIG. 39) occupies the first 2 bytes of the VCB, and comprises:

| | |
|---|---|
| VCB ID | 6 bits |
| Start of Packet flag | 1 bit |
| Reserved | 1 bit |
| VCB width | 7 bits |
| Reserved | 1 bit |

The VCB ID enables a receiving device to identify the connection whose data is carried by this block.

The start of Packet flag indicates whether the first data byte of this VCB is also the first byte of a packet (flag set to 1) or whether it is a continuation of a packet. This allows for longer packets than the type detailed below, for example.

The Reserved fields are for future extensions.

The VCB width field indicates the number W of (consecutive) bytes allocated to this asynchronous connection within each frame, encoded such that 1 means 2 bytes, 2 means 3 bytes etc. The minimum width of two bytes ensures space for the header in the first frame of the block. The VCB width W may be restricted to ensure an integral number of packets within a block, where packet and/or frame sizes vary from these examples.

Within the capacity provided by the VCBs, source data (VCB-DATA) is carried in the form of packets. The packet format is describe in the following section.

The VCB header format and its field sizes can of course be different according to the application.

The free capacity (FrB) is held within an Asynchronous Connection Block (VCB) with ID=0. This allows the transceiver hardware or software to identify the synchronous connection block easily.

Fixed rate Connection Block (FCB)

This block can be used to carry both synchronous signals e.g. 16 bit PCM audio at 48 kHz or asynchronous signals whose bit-rate is fixed. Changes to the contents and size of this block can only be made by setting up a new connection or removing an old connection, by the exchange of control messages.

Packet Structure

Asynchronous Data carried within either variable or fixed rate connections is formatted into packets whose structure is described below. This provides framing to allow a device receiving the data to identify the data and recover it correctly. Since each packet has its own ID, it is possible to interleave different streams of data over the same connections. For example a particular connection might carry predominantly packets containing video data interleaved with an occasional packet for control purposes.

FIG. 40 shown the packet format, which begins with Packet Header (PKTHDR). The following fields are defined:

| Packet Type | 2 bits (the remainder of this packet definition applies for type 0) |
|---|---|
| Packet ID | 3 bits |
| Reserved | 1 bit |
| Flow Control | 1 bit |
| Start of Pack | 1 bit |
| Remaining Packets | 8 bits |
| Number of bytes used | 8 bits |
| Data | 42 bytes |
| Checksum/CRC | 1 byte |

In the Packet Header, Packet Type identifies the format of the packet, for example longer packets may be defined for bulk data transfer, as opposed to real-time channels.

Packet ID identifies the type of data contained in the packet, such as audio/video/general data, to assist routing in the destination device. Packet ID "7"H is reserved for control (e.g. connection management) messages, with low latency compared with the existing control message channel (CF bits). Flow control is used by a receiver of the data to indicate that its Rx buffer is full (when this flag is set to 1). When this is detected by the source of the data, it will normally suspend transmission.

Remaining Packets indicates the number of packets remaining within the current pack (group of packets). Number of Bytes used indicates the number of bytes in this packet containing valid data (for type 0, the total number of data bytes is always 42).

The flow control mechanism implemented via the flag in the packet header, requires there to be a connection from the destination device back to the source device. This connection, is built as part of the connection set-up of the signal whose flow is being controlled, and can have a much reduced capacity (minimum 1 byte per frame) compared with e.g. the video signal to which it refers. It may for example have same VCB ID, and use the Packet Header format alone. A single byte channel could also be allocated as an FCB.

The start of the packet is indicated by the Start of Packet bit in the VCB header. When this bit is set, the first byte of data following the VCB header is also the first byte of a packet. When this bit is not set, it indicates that the contents of the VCB are a continuation of a previous packet.

The number of HS frames required for transmission of a packet is a function of the size of the packet and the width of its containing VCB in each HS frame. If the VCB is w bytes wide then the packet will encompass (packet-size+size of VCB Header)/48 wHS frames.

FIG. 41 shows how a VCB of width w=6 bytes is loaded with packets of total size 46 bytes. This VCB holds six packets of which the first two are shown (PA1–PA46; PB 1–PB46). Note that the VCB header occupies the first two bytes and that between each packet are 2 reserved bytes (R) which are used as padding. Each VCB occupies the next available group of bytes, according to the specified width of each channel. If a connection becomes wider or narrower at the next VCB, the VCB for other connections are shifted up or down accordingly.

Each station device which needs to send or receive packet data provides buffers for packets which have been received or are to be sent. The size of these buffers is defined according to requirements.

High Speed Network—Example IV

A further example is now presented, which is substantially the same as Example III but further defines certain mechanisms and communication channels for flow control in the asynchronous data. A packet structure is not imposed.

For control of variable rate connections, a special connection signalling channel is built among the source data fields. Flow control implemented by each source adapts to minimum and maximum data rates signalled by other sources. A source data latency specific to the installation is accounted for in the flow control calculations and by means of a transition period between blocks. Mechanisms for determining the source data latency automatically are provided. The source data block is decoupled from the control frame block, as explained below.

Also buffer occupancy signalling for the control channel is provided, to improve the efficiency of utilisation where one station such as the system master or AVC receives a disproportionate amount of control message traffic.

Source Data Capacity is more than 43 Mbits/second, per point-to-point link. Since each link is physically independent of any other link, this means that, by optimisation of relative device positions, the total system capacity can be much greater than the capacity of any single link.

The network supports transport of Asynchronous Data as well as Synchronous Data. Data can be carried regardless of its timing relationship with the system, so that it is simpler to implement applications requiring asynchronous data. The networks supports Variable-rate connections as well as fixed rate connections, enabling more effective sharing of transport capacity between applications whose demand is variable. Same Control Message format as that of D2B Optical is again maintained, providing backwards compatibility for D2B Application Protocols. In addition, applications requiring faster control message transport can now make use of asynchronous data connections to provide as fast a link as required.

Operating at a frame rate of 48 kHz the High Speed System offers a gross data rate of 43.78 Mbps and a net source data rate of 43.01 Mbps (organised as 112 source bytes per High Speed D2B Frame).

Figure 42:
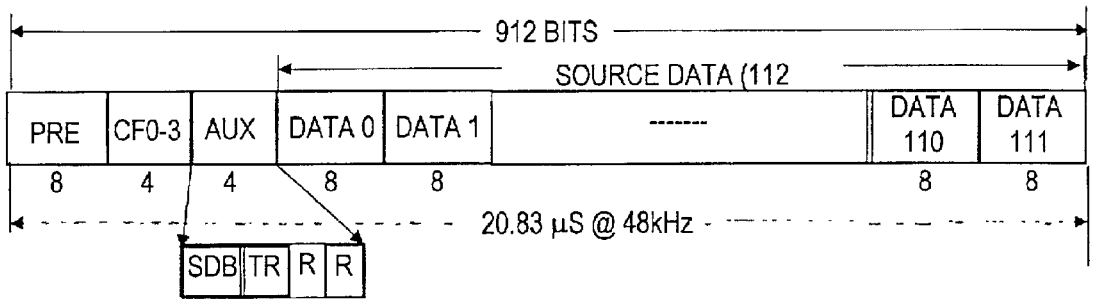
FIG. 42 shows the frame structure in a forth example of a High Speed network.

The High Speed D2B System will again operate at a single frame rates: 48 kHz. The frame structure for High speed D2B shown in the FIG. 42 is unitary (contains no subframes), comprises 912 bits and occupies 20.83 $\mu$s.

The frame structure contains the following fields.

Preamble: The preamble enables the receiver to recognise the start of an HS network frame and also to determine whether or not the frame is the starting frame of a CF block or not. The CF block structure, as described in the previous examples, is used for Control Message Frame transport. These preambles are as follows:

| Preamble | Encoding |
|---|---|
| Start of Block | ESC '1011' |
| Start of Frame | ESC '1111' |

See the section on Line Encoding for further details. Compared with D2B Optical, the HS network frame preamble has been extended from 4 to 8 bits to suit the line encoding. However this increase is cancelled by the use of only one preamble per frame compare with one preamble per subframe in D2B Optical.

CF0–3: Control Message Channel: This channel is supported with 4 CF bits/frame, in exactly the same way as D2B Optical. Applications requiring faster control message transport can use fixed asynchronous source data connections as very high speed control channels, where the control messages can be sent within the same packet format as source data. For example, with one frame byte allocated to the connection, such a channel could offer a gross rate of 384 kbits/sec., cf. the existing channel capacity of 192 kbits/second. Such high speed channels could be dedicated either to one particular application or could be shared among applications, depending on how the fixed asynchronous connection is built.

SDB Bit: The first frame of the source data block (described below) is indicated by the SDB flag being set to 1 (by the System Master). In all other frames SDB is set to 0.

Tr Bit: For the purpose of implementing variable rate connections, a Transition Period is defined for phasing in rate changes just prior to the start of a new source data block. The frames transmitted during the Transition period are marked by the Tr bit set to 1, whilst all other frames have this bit set to 0. See the section Phasing in VCB Width Changes for further details.

Transparent Channels are not provided in this Example, since the HS network provides other more flexible mechanisms for transporting asynchronous data over a much wider range of data rates. See the section on Source Data Connections for more details on this.

Source Data Field: This field of 112 bytes carries all the data for source data connections. See the section on Source Data Connections for further details.

Error Protection: The HS frame as a whole is not protected by a parity bit in this example. However note that the source data contained within the Source Data field may have its own protection where necessary. Also note that the control message frames have their own protection. Other specific protections can be applied, as in the Double Speed network described above.

Figure 43:
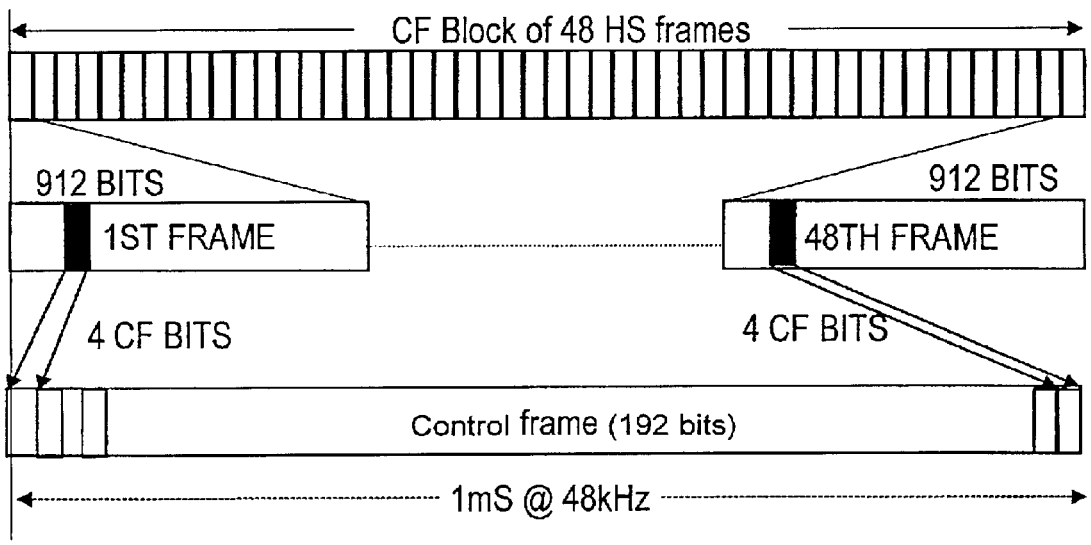
FIGS. 43 and 44 illustrate a control lock structure and control frame structure in the fourth example of a High Speed network.

There are two block structures in D2B one associated with the transport of control messages one associated with the transport of source data CF Block As shown in FIG. 43, a block of 48 High Speed Data frames is used for the purpose of transmitting control message frames, carried via the 4 CF bytes in each HS network frame. The start of a block is indicated via a special preamble which replaces frame preamble every 48 frames.

Figure 44:
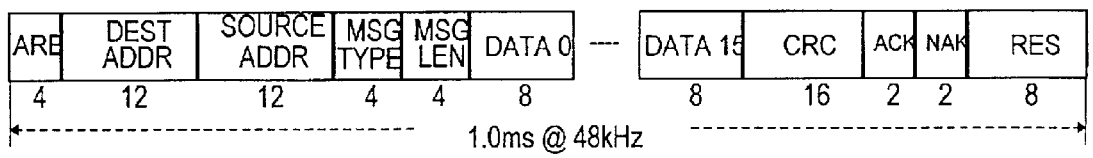

The control message frame is shown in FIG. 44, and is identical to that of 12B Optical Block, apart from an expansion of the arbitration field to 4 bits and a corresponding contraction in the reserved bits at the end of the frame.

The control frame is assembled from and aligned with a block of 96 sub-frames, i.e. the first four bits of a new control frame are taken from the HS frame with a block preamble, and subsequent quartets of bits are taken from subsequent frames to build up a control frame. The fields of the control frame are as follows:

Arbitration bits: This four bit field is used to signal whether or not the current control message frame is free. It is also used to indicate the occupancy of the system master's control message reception Rx Buffer. The first two bits (bit 0 and bit 1) of the arbitration field are reserved. The second two bits indicate the functions listed in the table below.

| Function Indicated | Bit 2 | Bit 3 |
|---|---|---|
| Control message frame is free & System master's RX buffer is free | 0 | 0 |
| Control message frame is free & System master's RX buffer is occupied | 0 | 1 |
| Reserved | 1 | 0 |
| Control message frame is occupied | 1 | 1 |

Destination Address: This is the 12-bit device address of the destination of the message, in the range '000'H to 'FFF' H. The sending device writes this into its message transmit buffer for transmission. Certain addresses and address ranges have special meanings.

Source Address: This is the 12-bit device address of the sender of the message, in the range '000'H to 'FFF' H. The receiving device can read this from its message receive buffer after reception. Certain addresses and address ranges have special meanings.

Message Type and Length: Two 4-bit fields normally used to indicate the type/length of the message. These bits are transported transparently by the transceiver to the application software.

Data 0 to 15: The message data. All 16 bytes are always transported. The Message Length normally indicates how many of the 16 bytes are actually valid for the message. The sending device writes this into its message transmit buffer for transmission. The receiving device can read this from its message receive buffer after reception.

CRC: A 16-bit Cyclic Redundancy Check value is used to verify that the control frame has been transported without error. The CRC is generated by the transceiver automatically on message transmission and checked by the transceiver automatically on message reception.

ACK/NAK: Acknowledge and Not Acknowledge (2-bits each) indicate successful message transmission. The use of separate ACK and NAK flags allow reliable point-to-point and broadcast message transport. The flags are automatically filled by the destination device (s) (if present) and read by the sending device.

Reserved: 8 bits reserved.

The data is always transmitted and received LSB first in each field.

Source Data Block

Figure 45:
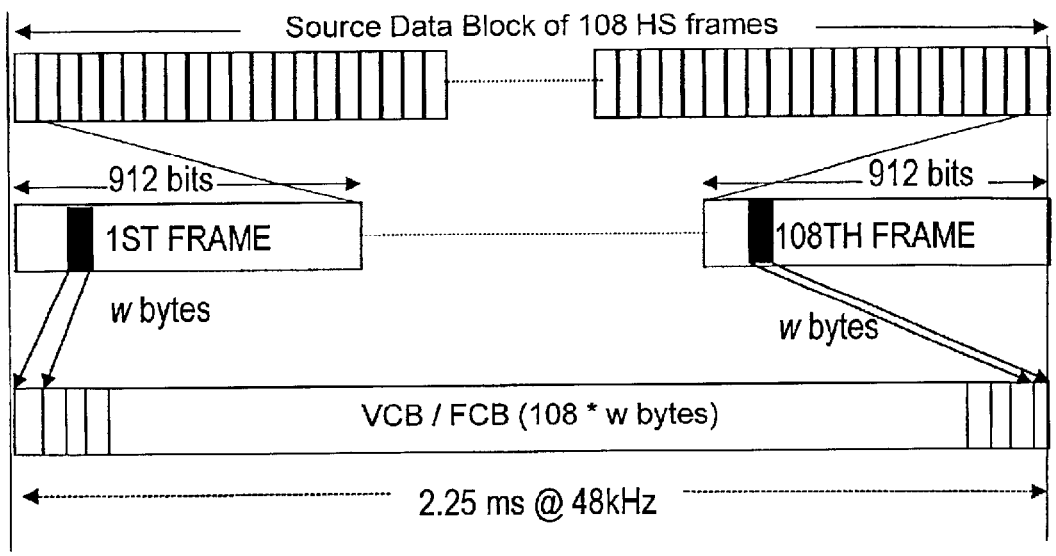
FIG. 45 shows a source data block structure in the fourth example of the High Speed network.

As shown in FIG. 45, a block of 108 HS network frames is used for the purpose of transmitting source data, supporting the packet structure for the asynchronous connections (both fixed and variable).

Fixed Synchronous connections carry a constant amount of source data in each frame regardless of the position of the frame within a Source Data Block and are thus not dependent on the source data block structure. The start of a block is indicated via the SDB bit in the header of the HS frame (See the Frame Structure in FIG. 42).

(Note that the Source Data Block is not necessarily aligned with the CF block described in the previous section).

Line Encoding

The line coding scheme for the HS network is 4B/5B as described below. 4B/5B encoding provides an average of over 3 transitions per 5 bit symbol, to ensure easy clock recovery in the receiver. Run length is limited to less than or equal to five. The data is free of DC frequency.

Figure 46:
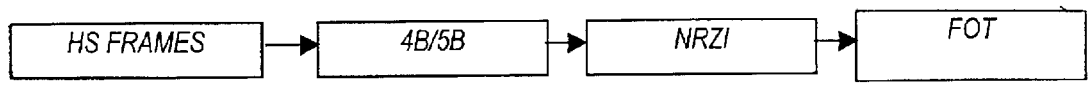
FIGS. 46 and 47 illustrate respectively the encoding and decoding of data for transport in each segment of the network.

Within the Sender, The HS network Frame is segmented into nibbles. Each nibble (4 bits) of an HS network Frame to be transmitted is translated into a 5 bit symbol and then NRZI encoded for transmission by the fibre optic transceiver (FOT) or other physical medium as shown in FIG. 46.

Figure 47:
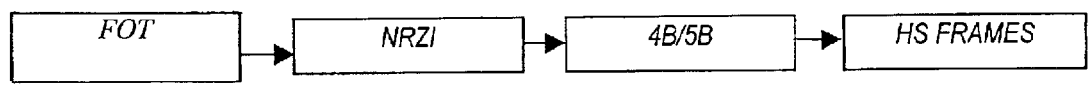

At the receiver (FIG. 47), the received serial data is NRZI decoded and the resulting 5-bit symbols decoded to form a data nibble. The nibbles are then re-assembled into an HS Network Frame.

Each symbol of the 4B/5B code is composed of 5 bits. Of the 32 possible symbols, seventeen are valid in this implementation and 15 symbols are invalid. The 17 valid symbols represent sixteen 4 bit data nibbles (hex 0 through F) and one Escape (X) code. The Escape code is used in the preamble of the HS network frame (see the following section). The table below lists the 4-bit nibble to 5-bit symbol conversions.

Note: The binary value for 4-bit data nibble and 5-bit symbol encoded are shown as most significant bit first (i.e. at left).

| Data | Symbol | Data | Symbol | Data | Symbol | Data | Symbol |
|------|--------|------|--------|------|--------|------|--------|
| 0000 | 11111  | 0001 | 01001  | 0010 | 01010  | 0011 | 01011  |
| 0100 | 00111  | 0101 | 01101  | 0110 | 01110  | 0111 | 01111  |
| 1000 | 10010  | 1001 | 11001  | 1010 | 11010  | 1011 | 11011  |
| 1100 | 10111  | 1101 | 11101  | 1110 | 11110  | 1111 | 10101  |
| ESC(X) | 00010 | | | | | | |
| NULL | 10011  | | | | | | |

Figure 48:
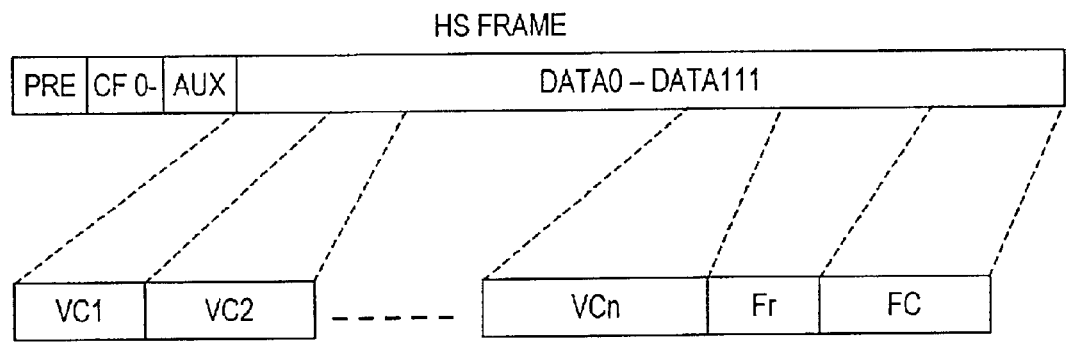
FIG. 48 illustrates the allocation of frame data between variable rate and fixed rate channels in the High Speed network of the fourth example.

Nibbles which contain null i.e. invalid data (e.g. padding) will be indicated via a special 5B value ('10011'B). This nibble is repeated to form a null byte, providing robustness against data dislocation being introduced by bit errors. FIG. 48 shows an example of the presence of padding in a VCB or FCB. Padding can occur in units on one byte at any point with a variable or fixed connection block and be of any duration up to the duration of the connection block, as explained in more detail below.

Each bit of the 5 bits symbols produced by the 4B/5B encoding is further encoded such that '1' is encoded as a transition (0 to 1 or 1 to 0) and '0' is encoded as a lack of a transition. The serial data rate following NRZI encoding matches the serial data rate prior to the encoding, thus the use of NRZI encoding does not reduce the data transport capacity of HS network. Clock recover is enhanced, however.

Source Data Transport

The HS network can accommodate three different types of source data connections:

Fixed-rate synchronous connections

Fixed-rate asynchronous connections

Variable-rate asynchronous connections

Fixed-Rate Connections

These are source data connections whose use of the source data capacity is fixed when the connection is set up and is guaranteed through the lifetime of the connection. This type of connection is suitable for fixed bit rate signals such as PCM audio. MPEG1 video. There are two types of fixed-rate connection: synchronous and asynchronous.

Synchronous Connections (Fixed-Rate)

These are connections which take full advantage of the raw synchronous rate provided by channels within the HS network source data field. There is no packet overhead associated w ith this type of connection and thus it is the most efficient use of system capacity subject to the limitation that the source must provide data at a rate which matches the system frame rate an d the destination must be able to consume the data at exactly this rate. This type of connection could use to transport PCM audio from a DAB receiver to an audio amplifier, for example, where the network is synchronised with the broadcast sample rate.

Asynchronous Connections (Variable or Fixed Rate)

Source data may be carried within a packet structure which allows the raw synchronous rate provided by channels within the HS network source data field to be adapted (padded) to data which requires delivery at some lower rate. The application may provide data for an asynchronous connection either at a constant rate or in bursts, subject to buffer capacities within the source and destination devices. The HS network also provides a mechanism for regulating the delivery of data over an asynchronous connection according to the demands of the destination rather than the source. For example a destination for CD-ROM data may consume data at a variable rate.

Where the bit-rate of data to be delivered over an asynchronous connection varies over a wide range e.g. by a megabit per second or more, a variable-rate connection should be used. This type of connection enables any spare capacity released by one variable connection to be made available to other variable connections which can make use of it. The flow control for these connections enables a destination to specify the rate (or range of rates) at which the source should deliver data to it.

Connection Set-up

Source Data Connection protocols based on control messages are used for setting-up and removing connections. Whenever source data (e.g. digital audio or video) needs to be transported over the HS network, a source data connection must be established. This is called connection set-up. During the set-up, the required number of source data channels (bytes) are allocated from free capacity within the source data field of the HS network frame. For example, to carry a stereo audio signal from a CD player requires an allocation of 4 bytes (2*16 bit samples) per frame.

When all the frame's source data capacity has been allocated, attempts to build further connections will fail. When this happens, the System Master (or other AVC) must decide which existing connections (fixed or variable-rate) need to be removed to release enough capacity for any new connection. The System Master (AVC) is not aware of which parts of the source data field are allocated to which connections, since each device is responsible for managing the allocation in its own output link (ring segment). However, the System Master AVC can find out the type of source data delivered by a particular source, via a message sent via the control (CF) channel (the Source Data Type status request and report. The rules by which the AVC selects which connections to remove first are not specified in the network protocols, but form part of the Application.

For variable-rate connections, the connection set-up establishes a reserve allocation, although the actual allocation from source data block to source data block can be varied during the lifetime of the connection as described below in the section on Variable Connection Blocks. The reserve allocation of variable rate connections is used for the purpose of calculating whether there is sufficient capacity to build a new connection. This means that a new connection (variable or fixed) would not be built if it meant that a source would have to reduce the VCB width for a variable rate connection below this reserved width.

As shown in FIG. 48, the source data field is partitioned into sections carrying the different types of connections. The first section of the source data field is allocated to variable-rate connections (if there are any). The fixed-rate connections are allocated capacity starting from the end of the source data field. Any capacity remaining is grouped into the central fee section marked. According to FIG. 48: VC1 . . . VCn are Variable-rate Connections total V bytes (variable); FC represents all the Fixed-Rate Connections F bytes (variable); and Fr represents free capacity for VCs or the FCs 112–(V+F) bytes.

Variable Connections

These are source data connection whose use of the source data capacity can be adjusted to meet the requirements of the application. Variable rate connections are asynchronous in general. The bit-rate provided by a variable rate connection depends on the number of source data bytes allocated to that connection within each frame, referred to as the width of the connection.

Figure 49:
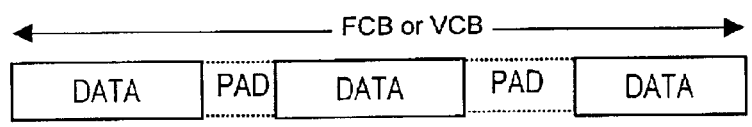
FIG. 49 illustrates the presence of padding in a channel of the network.

The format of data carried within a variable connection is a matter for the application. Padding inserted into the transmitted variable connection data using the Null data symbol at any time when there is no data available from the source (see FIG. 49).

The bit-rate (i.e. the width of a variable connection) cannot be varied from HS frame to HS frame, it can only be changed on source data block boundaries (once per 2.25 millisecond at a frame rate of 48 kHz). Thus within a source data connection block, the width of a variable connection remains constant.

Figure 50:
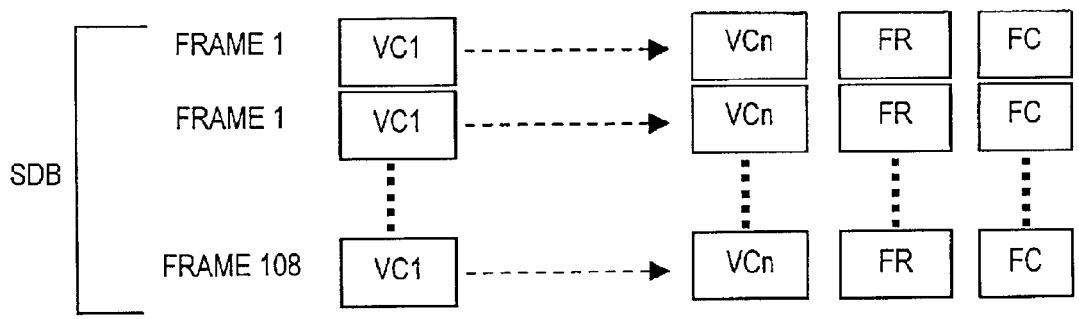
FIG. 50 illustrates the structure of variable and fixed rate connections within a source data block.
Figure 51:
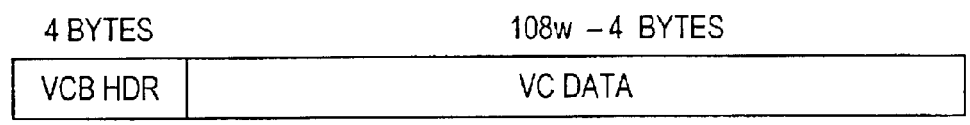
FIG. 51 illustrates the structure within a single variable connection block in the High Speed network of the fourth example.
Figure 52:
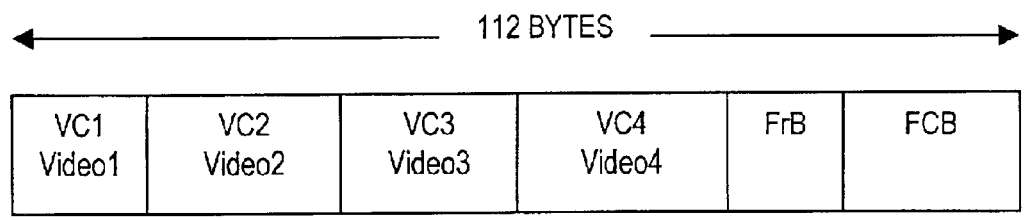
FIG. 52 illustrates the frame format applicable in the application example of FIG. 33 in the High Speed network of the fourth example.

Referring to FIGS. 50 and 51 Variable Connection Block (VCB) is the collection of data for one variable-rate connection (VC) that is transported within one Source Data Block. See the section on Source Data Block Structure. Variable Connection Blocks may be viewed as containers for data carried in a variable-rate connection.

The amount of data in a VCB is: VCB width*108 bytes (less the header size and any restriction imposed during the Transition Period, see Phasing In VCB Width Changes below). Thus by varying the width of the variable-rate connection (VC) from one source data block to another, the capacity allocated to a variable-rate connection can be varied, subject to the limit of the total capacity of the frame.

The VCB header indicates the VC width and a reference number for that connection (the VC ID). The contents of the Variable Connection Blocks are unprotected.

In the VCB Header (VCB HDR in FIG. 51) in Example IV comprises four bytes, while the data field is longer than in Example III, The Header fields are:

| | |
|---|---|
| VC width | 9 bits |
| VC ID | 6 bits |
| Reserved | 1 bit (=0) |
| Error Protection (N–K) | 16 bits |

The VC width field indicates the number w of (consecutive) bytes allocated to this variable-rate connection within each frame, encoded such that 4 means 4 bytes, 5 means 5 bytes etc. The VCB width field can be set to a minimum of 4 for error protection purposes. When the VCB width field is set to 0, this indicates that the remainder of the variable connection part of the frame is free. Note that when a VCB has a width of zero in a source data block, e.g. because its destination cannot accept further data, the VC is not carried in the frame and therefore has no VCB header. The VC ID enables a receiving device to identify the connection whose data is carried by this block. BCH Encoding protection (31,16) is used to protect the preceding fields against up to 3 bit errors, allowing both detection and correction.

The Reserved field is for future extensions and should be set to zero.

Example Application

The example system shown in FIG. 33 consisting of a DVD server acting as a source for 4 different video signals could make use of the source data field structure shown in FIG. 51. The bit rate allocation may be varied for each connection by varying the number of bytes allocated to the Variable Connection in each source data block (the width of the variable connection). Note again that since the destinations for the video signals are distributed around the system, not all variable-rate connections need to be present in all links in the system. For example, the variable-rate connection carry the video signal to Screen 1 (video 1) needs only to be present in the link from the DVD server to Screen 1. Each of the variable-rate connections could have a starting width of e.g. 24 bytes (per frame) and then could be varied individually as required by the rate of consumption in the MPEG decoder in each screen.

Variable Rate Flow Control Mechanism

While a source device directly controls the rate which is allocated to its connection(s), the source device needs to receive feedback from the destination about the rate required to prevent the receiver's buffers from either becoming empty (a serious problem for real-time signals such as audio and video) or from overflowing (where the data is lost).

The HS network transceiver of Example IV provides a mechanism which enables the destination to report the minimum quantity of data that it requires to have delivered during the next block for the application to survive without interruption. The destination also reports the maximum amount of data that it can receive without its buffer overflowing. This latter information can be used to take advantage of spare capacity to spread the 'load' on the data transport capacity.

This mechanism enables the bus capacity to be shared fairly between a number of competing variable-rate connections according their requirements and their priority.

When variable-rate connections are to be used within the system, there needs to be a Signalling Channel established for the purpose of transporting messages for signalling the delivery rate requirements of the destinations of these connections. This connection signalling channel takes the form of a fixed-rate synchronous connection occupying at least 1 byte of each HS frame, within the Fixed Connection section of the frame. This channel exists around the entire ring. This signalling channel can be built as soon as the system has started up.

The Connection Signalling channel carries a packet, containing a message for each of the current variable-rate connections. The messages are created by their sources in the order in; which those source devices are positioned in the D2B Optical ring and, in order of connection ID (VC ID) (where a device is a source of multiple connections).

For example, consider a system with 3 current connections: two from the device at ring position 1 (VC IDs 1 and 2) and one from a device at ring position 2 (VC ID 4). Within the Connection Signalling packet, the following messages are found in the order shown below:

1) Connection signalling message 1 (CSM1) from the source at ring position 1, with VC ID 1,
2) CSM2 from the same source, with VC ID 2,
3) CSM3 would be from a source at ring position 2, VC ID 4

The messages CSM1 to CSMn are then transmitted again to allow devices to see the completed messages (since the messages will have been modified by their destinations during their first pass around the ring). The modified messages will be referred to as CSM1¹ etc.

Devices are allocated a ring position, relative to the System Master, such that the System Master is at position 0, then in the direction of light propagation, the next device is at position 1 etc.

Figure 53:
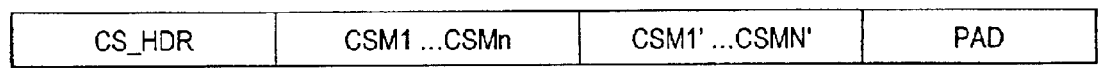
FIG. 53 shows the structure of connection signalling messages in the High Speed network of the fourth example.

The Connection Signalling Packet format is shown in FIG. 53. When a source device has initiated the building of a variable-rate connection, the source device writes its CSM structure into the first free message slot within the signalling packet. If the first free slot also happens to be the first slot following the start of a source data block (108 HS frames), then the source also creates the packet header CS_HDR as shown in FIG. 53.

The signalling channel thus carries a packet, with the following format (starting with the first byte following the start of a block). Note that for the transmission of the modified Connection Signalling Messages (CSM1', etc), the source device in each case must store all the fields it receives from its first message and then transmit these in the next available message slot. Note that no device is permitted to overwrite any of the fields in this repeated message: thus all devices will have a chance to see this message in its final state.

The Packet Header (CS.HDR) comprises:

| | |
|---|---|
| Packet Type | 2 bits (=10, for type 2) |
| Packet ID | 3 bits (set to 001) (1 signifies connection signalling) |
| Reserved | 3 bits (=000, not used) |

The Packet Data comprises O{<Connection Signalling Message>}n<padding>

Each Connection Signalling Message comprises:

| | |
|---|---|
| VC_ID | 6 bits (or Connection ID) |
| Priority of Connection | 2 bits |
| Min VC width | 7 bits |
| Max VC width | 7 bits |
| Reserved | 1 bit |
| Reserved | 1 bit |

The remaining bytes with the packet, following the connection signalling messages, are reserved and filled with padding. If 21 connection signalling messages are present (the maximum number), there are 2 remaining bytes.

Packet Type distinguishes the format of the CS packet from that of other types (incl. header). Packet ID indicates the nature of the message carried by this packet, i.e. connection signalling in this case. VC ID: matches the connection to which this message refers. A VC ID of 0 indicates that this message slot is unused. Priority of Connection Flag indicates whether the priority of this signal is real-time (high priority) or non-real time. If real-time, the flag is set to '3' (high priority). Otherwise it is set to a value between 0'and '2'.

Min VC width is written by the destination of the connection. It indicates the minimum width required for the specified VC within the next source data block to ensure that the destination's buffer will not be completely emptied. When a connection is not yet complete, this value remains 0, since there is no destination yet. When the connection is active, the minimum VCB width varies between 0 and the maximum width of an VCB. The first non-zero value written by the destination, following set-up of a connection, indicates the reserve capacity which should be allocated to this connection.

Max VC width. This field is also written by the destination of the connection. It indicates the maximum width required for the specified VC within the next Source data block to ensure that the destination's buffer will not overflow. The destination must calculate this requested maximum VC width on the buffer level expected at the end of the current source data block (in which it is making the request). This is to prevent the buffer overflowing. The destination will be able to calculate the expected buffer size from the VC width which has been allocated by the source within the current source data block. When a connection is not yet complete, this value remains 0, since there is no destination yet. When the connection is active, this width varies between 0 and maximum width of an VC. Width 1 is not allowed, due to the size of the VCB Header. In the event that the Max VC Width is less than the Min VC Width (only possible with multiple destinations), the Max VC Width takes precedence.

The Reserved field is for future extensions.

There is a limit (in the example mechanism) on the number of variable rate connections which can be supported simultaneously within a system, due to the size of the connection messages and the need to repeat the messages twice.

The limit may be calculated as follows:

((width of $CS$ channel)*(108−Num. of frame buffers)−$CS\_Hdr$ size)/($CSM$ size*num. of transmissions).

The width of connection signalling channel is normally 1 byte. The size of the Connection Signal Channels packet header is 1 byte. The Number of frame buffers (latency) in the system is equal to twice the number of sources in the system (including System Master), since each source contributes two frame buffers to the system. The message size as defined is 3 bytes and there are two transmissions in the proposed mechanism (CSM plus CSM¹). Thus, for a system containing 10 sources, the number of variable rate connections supported is:

(108−(10*2)−1)/9=87/9=9 (when rounded down to the nearest integer)

The destination supplies the rate requirement, by writing minimum and maximum VC widths into the appropriate connection signalling message fields, to enable the source device to decide how much bit rate capacity to allocate for the next Source Data block (108 frames). The destination also supplies its ring position. In the case where more than one destination is defined, a destination is allowed to overwrite a previous destination in ring order, under the following conditions: (I) the Ring position may be overwritten if the new destination is further from the source; (II) the Minimum requirement may be overwritten if this destination has a higher minimum requirement; (III) the Maximum requirement may be overwritten if this destination has a lower maximum requirement.

Immediately after a variable-rate connection has been set-up, the destination is responsible for writing the reserve allocation requirement into the Minimum requirement field of the first connection signalling message for the new connection.

Connection signalling messages are modified by the relevant destinations during their first pass around the system. These connection signalling messages are transmitted again, in their modified form, by the sources which generated the original messages.

A source which is generating connection signalling messages must:

wait for an unused connection signalling message location in the CS packet (indicated by VC ID=0) before transmitting a connection signalling message on its output (sending the message). This rule applies both to the original transmission and also to repeat transmissions.

when it receives its own connection signalling message back after transmission, replace each byte of its own message with a byte containing 0 on its output. This frees the connection signalling channel for use by downstream sources.

For determining the rate to be allocated to an variable-rate connection, the source of each variable-rate connection must take into account both the requirements of the destination(s) of that connection and also requirements of the other source data connections with which the system capacity must be shared.

There are two stages to the process in this Example:

a determination of which other source data connections must be taken into account a determination of how much capacity (rate) should be allocated to each of these competing connections The source must consider all the source data connections (fixed as well as variable) which affect the capacity that can be allocated to its own variable-rate connections, since the system capacity must be shared between all of these connections. This can be done in various ways. The mechanism adopted in this example shall be referred to as a "Global Search"

In the Global Search method the source looks at the ring positions of sources and destinations for each of the other source data connections in the ring. It then analyses the overlap relation between each of these connection and its own connection: either direct overlaps or indirect (where a connection which overlaps this connection is itself overlapped by another connection. The ring positions of sources and destinations will be provided via a Connection Status reports in the Control message channel. One of these is broadcast by the System Master following successful completion of set-up for each source data connection.

The source data field capacity must be shared between all source data connections both fixed and variable-rate, with the fixed rate connections having a guaranteed share. If the capacity was unlimited, all destinations would be given the maximum capacity (Max VC width) that they have requested. However, since capacity is limited, the source applies an algorithm to share the available variable rate capacity between the competing connections in such a way that:

there is the least risk of interrupting an application and the available system capacity is used very efficiently, allowing more simultaneous applications to be supported.

There are several Stages in the Sharing Calculation

1. Allocate the minimum requested capacity
   a) first to all the high priority connections in order of VC
   b) secondly to the lower priority Connections
2. Allocate the remaining capacity:
   a) weighted according to the remaining requested capacity for each connection (max-min); or
   b) round robin allocation of to each connection in turn; or
   c) allocation of the full requested capacity to each connection in turn In Stage 1: (Allocation of Minimum Requested Capacity) the source device calculates the total available width (capacity) by forming the sum of all current VC widths and the free width.

The source device should 'allocate' the minimum requested width to each of the relevant connections, a) first, to high priority connections in the order in which they are represented in the signalling channel b) to low priority connections, in signalling channel order This stage ends either when there is no remaining available capacity or when all relevant connections have been allocated their minimum requested capacity.

In Stage 2: (Allocation of Remaining Capacity) if any capacity remains following Stage 1, it will be allocated to the relevant connections, for example according to the alternative (c) above.

In this method the full requested allocation is given to each high priority connection in connection signal channel order until all the capacity is used or until all high priority connections have their full requested allocation (Max VC Width, including the allocation from Stage 1).

If any capacity remains, then it is allocated giving the full requested allocation to each low priority connection in connection signal channel order until all the capacity is used.

Each source may only set the width of its own VC, according to the allocation calculation described above. Further if the new width is less than the width in the current block, then the width reduction must be phased in. See the section Phasing in VC Width Changes. Each source removes the VCs for any destination which precedes it in ring order and shifts the higher VCs down to fill the gap left by the deleted VC(s) before repeating the frame to the following station.

Because of the presence of source data buffers (latency) distributed around the ring (whose number depends on the ring configuration), the changes in VC width cannot in general be completed within a single frame. Each source therefore starts making adjustments to meet the calculated VC size for the next Source Data Block at the start of an interval called the Transition Period. The Transition Period is the period during which the master is transmitting frames in the old source data block whose contents will be copied by the system master into the first frames of the new source data block.

Frames transmitted by the system master during the transition period are marked via the Tr bit in the HS network frame (FIG. 42). When loading frames which are in the Transition period, sources which are due to reduce their VC size in the next source data block must use only the width of VC which will be allowed in the next block (i.e. bytes are wasted (Null Symbols) at the end of the VCB within each of the frames in the Transition Period). Sources which are due to increase their VC size may only do so in the first frame of the new source data block. This has the following consequences:

All connection signalling messages must complete their final pass around the ring before the start of the Transition period. This means that the number of simultanvariable connections During a period equal to the transition period following the start of a new source data block, VCs whose size has increased contain only the same amount of data as the corresponding (smaller) VCs in the previous source data block. This only applies to the section of the ring between the Master and the source for that VC.

The number of frames in the Transition Period is equal to the number of sources*2, where the system master is always counted as a source.

Figure 54:
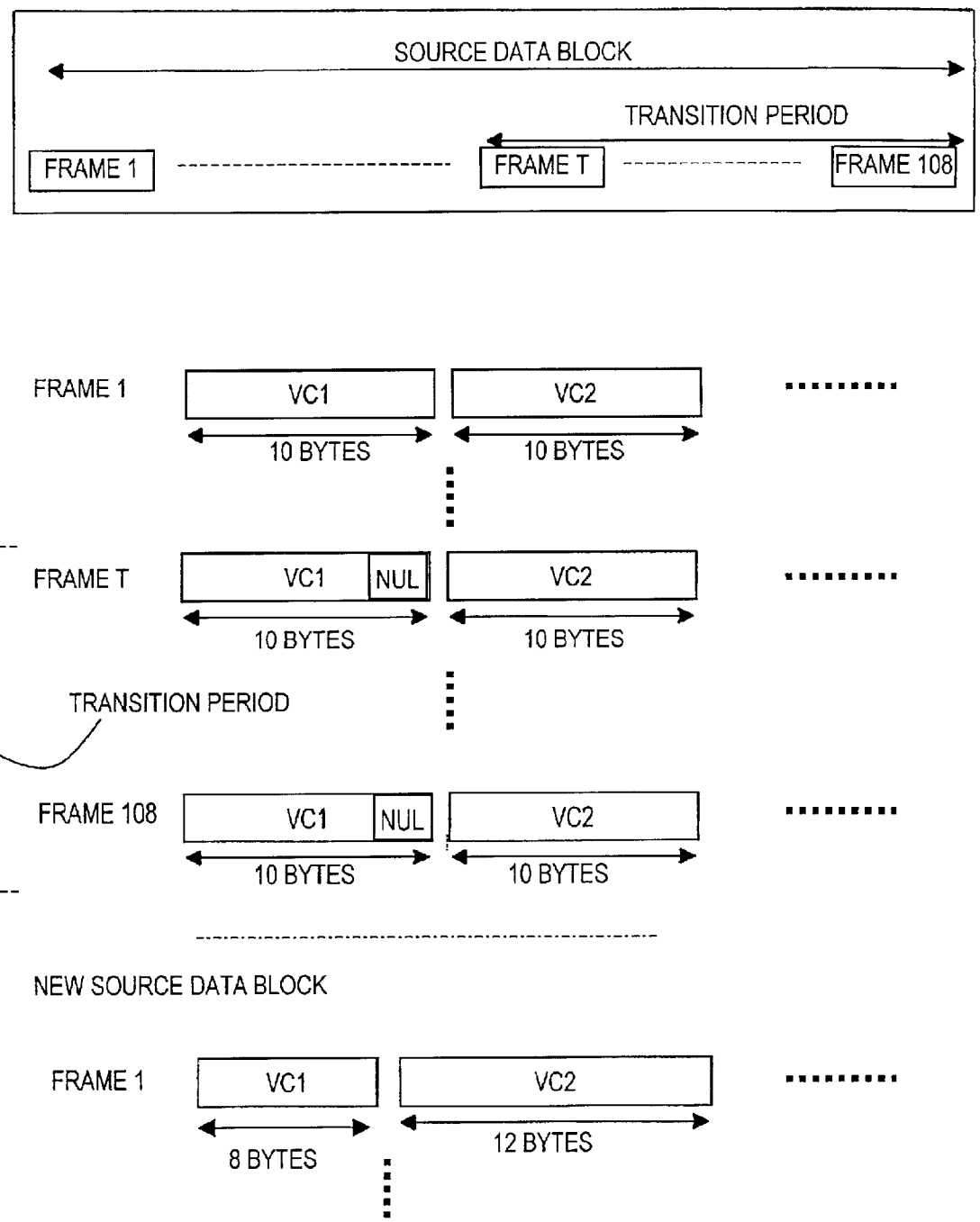
FIG. 54 illustrates the provision of a transition period between source data blocks in the High Speed network of the fourth example.

FIG. 54 shows the effect of the Transition Period in a case where connection VC1 reduces from 10 to 8 bytes. From a certain frame T to the last Frame 10 in one Source Data Block, capacity is reduced with Null symbols, in preparation for the next Source Data Block.

Example of Variable Rate Connections

Figure 55:
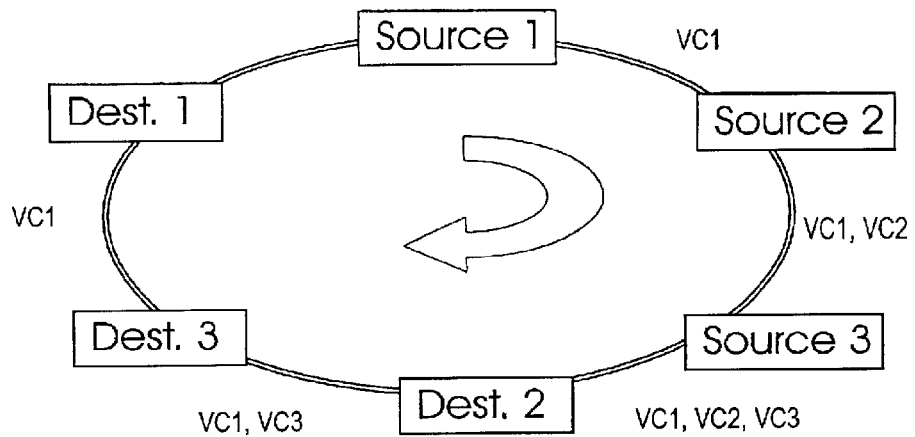
FIG. 55 illustrates an example of rate allocation calculation in the High Speed network of the fourth example.

In FIG. 55, connections 1 and 2 and 3 overlap over a number of segments in the ring. Thus the capacity allocated to connection 1 will limit the allocations which can be made for Connections 2 and 3. To ensure fairness of sharing bus capacity (and thus maximise the number of simultaneous applications supported within the system) the source of connection 1 should also take into account the buffer occupancies and priorities of connections 2 and 3, when deciding what bit-rate it should use for its own output.

In the example: Connection 1 (Source 1 to Destination 1) is for a compressed video signal (a real-time signal, therefore high priority); Connection 2 (Source 2 to Destination 2) is for map data from a CD-ROM (non-real time, therefore low priority); and Connection 3 (Source 3 to Destination 3) is compressed video (high priority).

Initialisation

Each connection is set-up with a reserve VC width determined by the expected rate or by the size of the free block, from which bytes are allocated for the new VC.

Suppose, for this example, that the total available width for VCs is 80 bytes (including the Free block), since the remaining bytes of the source data field have been allocated to the fixed-rate connections.

Actions of Source 1

Suppose that at the start of Source Data Block n,

1. Destination 1 decides that it needs a width which is a minimum of 5 and a maximum of 10 bytes. (This will lead to a delivery of between 510 and 1020 bytes during the Source data block, assuming that at least the minimum requested capacity is available.)
2. Destination 2 decides that it needs a width which is a minimum of 10 and a maximum of 50 bytes (VCB width).
3. Destination 3 decides that it needs a width which is a minimum of 20 and a maximum of 40 bytes (VCB width).

The calculations given above in stages 1 and 2 (alternative (a)) apply to the calculation in this example.

Source 1 is aware of the requirements of all these destinations and tries first to allocate the maximum requested widths (total 10+50+40=100), but finds that this exceeds the available width (80). Then source 1 allocates the minimum requested capacity to each connection (5+10+20=35) and then shares the remaining capacity (80−35=45) between the high priority connections (from Source 1 and Source 3), leading to an additional width of 5 for Source 1

40 for Source 2

0 for Source 3

There is no remaining width

Finally source 1 calculates the VCB width for connection 1: 5+5=10 bytes. This change will be phased-in as described above.

Actions of source 2

Source 2 will have received the same information from destinations 1,2,3. It will perform the same calculation as source 1, leading to a VCB width of 10+40=50 bytes which it will set for connection 2. This change will be phased-in in as described above.

Actions of source 3

Source 3 will have received the same information from destinations 1,2,3. It will perform the same calculation as sources 1 and 2, leading to a VCB width of 20+0=20 bytes which it will set for connection 3. This change will be phased-in in as described above.

Free Capacity (Free)

The free capacity is treated as a Variable Connection (VC) with ID=0.

Fixed Connections (FC)

This last section of the source data field can be used to carry both synchronous signals e.g. 16 bit PCM audio at 48 kHz or asynchronous signals whose bit-rate is fixed. Changes to the contents and size of this block can only be made by setting up a new connection or removing an old connection.

Fixed-Rate Asynchronous Connections

A fixed-rate asynchronous connection carries unformatted source data, modified only by the insertion of padding (Null Symbols) to match the bit-rate of the connection to the requirements of the application.

Padding is inserted into an asynchronous connection whenever there is no data available from the source. The insertion of padding reduces the effective bit-rate of the connection to match the output from the source.

Flow Control

In some applications, the source is able to deliver data at a range of bit-rates and it is the destination which must regulate the bit-rate in order to avoid overflow and thus loss of data in the receiver. The flow control mechanism enables the receiver to feedback a stop/continue indicator to the source. The stop indicator forces the source to stop transmitting data and to fill the connection with padding until a continue indicator is received When a fixed-rate asynchronous connection is built, the system allocates a single bit within a flow control connection byte to carry the a stop/continue indicator. The flow control connection is built around the ring from the System Master to the destination. The System Master may build this flow control connection any time after the system initialisation is complete following start-up.

The bits are allocated in connection ID order, when fixed-rate connections are set up. The bits are released when fixed-rate connections are removed, thus becoming available for use with new connections.

The following range of connection IDs apply to Fixed Asynchronous Connections: '20'H: Flow Control Connection '21'. . . '30'H Fixed Asynchronous Connections.

Asynchronous Data Transmission Example

Figure 56:
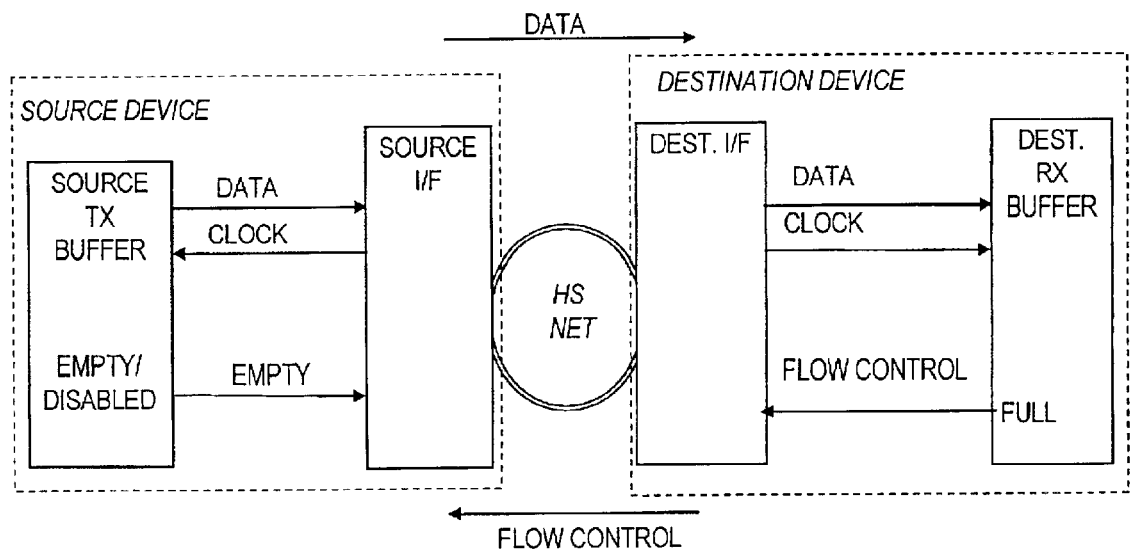
FIGS. 56 and 57 illustrates the flow control in the High Speed network of the fourth example.
Figure 57:
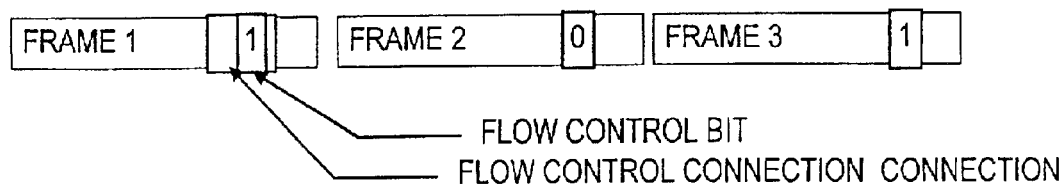

FIG. 56 shows a source device sending data to a destination device over a fixed asynchronous connection (FC) on the HS network.

The 'Empty' indicator from the source's transmit (Tx) buffer together with the Flow Control Bit determine whether or not padding needs to be inserted into the transmitted FC datastream.

The 'Full' indicator from the destination's Receive (Rx) buffer is used to determine the state of the flow control bit. Note that the 'full' level has to be set to take into account the latency, as described below.

In the case where there are multiple destinations, the flow control outputs are OR-ed together in the same flow control bit. Thus the device whose buffer fills first will set the flow control bit to stop. If the application wishes to pause delivery to one particular destination, then the flow control output from that destination should be kept at '0' (continue) so that data can continue to be delivered to the other destinations for that connection.

The following rules are observed by the Stations:

When the Source Buffer is not empty & the Destination Buffer is not full:

[In the Source] Data is transferred from the Tx Buffer into the bytes allocated to the (fixed asynchronous connection) FC within the source data field of the HS network frame.

[In the Destination] Data is copied from the bytes allocated to the FC within the source data field of the HS network frame into the Rx Buffer When the Source Buffer is empty & the Destination Buffer is not full:

[In the Source] No Data is transferred from the Tx Buffer, so padding is inserted into the bytes allocated to the FC within the source data field of the HS network frame.

[In the Destination] Padding is recognised by the receiver and thus no data is into the Rx Buffer When the Source Buffer is not empty & the Destination Buffer is nearly full:

[In the Source] Data is transferred from the Tx Buffer into the bytes allocated to the FC within the source data field of the HS network frame.

[In the Destination] Data is copied from the bytes allocated to the FC within the source data field of the HS NETWORK frame into the Rx Buffer. When the buffer reaches full (less an amount due to the latency), the destination sets the Flow Control bit to '1' (meaning stop).

When the Source detects that the Flow Control is set to Stop:

[In the Source] No Data is transferred from the Tx Buffer, so padding is inserted into the bytes allocated to the FC within the source data field of the HS network frame.

[In the Destination] Padding is recognised by the receiver and thus no data is put into the Rx Buffer. When the buffer is no longer full, the receiver sets the corresponding Flow Control bit to '0' (meaning continue).

When the Destination Buffer is no longer full:

[In the Destination] The destination sets the Flow Control bit to '0' (meaning stop).

When the Source detects that the Flow Control is set to Continue:

[In the Source] Data is transferred from the Tx Buffer into the bytes allocated to the FC within the source data field of the HS network frame.

[In the Destination] Data is copied from the bytes allocated to the FC within the source data field of the HS NETWORK frame into the Rx Buffer.

As in the example of the Double Speed network (FIGS. 18 and 19 above) allowance must be made for delay in the effect of the flow control bit, due to the number of source data fields of HS network frames which are held in buffers around the ring.

This means that the flow control bit ('1' means stop, '0' means start/continue) needs to be asserted before the receiver buffer is full, taking into account the amount of data which will be received before the flow control takes effect. This depends on the number of bytes used per frame (for this connection) and on the number of devices with open source data bypasses in the system.

The total latency (in bytes) is:

$$L=(\text{number of sources}*2)*\text{number of bytes in FC per frame},$$

where FC stands for Fixed Asynchronous Connection and the System Master is always counted as a source.

This latency can be measured by the System Master when the system starts up, by counting the number of frames which elapse between transmission and reception of the frame containing the start of a source data block (indicated by the SDB bit set to 1 in the HS NETWORK frame header).

The System Master then marks this number of frames at the end of the source data block with the Transition Period flag Tr set to 1.

Pack/Packet/Cell/Hierarchy

Figure 58:
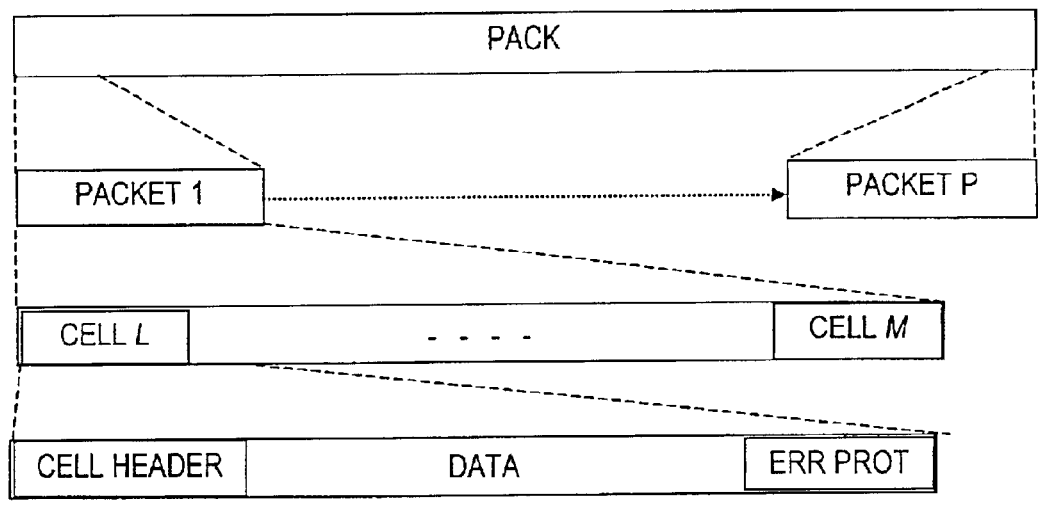
FIG. 58 shows an optional packet structure within the High Speed network of the fourth example.

The contents of a source data connection, either fixed or variable, are determined by the application. FIG. 58, illustrates one possible form of organisation. In FIG. 58, L . . . indicates that the first cell of a packet is not necessarily the first cell of a connection block (FCB or VCB).

M . . . A packet must contain at least one cell and may contain a number of cells (given by M-L+I)

P . . . The number of packets in a pack is defined by the application within the limits imposed by the Remaining packets field in the cell header: up to 256 packets/pack are supported.

A packet of source data may occupy an integral number of cells. The packets themselves may also be part of a pack as shown in FIG. 58. The application may define the number of packets in a pack as well as the number of cells in a packet (1 or more, subject to the limit imposed by the Remaining Packets field in the cell header), using the fields provided in the packet-slot header.

The cell provides framing to allow a device receiving the data to identify the data and recover it correctly.

The Cell Header comprises:

| | |
|---|---|
| Start of Packet flag | 1 bit |
| Start of Pack | 1 bit |
| Packet Type | 3 bits (=01, for packet type 1) |
| Remaining Packets | 8 bits |
| Number of bytes in Cell | 10 bits |
| Error Protection (N–K) | 8 bits |

The Start of Packet flag indicates whether the first data byte of this cell is also the first byte of a packet (flag set to 1) or whether it is a continuation of a packet. The Packet Type identifies the remaining format of the cell. Cell type 0 indicates an unoccupied cell, i.e. no packet data. Remaining Packets indicates the number of packets remaining within the current pack (group of packets). Number of Bytes in Cell indicates the number of bytes in this cell which contain valid data. The Error Protection field use is currently undefined.

The data 102 bytes contained in the cell is unprotected against errors

The start of the packet is indicated by the Start of Packet bit (set to '1') in the cell header. When this bit is set, the first byte of data following the cell header is also the first byte of the packet data (as opposed to being a continuation of a previous packet). When this bit is not set, it indicates that the contents of this cell are a continuation of a packet sent in the previous cell.

The number of HS frames required for transmission of a cell is a function of the size of the cell (108 bytes) and the width of its containing FC in each HS Frame. If the FC is n bytes wide then the cell will encompass (108)/n HS frames. Note that this calculation applies only to Fixed Connection blocks, since VCB have a reduced capacity during the transition period.

High Speed Network—Example V

The fifth example of the High Speed network corresponds closely to Example IV described above, but the frame structure is modified to reduce the number of bits per frame from 912 to 900. Taking into account the frame rate of 48 kHz, and taking into account the 25% overhead due to 4B/5B coding, this gives a gross rate of 54 MHz, compared with 54.72 MHz, for Example IV. This change may simplify docking of the transceiver in relation to DVD sources, for example, since 54 MHz and 27 MHz are standard master clocks for such digital video systems.

Change from 912 to 900 bits is achieved by reducing the number of source data bytes from 112 to 110. Spare capacity of four bits per frame is thus released, and can be used to increase the capacity of the control message channel (CF bits) from four bits per frame to eight bits per frame. To retain compatibility with the control channel of the D2B Optical Network, however, it is proposed that the eight CF bits should be regarded as two separate groups of four, providing in effect two independent control message channels.

Other changes in frame structure, the order of fields and so on are of course possible without departing from the principles of the invention in its various aspects.

What is claimed is:

1. A local communication system comprising:

a plurality of stations interconnected by data carrying segments so as to form a ring network, each station comprising a network interface for transmitting data onto a respective segment of the ring network for receipt by the network interface of a subsequent station, whereby the network interfaces of all stations are operable at data rates synchronized with a single master clock, and wherein the network interfaces of at least two stations in the system are operable such that the data rate in a first segment of the ring is higher than that in a second segment of the ring, while remaining synchronized with said master clock, wherein synchronization is maintained by the provision of a regular frame structure which has the same frame period in both segments of the network, but a larger quantity of data in each frame of the first segment, and wherein each frame conveys control bits forming part of a control message frame transmitted over plural frames over all segments of the ring, successive control message frames forming a control channel shared by all stations of the ring network and having a constant data rate for control information in all segments.

2. A system as in claim 1, including means for synchronizing one or more digital audio data sources, for which source data is carried in the fixed rate portions of each frame, with the data rates of the interface.

3. A network interface for use in interfacing a station to a local communication system comprising a synchronous ring network, each station in use being connected between incoming and outgoing segments of the ring network, the interface comprising:

means for transmitting data onto the outgoing segment of the ring network for receipt by a subsequent station, the interface being operable, at least in a mixed-speed mode, to transmit data on the outgoing segment at a data rate synchronized with but different to the rate of data received on the incoming segment, wherein in said mixed speed mode, synchronization is maintained by the provision of a regular frame structure which has the same frame period in both segments of the network, but a larger quantity of data in each frame of one of said segments, and wherein each frame conveys control bits forming part of a control message frame transmitted over plural frames over both incoming and outgoing segments of the ring, successive control message frames forming a control channel shared by all stations of the ring network and having a constant data rate for control information in all segments.

4. An interface as in claim 3 including means for synchronizing one or more digital audio data sources, for which source data is carried in the fixed rate portions of each frame, with the data rates of the interface.

5. An apparatus for use as a station in a local communication system, the apparatus comprising at least one functional unit and a network interface circuit as in claim 3.

6. An apparatus as in claim 5 wherein said functional unit comprises a source of destination of audio data.

7. A local communication method for use with a plurality of stations interconnected by data carrying segments so as to form a ring network, each station comprising a network interface for transmitting data onto a respective segment of the ring network for receipt by the network interface of a subsequent station, said method comprising:

operating the network interfaces of all stations at data rates synchronized with single master clock, and operating the network interfaces of at least two stations in the system such that the data rate in a first segment of the ring is higher than that in a second segment of the ring, while remaining synchronized with said master clock, wherein synchronization is maintained by the provision of a regular frame structure which has the same frame period in both segments of the network, but a larger quantity of data in each frame of the first segment, and wherein each frame conveys control bits forming part of a control message frame transmitted over plural frames over all segments of the ring, successive control message frames forming a control channel shared by all stations of the ring network and having a constant data rate for control information in all segments.

8. A method as in claim 7, including synchronizing one or more digital audio data sources, for which source data is carried in the fixed rate portions of each frame, with the data rates of the interface.

9. A network interface method for use in interfacing a station to a local communication system comprising a synchronous ring network, each station in use being connected between incoming and outgoing segments of the ring network, the method comprising:

transmitting data onto the outgoing segment of the ring network for receipt by a subsequent station, operating the interface, at least in a mixed-speed mode, to transmit data on the outgoing segment at a data rate synchronized with but different to the rate of data received on the incoming segment, wherein in said mixed speed mode, synchronization is maintained by the provision of a regular frame structure which has the same frame period in both segments of the network, but a larger quantity of data in each frame of one of said segments, and wherein in said mixed speed mode, each frame conveys control bits forming part of a control message frame transmitted over plural frames over all segments of the ring, successive control message frames forming a control channel shared by all stations of the ring network and having a constant data rate for control information in all segments.

10. An interface method as in claim 9 including synchronizing one or more digital audio data sources, for which source data is carried in the fixed rate portions of each frame, with the data rates of the interface.

11. Method for use as a station in a local communication system, the method comprising use of at least one functional unit and a network interface method as in claim 9.

12. A method as in claim 11 wherein said functional unit comprises a source or destination of audio data.

13. A local communication system comprising:
   a plurality of stations interconnected by data carrying segments so as to form a ring network,
   each station comprising a network interface for transmitting data onto a respective segment of the ring network for receipt by the network interface of a subsequent station,
   whereby the network interfaces of all stations are operable at data rates synchronized with a single master clock, and
   wherein the network interfaces of at least two stations in the system are operable such that the data rate in a first segment of the ring is higher than that in a second segment of the ring, while remaining synchronized with said master clock,
   wherein synchronization is maintained by the provision of a regular frame structure which has the same frame period in both segments of the network, but a larger quantity of data in each frame of the first segment, and
   wherein each frame conveys at least one bit forming part of a message frame transmitted over plural frames over all segments of the ring, successive message frames forming a messaging channel which is shared by all stations of the ring network and which has constant data rate in all segments.

14. A system as in claim 13 including means for synchronizing one or more digital audio data sources, for which source data is carried in the fixed rate portions of each frame, with the data rates of the interface.

15. A network interface for use in interfacing a station to a local communication system comprising a synchronous ring network, each station in use being connected between incoming and outgoing segments of the ring network, the interface comprising:
   means for transmitting data onto the outgoing segment of the ring network for receipt by a subsequent station,
   the interface being operable, at least in a mixed-speed mode, to transmit data on the outgoing segment at a data rate synchronized with but different to the rate of data received on the incoming segment,
   wherein in said mixed speed mode, synchronization is maintained by the provision of a regular frame structure which has the same frame period in both segments of the network, but a larger quantity of data in each frame of one of said segments, and
   wherein each frame conveys at least one bit forming part of a message frame transmitted over plural frames over both incoming and outgoing segments of the ring, successive message frames forming a messaging channel which is shared by all stations of the ring network and which has a constant data rate in all segments.

16. An interface as in claim 15 including means for synchronizing one or more digital audio data sources, for which source data is carried in the fixed rate portions of each frame, with the data rates of the interface.

17. An apparatus for use as a station in a local communication system, the apparatus comprising at least one functional unit and a network interface circuit as in claim 15.

18. A local communication method for use with a plurality of stations interconnected by data carrying segments so as to form a ring network, each station comprising a network interface for transmitting data onto a respective segment of the ring network for receipt by the network interface of a subsequent station, said method comprising:
   operating the network interfaces of all stations at data rates synchronized with single master clock, and
   operating the network interfaces of at least two stations in the system such that the data rate in a first segment of the ring is higher than that in a second segment of the ring, while remaining synchronized with said master clock,
   wherein synchronization is maintained by the provision of a regular frame structure which has the same frame period in both segments of the network, but a larger quantity of data in each frame of the first segment, and
   wherein each frame conveys at least one bit forming part of a message frame transmitted over plural frames over all segments of the ring, successive message frames forming a control channel shared by all stations of the ring network and having a constant data rate for control information in all segments.

19. A method as in claim 18 including synchronizing one or more digital audio data sources, for which source data is carried in the fixed rate portions of each frame, with the data rates of the interface.

20. A network interface method for use in interfacing a station to a local communication system comprising a synchronous ring network, each station in use being connected between incoming and outgoing segments of the ring network, the method comprising:
   transmitting data onto the outgoing segment of the ring network for receipt by a subsequent station,
   operating the interface, at least in a mixed-speed mode, to transmit data on the outgoing segment at a data rate synchronized with but different to the rate of data received on the incoming segment,
   wherein in said mixed speed mode, synchronization is maintained by the provision of a regular frame structure which has the same frame period in both segments of the network, but a larger quantity of data in each frame of one of said segments, and
   wherein in said mixed speed mode, each frame conveys at least one bit forming part of a message frame transmitted over plural frames over all segments of the ring, successive message frames forming a messaging channel which is shared by all stations of the ring network and has a constant data rate for control information in all segments.

21. An interface method as in claim 20 including synchronizing one or more digital audio data sources, for which source data is carried in the fixed rate portions of each frame, with the data rates of the interface.

22. Method for use as a station in a local communication system, the method comprising use of at least one functional unit and a network interface method as in claim 20.

23. A method as in claim 22 wherein said functional unit comprises a source or destination of audio data.

24. A method for operating a ring data communications network to concurrently service interconnected devices, the required capacity for data being substantially higher between certain of said devices than between others, said method comprising:
   transmitting from device to device successive frames occupying successive equal time periods;

transmitting the same number of bits for control data in each said frame to form a control data channel shared by all stations of the ring network; and transmitting different numbers of bits for other data in respectively corresponding different ones of said frames to form a plurality of ring link segments having different capacity for said other data to respectively corresponding different stations of the ring network.

25. An apparatus as in claim 17 wherein said functional unit comprises a source or destination of audio data.

* * * * *